United States Patent
Hatton et al.

(10) Patent No.: US 10,934,439 B2
(45) Date of Patent: Mar. 2, 2021

(54) ADDITIVES FOR COATING COMPOSITIONS AND RELATED METHODS

(71) Applicant: Massachusetts Institute of Technology, Cambridge, MA (US)

(72) Inventors: T. Alan Hatton, Sudbury, MA (US); Lev E. Bromberg, Salem, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 187 days.

(21) Appl. No.: 16/016,004

(22) Filed: Jun. 22, 2018

(65) Prior Publication Data

US 2018/0371264 A1    Dec. 27, 2018

Related U.S. Application Data

(60) Provisional application No. 62/523,577, filed on Jun. 22, 2017, provisional application No. 62/609,065, filed on Dec. 21, 2017.

(51) Int. Cl.

| | |
|---|---|
| C09D 5/08 | (2006.01) |
| C09D 163/00 | (2006.01) |
| C23F 11/16 | (2006.01) |
| C23F 11/173 | (2006.01) |
| C09D 5/02 | (2006.01) |
| C09D 179/08 | (2006.01) |
| C09D 7/61 | (2018.01) |
| C09D 7/60 | (2018.01) |
| C23F 11/12 | (2006.01) |
| C08G 59/68 | (2006.01) |
| C08G 14/06 | (2006.01) |
| C08G 59/40 | (2006.01) |
| C09D 161/34 | (2006.01) |

(52) U.S. Cl.
CPC ............ *C09D 5/086* (2013.01); *C08G 14/06* (2013.01); *C08G 59/4064* (2013.01); *C08G 59/687* (2013.01); *C09D 5/028* (2013.01); *C09D 7/60* (2018.01); *C09D 7/61* (2018.01); *C09D 161/34* (2013.01); *C09D 163/00* (2013.01); *C09D 179/08* (2013.01); *C23F 11/124* (2013.01); *C23F 11/16* (2013.01); *C23F 11/162* (2013.01); *C23F 11/173* (2013.01)

(58) Field of Classification Search
CPC . C09D 5/086; C09D 7/61; C09D 7/60; C09D 5/028; C09D 161/34; C09D 163/00; C09D 179/08; C08G 14/06; C08G 59/4064; C08G 59/687; C23F 11/124; C23F 11/16; C23F 11/162; C23F 11/173
USPC ........................................................ 524/395
See application file for complete search history.

(56) References Cited

U.S. PATENT DOCUMENTS

| | | | |
|---|---|---|---|
| 3,278,434 A | 10/1966 | Hoffman | |
| 3,732,174 A * | 5/1973 | Nicholas | C08L 71/03 525/533 |
| 2012/0025142 A1 | 2/2012 | Visser et al. | |
| 2012/0094130 A1 | 4/2012 | Foscante et al. | |

FOREIGN PATENT DOCUMENTS

WO    WO-2018/237284    12/2018

OTHER PUBLICATIONS

"Rubber Compounding: Metal Oxides," Enc. Polym. Sci. Tech., vol. 11, John Wiley & Sons, p. 633. (Year: 2002).*
McKeen, L.W., "12.11 Epichlorohydrine Rubber (CO, ECO)," Permeability Properties of Plastics and Elastomers, 3d Ed., Elsevier, pp. 272-273. (Year: 2012).*
Bromberg et al., "Magnesium Thiodialkanoates: Dually-Functional Additives to Organic Coatings," Industrial & Engineering Chemistry Research, (2018).
Hamerton et al., "Examining the Initiation of the Polymerization Mechanism and Network Development in Aromatic Polybenzoxazines," Macromolecules 46(13):5117-5132 (2013).
International Search Report and Written Opinion for International Application PCT/US18/39033 dated Sep. 19, 2018.

* cited by examiner

*Primary Examiner* — Josephine L Chang
(74) *Attorney, Agent, or Firm* — Foley Hoag LLP; Dana M. Gordon; Lawrence P. Tardibono

(57) ABSTRACT

Disclosed are curable coating compositions, and methods of cathodic corrosion protection using the compositions. For example, a curable coating composition comprising a mixed salt of magnesium thiodialkanoate, and a method for applying the coating composition, which when applied onto a steel or other ferrous substrate provides an anticorrosive coating, effective for improving resistance to cathodic disbondment.

20 Claims, 34 Drawing Sheets

Figure 2

General formulas

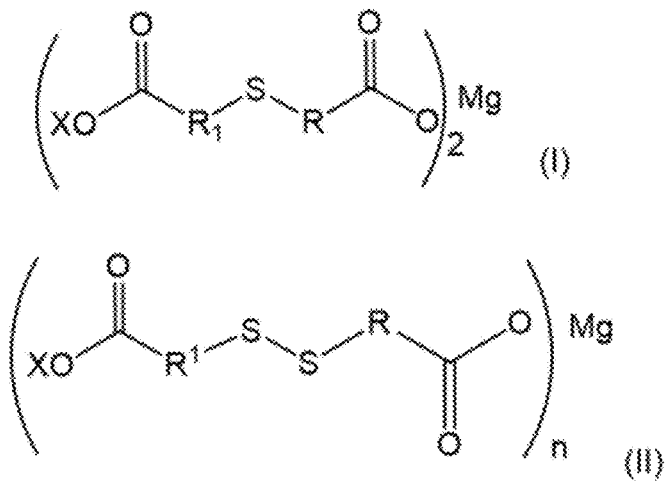

R, R₁: alkyl, aryl, alkenyl, and the like groups

X: H, halogen, alkyl, aryl, alkenyl, ester, ether, thioether, amide, amidoamine, carbamate and the like groups Examples:

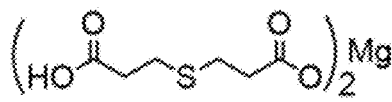

3-((3-($\lambda^1$-oxidaneyl)-3-oxopropyl)thio)propanoic acid, magnesium salt

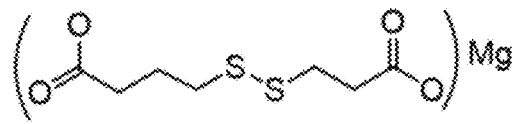

4-((3-($\lambda^1$-oxidaneyl)-3-oxopropyl)disulfaneyl)-1-($\lambda^1$-oxidaneyl)butan-1-one, magnesium salt

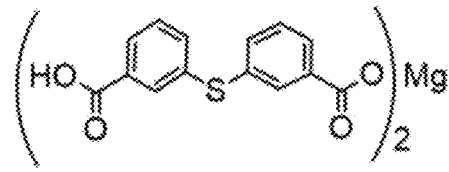

3-((3-(($\lambda^1$-oxidaneyl)carbonyl)phenyl)thio)benzoic acid, magnesium salt

ADDITIVES FOR COATING COMPOSITIONS AND RELATED METHODS

RELATED APPLICATIONS

This application claims the benefit of priority to U.S. Provisional Patent Application Ser. No. 62/523,577, filed Jun. 22, 2017; and U.S. Provisional Patent Application Ser. No. 62/609,065, filed Dec. 21, 2017.

BACKGROUND

Metal surfaces deteriorate when exposed to certain environmental conditions through a process referred to as corrosion. Corrosion is a natural process that converts refined metal to a more chemically-stable form, such as an oxide, a hydroxide, or a sulfide, by a chemical or electrochemical reaction. Coatings are often used to protect metal surfaces, but over time cathodic disbondment or delamination can occur. Cathodic disbondment or delamination is the main failure mechanism of steel and galvanized steel surfaces coated by organic coating layers.[1] Upon permeation of water beneath the organic coating due to the passive diffusion through coating imperfections, cracks, or metallic cut edges a corrosion cell is formed that is characterized by anodic and cathodic reactions.

There exists a need to develop alternative coatings to reduce or to prevent cathodic or anodic disbondment of a coating from a metal surface.

SUMMARY

In one aspect, disclosed herein is a curable coating composition comprising:
(a) a salt comprising a divalent alkaline earth metal cation and an anionic thioether compound;
(b) a curing agent or a mixture of curing agents; and
(c) one or more curable organic resins.

In another aspect, provided herein are methods of anti-corrosive treatment comprising:
providing a substrate, wherein said substrate is a ferrous substrate;
coating the substrate with a composition comprising:
(a) a salt comprising a divalent alkaline earth metal cation and an anionic thioether compound;
(b) a curing agent or a mixture of curing agents; and
(c) one or more curable organic resins;
thereby preventing or reducing corrosion of the substrate.

In another aspect, provided herein are methods of preventing or reducing corrosion on a surface, comprising applying to the surface a coating, comprising:
(a) a salt comprising a divalent alkaline earth metal cation and an anionic thioether compound;
(b) a curing agent or a mixture of curing agents; and
(c) one or more curable organic resins;
thereby preventing or reducing corrosion of the surface.

BRIEF DESCRIPTION OF THE DRAWINGS

FIG. 2 shows exemplary magnesium salts utilized as coating components in the disclosed compositions of matter.

DETAILED DESCRIPTION

Cathodic Disbondment Inhibitors

Figure 1:
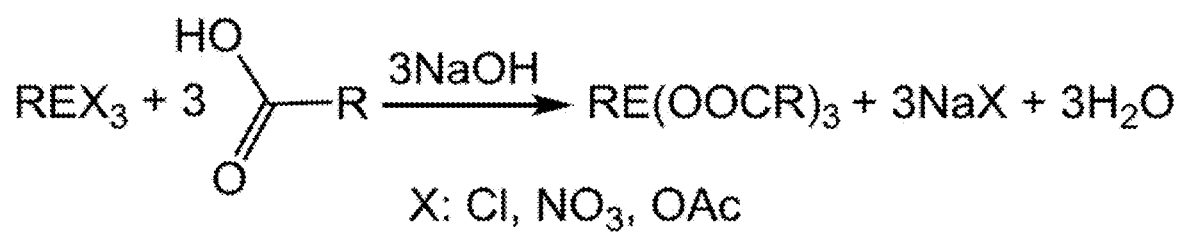
FIG. 1 shows a scheme of a metathesis reaction between a rare earth (RE) salt and carboxylic acid.

One aspect of the present invention is related to additive compositions for inhibitive coatings that prevent corrosion of metal surfaces when applied as primers, because such coatings are only effective if dissolved constituents can react with the metal.[2,3] Corrosion protection of metal surfaces afforded by organic coatings is the most cost-effective means of providing practical protection from corrosion in transportation and infrastructure, postponing or preventing the mechanical instability, replacement expense, and safety concerns of corroded components. The coatings are applied to substrates subject to environments with a risk of atmospheric corrosion. The anticorrosive mechanism of the inhibitive coatings depends on passivation of the substrate and build-up of a protective barrier layer consisting of insoluble complexes, which impede transport of corrosive species. The inhibitive pigments are inorganic salts, most frequently chromates, molybdates, nitrates, borates, and silicates, which are slightly water-soluble. When the coating is permeated by moisture, the components of the pigments are partially dissolved and transported to the substrate surface, wherein the dissolved ions react with the substrate and form a reaction product that passivates the surface of the substrate.[4] The inhibiting pigments should be properly distributed in the coating or primer to maintain the integrity of the coating while partially dissolving. The inhibitive coating should form a barrier against water and incoming corrosive ions while releasing a sufficient quantity of inhibitor ions. These two requirements are antagonistic and must be optimized to enable the efficient corrosion inhibition coupled with proper barrier properties of the coating. It is clear that the effect of the corrosion-inhibitive coatings is to be more prominent in coatings with some degree of permeability which, in turn, enables the mass transfer sufficient for the fractional dissolution of the pigments.

More specifically, this aspect of the present invention is related to inhibitive pigments that protect coated metal surfaces from the so-called cathodic disbondment or delamination. As defined herein, cathodic or anodic disbondment is the loss of adhesion between a cathodic or anodic coating, respectively, and its metal substrate due to the products of cathodic (anodic) redox reaction (corrosion reaction) that takes place in the interface between the coating and the metal substrate. Disbondment of coating occurs when said coating components in a metal interface interact either chemically or physically, causing corrosion beneath the coat.

Cathodic disbondment or delamination is the main failure mechanism of steel and galvanized steel surfaces coated by organic coating layers.[1] Upon permeation of water beneath the organic coating due to the passive diffusion through the coating imperfections, cracks, or metallic cut edges a corrosion cell is formed that is characterized by anodic and cathodic reactions. In other words, a cathodic disbondment mechanism involves the anodic metal dissolution by the electrolyte being transported beneath the delaminated coating, which is interlinked with the cathodic oxygen reduction occurring at the site of the coating disbondment. During corrosion-driven cathodic coating disbondment/delamination, there occurs a cathodic $O_2$ reduction, primarily in the region of the delamination front:

$$O_{2\,(g)} + 2H_2O + 4e^- \rightarrow 4OH^-_{(aq)} \quad (1)$$

The increased pH caused by reaction (1) can lead to a coating degradation. The corresponding anodic reaction comprises metal dissolution:
for carbon steel:

$$Fe_{(s)} \rightarrow Fe^{2+}_{(aq)} + 2e^- \quad (2a)$$

for galvanized steel:

$$Zn_{(s)} \rightarrow Zn^{2+}_{(aq)} + 2e^- \quad (2b)$$

The anodic metal dissolution (reactions 2a and/or 2b) is constrained to the region of the coating defect. The anodic reaction 2b occurring at elevated pH in the disbonded regions leads to formation of water-soluble zincate ($ZnO_2^{2-}$) and bizincate ($HZnO_2^-$) ions.[1]

Divalent metal cations ($M^{2+}$) inhibit the cathodic disbondment by formation of water-insoluble metal hydroxides:

$$[M(H_2O)_6]^{2+} \rightleftharpoons [M(H_2O)_6OH]^+ + H^+ \quad (3)$$

$$M^{2+} + 2H_2O \rightleftharpoons M(OH)_{2\downarrow} + 2H^+ \quad (4)$$

Reactions (3) and (4) cause the reduction of local ion mobility and conductivity in the disbonded front underneath the coating layers and hence, to the disbondment inhibition. Rare earth ($Ce^{3+}$, $La^{3+}$, $Gd^{3+}$, etc) and alkaline earth ($Mg^{2+}$, $Ca^{2+}$, $Sr^{2+}$, $Ba^{2+}$, etc.) cations are capable of forming films of amphoteric oxide layers resulting from the cathodic oxygen reduction producing alkaline pH, thus inhibiting the corrosion-driven cathodic disbondment on bare and galvanized steel surfaces.

Specifically, magnesium cations are preferable as divalent metal cations as cathodic disbondment inhibitors due to abundance, low cost, non-toxic nature, and very low solubility of $Mg(OH)_2$ corrosion product (see reaction (4)) that forms between the hydroxyls of the cathodic oxygen reduction reaction (see (1)) and $Mg^{2+}$ released from the coating matrix that contains $Mg^{2+}$. Magnesium oxides and salts exhibit a wide range of acido-basic properties, which can be modified and tuned, and they possess active sites capable of catalyzing numerous organic and carbonation reactions. A wide band gap (low electron surface concentration) and high stability in alkaline conditions make magnesium hydroxide efficient in inhibiting cathodic delamination. The formation of the water-insoluble layer of $Mg(OH)_2$ over the substrate surface hinders the oxygen reduction reaction and also blocks the diffusion of other cations to the disbondment front. The cation exchange reactions are necessary for the propagation of the disbondment front. In addition, in the case of galvanized steel, the local alkaline environment can lead to the formation of ZnO, which is an n-type semiconductor with a room-temperature electrical conductivity, i.e., the surface concentration of electrons on zinc oxide and the rate of electron transfer are high.[5] Conversely, formation of $Mg(OH)_2$ that is stable under alkaline conditions stops the electron transfer because magnesium hydroxide is an insulator. Hence, the corrosion inhibition effect of $Mg^{2+}$, which has been reported to exceed the efficiency of the commercially available, yet toxic chromate-based corrosion inhibitors.[1]

Organic chelating agents as corrosion inhibitors for zinc and galvanized metals are known in the art.[6,7] Furthermore, passivating compositions for galvanized steel and other metals composed of sulfur compounds such as thioglycolic acids, thiodipropionic acid and the like and chromium are known in the art.[8] Chromium plays a specific role in the passivation. Firstly, hydrogen ions cause zinc in the surface of the galvanized steel substrate to dissolve into the treatment liquid, and this acidifies (increases the hydrogen ion concentration) the surface of the metal to produce a chromium hydroxide. The reaction of chromium ions and a sulfur compound produces a black metal sulfide thereon. The metal sulfide forms a black coating film that passivates the surface by suppressing dissolution of the zinc. The utilization of chromium salts as passivating corrosion inhibitors is problematic from the toxicity standpoint as well as limits the applicability of the chromium salt/sulfur compounds due to the formation of black layers, which may be undesirable in certain applications. Disclosed herein are novel methods of corrosion inhibition by a salt comprising a divalent alkaline earth metal cation and an anionic thioether compound, e.g., magnesium thiodialkanoic and the magnesium mixed salts.

Smart corrosion inhibitive polymeric pigments for organic coatings that are ion-exchanged with magnesium are known in the art.[1] Such corrosion inhibitors comprise acid polymeric ion-exchange resin AMBERLITE™ IR120 (Dow Chemical Company) loaded with $Mg^{2+}$ by conventional ion exchange. Importantly, however, the large and strong/rubbery polymeric beads of the ion-exchange resin comprising said inhibitors must undergo several elaborate processing steps to be converted into a pigment of a proper particle size: (i) first, the beads need to be thoroughly washed, then (ii) ion-exchanged via a lengthy ion-exchange process, then (iii) the loaded beads need to be dried and (iv) milled into smaller particles, which is followed by (v) sieving. It is the purpose of the present invention to provide a magnesium-based corrosion inhibitor wherein said laborious and costly processing steps are not required for the inhibitor preparation.

The use of bentonite and more generally montmorillonite clays as corrosion inhibitor pigments has been described.[9] When clay is exhaustively exchanged with a divalent alkali earth and trivalent rare earth metal cation, it can constitute a smart ion-releasing pigment. An inhibition mechanism is ion-exchanged montmorillonites may be proposed whereby underfilm cation release and subsequent precipitation of sparingly soluble hydroxides reduces the conductivity of the underfilm electrolyte. This reduces the rate of corrosive disbondment. The use of montmorillonites is also known in the patent literature. WO2002008345 A1 claims that montmorillonites are useful as corrosion inhibitors, particularly corrosion inhibitors for metallic substrates, such as galvanized steel and the like.[10] Utilization of chromate-free montmorillonite as a corrosion inhibitor for metallic substrates allows to alleviate the toxicity concerns prevalent with the chromate-based corrosion inhibitors. The compensating cationic charge present in a montmorillonite is due to one or more compensating cations selected from alkali metal cations, alkali earth metal cations, yttrium and lanthanide cations such as cerium imbedded or intercalated into the montmorillonite silicate structure. Clay pigments exchanged with $Ca^{2+}$, $Sr^{2+}$, $Ba^{2+}$, $Mg^{2+}$, $Ce^{3+}$ and $Y^{3+}$ cations significantly enhance resistance to corrosion-driven cathodic delamination in organic coatings adherent to iron surfaces.[9] Furthermore, montmorillonite clays intercalated by organic quaternary ammonium cations are known in the art to act as corrosion inhibitors.[11] The present invention provides for clays that are composite materials with both magnesium cations as well as thiodipropionate and the like anions, which allow for synergistic corrosion inhibitive properties.

Organic Coating Curing Aids

Numerous curing agents for epoxies, benzoxazines and other components of organic coatings have been described. These curing agents include amines, amido-amines, phenolics, carboxylic anhydrides, mercaptans, and the like. Each curing agent has advantages and disadvantages which make it acceptable or unsuitable for particular applications. Also, each curing agent, or combination thereof, may be used with one or more curing accelerators. Examples of such accelerators include certain inorganic and organic metal salts such as lithium chloride and stannous octoate; onium salts such as ammonium chloride, alkyl phosphonium halides, etc. and boron trifluoride complexes. There is a need to develop curable epoxy and other resin compositions which cure very rapidly at moderately elevated temperatures and have very long open time (pot life) at ambient temperatures in applications such as structural and automotive coatings, adhesives, sheet molding compounds, primers and varnishes.

It is the further purpose of the present invention to provide corrosion and disbondment inhibitors that promote the organic coatings preparation by accelerating curing of said coatings comprising epoxy, polyurethane, benzoxazine and the like reactive components. It was serendipitously discovered that certain magnesium salts act as cathodic disbondment inhibitors and simultaneously accelerate curing of reactive coating compositions by reducing temperature necessary for crosslinking and/or by Lewis acid-type catalysis.

Thioglycolic acids and their salts are known in the art. Thiodipropionic acid (TDPA) is used as antioxidant in the cosmetic industry or as intermediate in organic chemistry. TDPA esters like dilauryl-, ditridecyl-, distearyl-, and lauryl/stearyl thiodipropionates are used in a number of polymers as antioxidants. In the presence of alcohols or amines, the carboxylic groups of TDPA will react preferentially. TDPA has a molecular weight of 178.21 and occurs as a white crystalline powder. It has a melting point of 131° C. to 134° C. and is soluble in water, acetone, and alcohol. TDPA is stable under ordinary conditions.[12]

TDPA derivatives such as specific thiodipropionic acid bisamides are particularly suitable as stabilizers for polymeric elastomers such as polybutadiene or polyisoprene and the like which are susceptible to oxidative, thermal, light- or ozone-induced degradation.[13] Copper salts of TDPA derivatives can be utilized as antioxidant additives for fuel compositions.[14]

Polymeric esters of TDPA with polyols, as well as containing two or more thiodipropionate groups and one or more polyol units, are known and are used as plasticizers in resins.[15]

Thiodipropionic acid, phenols, thiodiphenol benzoxazine, sulfonyl benzoxazine, sulfonyl and diphenol are known in the art as catalysts for theromosetting reaction of thermal cure of benzoxazine.[16] In particular, TDPA is a known catalyst of step growth ring-opening polyaddition of bisbenzoxazine monomers that result in thermosetting polybenzoxazine resins employed in coatings. Certain thermosetting compositions comprising TDPA as an additive exhibit improved reactivity at temperatures lower than those used during the curing of conventional benzoxazine based compositions. TDPA and the like thioglycolic acid derivatives such as thiol carbamates are known in the art as latent accelerators of epoxy curing.[17] Importantly, a thiodipropanoic acid and the like compound used as accelerator of the coating cure will covalently bind with the coating components upon cure, and hence, will not provide for any corrosion inhibition as an undercoat. The present invention provides for the composition of matter that is an instrument formed by the intermixture of a magnesium salt and thiodipropionic acid or 3,3'-dithiodipropionic acid and the like ingredients, and possessing serendipitous properties of accelerating the organic coating polymerization and curing reactions while also providing a cathodic disbondment protection to the cured coating.

TDPA is generally recognized as a safe, nonirritating cosmetic additive. It spontaneously self-assembles into monolayers upon adsorption onto metal surfaces from aqueous solutions. The acid strength of TDPA in the monolayers is higher than that of the molecules in solutions due to the electrostatic and coordination interactions of the carboxylic groups with the metal surface.

Magnesium salts of thioglycolic acid are known in the art.[18] By reacting in aqueous medium one mole of magnesium carbonate with two moles of thioglycolic acid following by the removal of water by heat and/or vacuum there may be prepared a magnesium thioglycolate having the following formula:

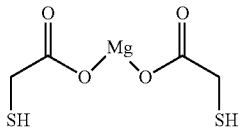

This compound may be isolated in the form of a dehydrate, which is a colorless solid material, stable in air and substantially free from odor. Magnesium thioglycolates can be utilized as part of cosmetic formulations. However, they possess unprotected thiol groups that are strongly reactive toward epoxy, isocyanate, amino or benzoxazole components of the coatings; said reactivity results in the covalent attachment of the thiol groups onto polymeric components of the coating, thereby preventing the thioglycolate from acting as a corrosion inhibitor.

In some embodiments, a salt comprising a divalent alkaline earth metal cation and an anionic thioether compound acts as a catalyst. In some embodiments, a salt comprising a divalent alkaline earth metal cation and an anionic thioether compound acts as a crosslinking catalyst. In some embodiments, the salt acts as a benzoxazine curing catalyst. In some embodiments, the salt comprises a Lewis acid (metal cation) and a Lewis base (organic anion). In some embodiments, the salt is a bifunctional catalyst of ring-opening polymerization of benzoxazines and of the curing of oxirane-functional resins. In some embodiments, the salt comprises hydrate water. In some embodiments, the hydrate water can participate in the auto-acceleration of curing via the reverse Mannich reaction and electrophilic aromatic substitution of the carbonium cation to a benzoxazine monomer or phenol. In some embodiments, the salt is a magnesium thiodipropionate.

Exemplary Compositions of Matter

Disclosed herein is a cation-releasing corrosion inhibitor comprising a carboxylate salt capable of releasing magnesium cations upon dissociation. Sodium carboxylates such as salicylate, caprinate, cinnamate, decanoate or N-oleoyl-sarcosine, etc. are promising corrosion inhibitors on their own right in the presence of aqueous chloride ions as a standard corrosion medium. Carboxylates can heal the local defects in the passivating oxide layer on steel by forming weakly soluble Fe(III) compounds. Remarkably, however, a synergistic effect in combining both cathodic and anodic inhibition has been realized by applying salts of rare earths (RE) and carboxylate (HOOCR) moieties, prepared via a simple metathesis reaction (FIG. 1).

In some embodiments, the compositions disclosed herein are as effective as other corrosion inhibitors such as metal carboxylates. In some embodiments, the compositions disclosed herein are more effective than other corrosion inhibitors such as metal carboxylates. In one aspect, disclosed herein is a curable coating composition comprising:
  (a) a salt comprising a divalent alkaline earth metal cation and an anionic thioether compound;
  (b) a curing agent or a mixture of curing agents; and
  (c) one or more curable organic resins.

In some embodiments, the divalent alkaline earth metal cation is selected from the group consisting of $Ca^{2+}$, $Mg^{2+}$, $Sr^{2+}$, and $Ba^{2+}$. In some embodiments, the divalent alkaline earth metal cation is selected from the group consisting of $Ca^{2+}$ and $Mg^{2+}$. In some embodiments, the divalent alkaline earth metal cation is $Mg^{2+}$.

In contrast to magnesium thioglycolates, magnesium thiodialkanoic acid salts, dithiodialkanonic acid salts and the like compounds (FIG. 2) containing sulfane sulfur (thioether) in place of thiol —SH group are devoid of the active sulfur hydrogen and hence, will not covalently bind sulfur-containing groups to the reactive components of the organic coatings. Magnesium thiodialkanoate or dithiodialkanonate and the like salt embedded into a cured polymer organic coating is available for dissociating on contact with water, thus freeing magnesium cations, $Mg^{2+}$ to the immediate proximity. Such salts can optionally be mixed salts that contain both thiodialkanoate and the like anions as well as anions originating from commonly available magnesium salts such as acetate, nitrate, chloride, sulfate and the like. Said magnesium thiodialkanoate or dithiodialkanonate salts can contain hydrate water in various proportions.

In some embodiments of the compositions disclosed herein, the anionic thioether compound is a thioalkanoic acid or a dithioalkanoic acid. In some embodiments, the anionic thioether compound is a thioalkanoic acid.

In some embodiments of the compositions disclosed herein, the salt has the following structural formula:

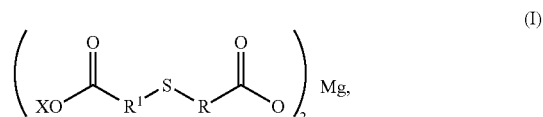

wherein
R is selected from the group consisting of divalent ($C_1$-$C_6$)alkyl, cycloalkyl, heterocycloalkyl, aryl, heteroaryl, aralkyl, heteroaralkyl, and ($C_2$-$C_6$)alkenyl;
$R^1$ is selected from the group consisting of divalent ($C_1$-$C_6$)alkyl, cycloalkyl, heterocycloalkyl, aryl, heteroaryl, aralkyl, heteroaralkyl, and ($C_2$-$C_6$)alkenyl;
$R^2$ is hydrogen or ($C_1$-$C_{20}$)alkyl; and
X is selected from the group consisting of H, halogen, ($C_1$-$C_{20}$)alkyl, cycloalkyl, heterocycloalkyl, aryl, heteroaryl, aralkyl, heteroaralkyl, ($C_2$-$C_{20}$)alkenyl, —$OR^2$, —$SR^2$, —$N(R^2)_2$, —$C(O)N(R^2)_2$, —$C(O)N(R^2)((C_1$-$C_{20})$alkylene)$N(R^2)_2$, and —$C(O)R^2$.

In some embodiments, the salt is selected from the group consisting of

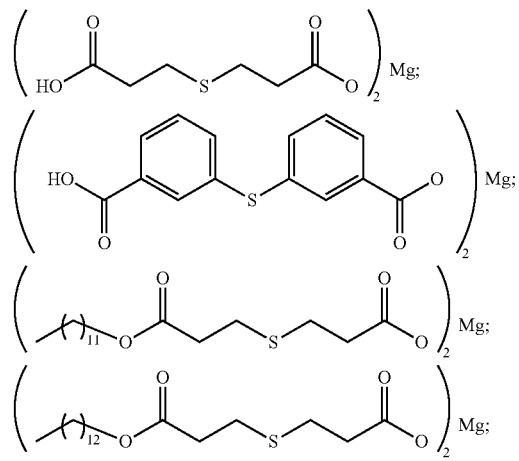

-continued

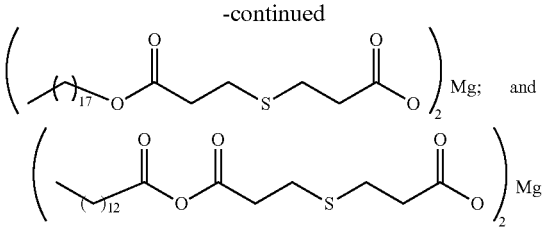

(FIG. 2). In some embodiments, the salt is

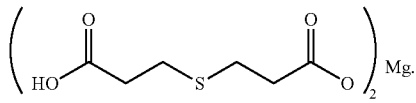

In some embodiments, the thioalkanoic acid is selected from the group consisting of thiodipropionic acid (TDPA), lauryl thiodipropionate, tridecyl thiodipropionate, stearyl thiodipropionate, and myristoyl thiodipropionate.

In some embodiments, the anionic thioether compound is a dithioalkanoic acid.

In some embodiments of the compositions disclosed herein, the salt has the following structural formula:

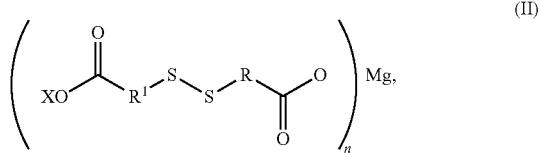

(II)

wherein

R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^1$ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^2$ is hydrogen or $(C_1-C_{20})$alkyl;

X is selected from the group consisting of absent, H, halogen, $(C_1-C_{20})$alkyl, cycloalkyl, heterocycloalkyl, aryl, heteroaryl, aralkyl, heteroaralkyl, $(C_2-C_{20})$alkenyl, $-OR^2$, $-SR^2$, $-N(R^2)_2$, $-C(O)N(R^2)_2$, $-C(O)N(R^2)((C_1-C_{20})$alkylene$)N(R^2)_2$, and $-C(O)R^2$; and n is 1 or 2.

In some embodiments of formulas (I) and (II) disclosed herein, R is selected from the group consisting of divalent $(C_1-C_6)$alkyl, cycloalkyl, aryl, aralkyl, and $(C_2-C_6)$alkenyl. In some embodiments, R is selected from the group consisting of divalent $(C_1-C_6)$alkyl, cycloalkyl, heterocycloalkyl, and $(C_2-C_6)$alkenyl. In some embodiments, R is selected from the group consisting of divalent $(C_1-C_6)$alkyl, cycloalkyl, aryl, aralkyl, and $(C_2-C_6)$alkenyl. In some embodiments, R is selected from the group consisting of divalent $(C_1-C_6)$alkyl, cycloalkyl and aryl. In some embodiments, R is $(C_1-C_6)$alkyl or aryl. In some embodiments, R is $(C_1-C_6)$alkyl.

In some embodiments of formulas (I) and (II) disclosed herein, $R^1$ is selected from the group consisting of divalent $(C_1-C_6)$alkyl, cycloalkyl, aryl, aralkyl, and $(C_2-C_6)$alkenyl. In some embodiments, $R^1$ is selected from the group consisting of divalent $(C_1-C_6)$alkyl, cycloalkyl, heterocycloalkyl, and $(C_2-C_6)$alkenyl. In some embodiments, $R^1$ is selected from the group consisting of divalent $(C_1-C_6)$alkyl, cycloalkyl, aryl, aralkyl, and $(C_2-C_6)$alkenyl. In some embodiments, $R^1$ is selected from the group consisting of divalent $(C_1-C_6)$alkyl, cycloalkyl and aryl. In some embodiments, $R^1$ is $(C_1-C_6)$alkyl or aryl. In some embodiments, $R^1$ is $(C_1-C_6)$alkyl.

In some embodiments, R and $R^1$ are the same. In some embodiments, R and $R^1$ are both $(C_1-C_6)$alkyl. In some embodiments, R and $R^1$ are both aryl.

In some embodiments of formulas (I) and (II) disclosed herein, X is selected from the group consisting of absent, H, halogen, $(C_1-C_{20})$alkyl, cycloalkyl, heterocycloalkyl, aryl, heteroaryl, aralkyl, heteroaralkyl, $(C_2-C_{20})$alkenyl, $-C(O)N(R^2)_2$, $-C(O)N(R^2)((C_1-C_{20})$alkylene$)N(R^2)_2$, and $-C(O)R^2$. In some embodiments, X is selected from the group consisting of absent, H, $(C_1-C_{20})$alkyl, cycloalkyl, heterocycloalkyl, aryl, heteroaryl, aralkyl, heteroaralkyl, $(C_2-C_{20})$alkenyl, and $-C(O)R^2$. In some embodiments, X is selected from the group consisting of absent, H, $(C_1-C_{20})$alkyl, aralkyl, heteroaralkyl, $(C_2-C_{20})$alkenyl, and $-C(O)R^2$. In some embodiments, X is selected from the group consisting of absent, H, $(C_1-C_{20})$alkyl, $(C_2-C_{20})$alkenyl, and $-C(O)R^2$. In some embodiments, X is selected from the group consisting of H, $(C_1-C_{20})$alkyl, and $-C(O)R^2$. In some embodiments, X is absent.

In some embodiments, $R^2$ is hydrogen. In some embodiments, X is $-C(O)R^2$; and $R^2$ is $(C_1-C_{20})$alkyl.

In some embodiments, n is 1. In some embodiments, n is 2.

In some embodiments, the salt is selected from the group consisting of

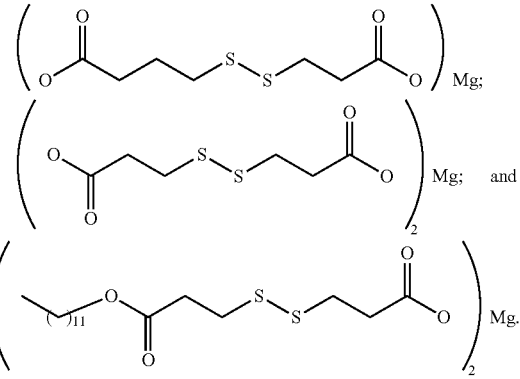

In some embodiments, the salt is

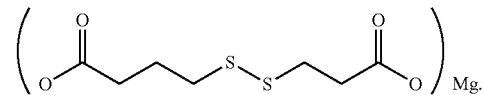

In some embodiments, the dithioalkanoic acid is selected from the group consisting of 3,3'-thiodipropionic acid, lauryl dithiodipropionate, tridecyl dithiodipropionate, stearyl dithiodipropionate, and myristoyl dithiodipropionate.

In some embodiments, the ratio of the divalent alkaline earth metal cation to the anionic thioether compound is from about 50:1 to about 0.01:1. In some embodiments, the ratio is about 50:1 to about 0.1:1. In some embodiments, the ratio of the divalent alkaline earth metal cation to the anionic thioether compound is selected from the group consisting of about 50:1, about 49:1, about 48:1, about 47:1, about 46:1, about 45:1, about 44:1, about 43:1, about 42:1, about 41:1, about 40:1, about 39:1, about 38:1, about 37:1, about 36:1, about 35:1, about 34:1, about 33:1, about 32:1, about 31:1, about 30:1, about 29:1, about 28:1, about 27:1, about 26:1, about 25:1, about 24:1, about 23:1, about 22:1, about 21:1, about 20:1, about 19:1, about 18:1, about 17:1, about 16:1, about 15:1, about 14:1, about 13:1, about 12:1, about 11:1, about 10:1, about 9:1, about 8:1, about 7:1, about 6:1, about 5.9:1, about 5.8:1, about 5.7:1, about 5.6:1, about 5.5:1, about 5.4:1, about 5.3:1, about 5.2:1, about 5.1:1, about 5:1, about 4.9:1, about 4.8:1, about 4.7:1, about 4.6:1, about 4.5:1, about 4.4:1, about 4.3:1, about 4.2:1, about 4.1:1, about 4:1, about 3.9:1, about 3.8:1, about 3.7:1, about 3.6:1, about 3.5:1, about 3.4:1, about 3.3:1, about 3.2:1, about 3.1:1, about 3:1, about 2.9:1, about 2.8:1, about 2.7:1, about 2.6:1, about 2.5:1, about 2.4:1, about 2.3:1, about 2.2:1, about 2.1:1, about 2:1, about 1.9:1, about 1.8:1, about 1.7:1, about 1.6:1, about 1.5:1, about 1.4:1, about 1.3:1, about 1.2:1, about 1.1:1, about 1:1, about 0.9:1, about 0.8:1, about 0.7:1, about 0.6:1, about 0.5:1, about 0.4:1, about 0.3:1, about 0.2:1, and about 0.1:1. In some embodiments, the ratio of the divalent alkaline earth metal cation to the anionic thioether compound is from about 25:1 to about 0.1:1. In some embodiments, the ratio of the divalent alkaline earth metal cation to the anionic thioether compound is from about 10:1 to about 0.5:1. In some embodiments, the ratio of the divalent alkaline earth metal cation to the anionic thioether compound is from about 5:1 to about 0.5:1.

Figure 3:
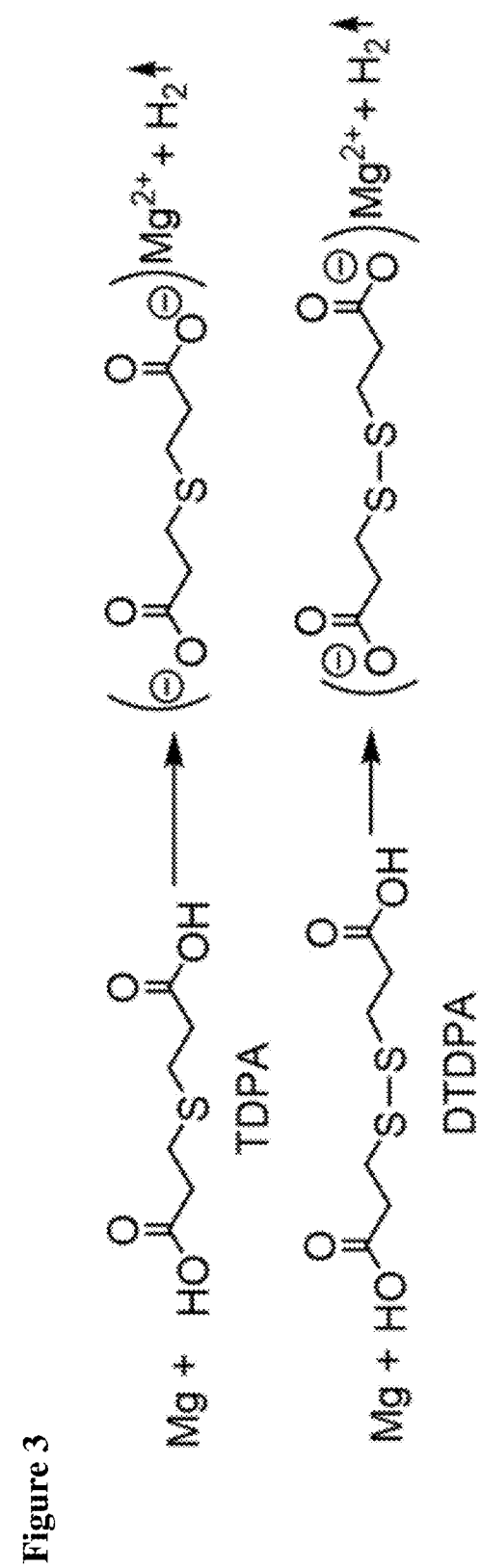
FIG. 3 shows a replacement reaction of metallic magnesium and 3,3'-thiodipropionic acid (TDPA) or 3,3'-dithiodipropionic acid (DTDPA) in aqueous solution.

In some embodiments of the salts disclosed herein, the salt is prepared via an aqueous route. In some embodiments, the salt is prepared using a metathesis reaction (see, for example, FIG. 1). In some embodiments, the salt is prepared using a substitution reaction (see, for example, FIG. 3).

Methods of application of magnesium salts of thiodialkanoic or dithioalkanoic acids and the like compounds as latent accelerators of resin curing has been serendipitously discovered as disclosed in the present invention. In some embodiments, the salt comprising a divalent alkaline earth metal cation and an anionic thioether compound is a curing agent. Therefore, in some embodiments, the requirements of components (a) and (b) of the curable coating composition are met by a salt comprising a divalent alkaline earth metal cation and an anionic thioether compound.

In some embodiments, the curing agent or the mixture of curing agents comprises an amine, an amido-amine, a phenol, a carboxylic anhydride, or a mercaptan.

In some embodiments, the salt comprising a divalent alkaline earth metal cation and an anionic thioether compound further comprises a second anionic compound. In some embodiments, the second anionic compound is selected from the group consisting of acetate, nitrate, chloride, and sulfate. In some embodiments, the salt is magnesium acetate thiodipropionate mixed salt. In some embodiments, the salt is magnesium acetate dithiodipropionate mixed salt.

In some embodiments of the compositions disclosed herein, the salt is from about 0.1% to about 80% by weight, based upon total solids weight of the composition. In some embodiments, the salt is from about 0.1% to about 65% by weight, based upon total solids weight of the composition. In some embodiments, the weight of the salt, based upon total solids weight of the composition, is selected from the group consisting of about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.4%, about 3.5%, about 3.6%, about 3.7%, about 3.8%, about 3.9%, about 4%, about 4.1%, about 4.2%, about 4.3%, about 4.4%, about 4.5%, about 4.6%, about 4.7%, about 4.8%, about 4.9%, about 5%, about 5.1%, about 5.2%, about 5.3%, about 5.4%, about 5.5%, about 5.6%, about 5.7%, about 5.8%, about 5.9%, about 6%, about 6.1%, about 6.2%, about 6.3%, about 6.4%, about 6.5%, about 6.6%, about 6.7%, about 6.8%, about 6.9%, about 7%, about 7.1%, about 7.2%, about 7.3%, about 7.4%, about 7.5%, about 7.6%, about 7.7%, about 7.8%, about 7.9%, about 8%, about 8.1%, about 8.2%, about 8.3%, about 8.4%, about 8.5%, about 8.6%, about 8.7%, about 8.8%, about 8.9%, about 9%, about 9.1%, about 9.2%, about 9.3%, about 9.4%, about 9.5%, about 9.6%, about 9.7%, about 9.8%, about 9.9%, about 10%, about 10.1%, about 10.2%, about 10.3%, about 10.4%, about 10.5%, about 10.6%, about 10.7%, about 10.8%, about 10.9%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, and about 65%. In some embodiments, the salt is from about 0.1% to about 50% by weight, based upon total solids weight of the composition. In some embodiments, the salt is from about 5% to about 50% by weight, based upon total solids weight of the composition.

In some embodiments of the compositions disclosed herein, the curable organic resin comprises an epoxy, an amine, a polyamidoamine, a polyurethane, a benzoxazine, or a mixture thereof. In some embodiments, the curable organic resin comprises an epoxy. In some embodiments, the curable organic resin comprises an epoxy and an amine. In some embodiments, the curable organic resin comprises a bisphenol A epoxy resin, bisphenol A propoxylate diglycidyl ether, or $N^4,N^4,N^{4'},N^{4'}$-tetra(oxiran-2-yl)-[1,1'-biphenyl]-4,4'-diamine. In some embodiments, the curable organic resin comprises bisphenol A epoxy resin (60-100%), glycidylether of $C_{12}$-$C_{14}$ alcohols (7-13%), and butylphenyl glycidyl ether (3-7%).

In some embodiments, the curable organic resin comprises an amine. In some embodiments, the curable organic resin comprises an amine selected from the group consisting of 4,4'-diaminophenylsulfone, diethylenetriamine, polyoxypropylene diamine, triethanolamine, and 2-(2-aminoethylamino)ethanol. In some embodiments, the curable organic resin comprises diethylenetriamine (13-30%), polyoxypropylene diamine (13-30%), 4-nonyl-phenol (7-13%), triethanolamine (3-7%), and 2-(2-aminoethylamino)ethanol (0.1-1%).

In some embodiments, the curable organic resin comprises 4,4'-diaminophenylsulfone.

In some embodiments, the curable organic resin comprises a polyamidoamine. In some embodiments, the polyamidoamine is ARADUR® 125 BDB.

In some embodiments, the compositions disclosed herein further comprise:

a pigment; or
an additive.

In some embodiments, in the composition comprises a pigment. In some embodiments, the pigment is selected from the group consisting of carbon nanotubes, titanium dioxide, montmorillonite, iron oxide, aluminum, bronze, phthalocyanine blue, and a mixture thereof. In some embodiments, the pigment is montmorillonite. In some embodiments, the pigment is Montmorillonite K 10 clay.

Furthermore, the compositions of matter may comprise composites of said magnesium salts and clays such as preferably bentonite, a form of more generally montmorillonite, 2:1-layer hydrated aluminium silicates based on the dioctahedral pyrophyllite structure.

In some embodiments of the compositions of matter disclosed herein, the composition comprises magnesium acetate thiodipropionate mixed salt and a pigment. In some embodiments, the composition comprises a blend of montmorillonites and a salt comprising a divalent alkaline earth metal cation and an anionic thioether compound. In some embodiments, the composition comprises a composite of montmorillonites and a salt comprising a divalent alkaline earth metal cation and an anionic thioether compound.

In some embodiments of the compositions disclosed herein, the composition comprises an additive. In some embodiments, the compositions disclosed herein further comprise an additive.

In some embodiments, the additive is selected from the group consisting of a dye, a flow control agent, a dispersant, a thixotropic agent, an adhesion promoter, an antioxidant, a light stabilizer, a curing catalyst, an anticorrosion agent, and a mixture thereof. In some embodiments, the additive is carbon nanotubes.

In some embodiments, the composition comprises the salt magnesium acetate thiodipropionate; and the curing agent 4,4'-diaminophenylsulfone.

Exemplary Methods of Use

In another aspect, provided herein are methods of anticorrosive treatments comprising coating a substrate or an article with any one of the compositions disclosed herein. In some embodiments, a method of anticorrosive treatment comprises:
providing a substrate, wherein said substrate is a ferrous substrate;
coating the substrate with a composition comprising:
(a) a salt comprising a divalent alkaline earth metal cation and an anionic thioether compound;
(b) a curing agent or a mixture of curing agents; and
(c) one or more curable organic resins;
thereby preventing or reducing corrosion of the substrate.

In another aspect, provided herein are methods of preventing or reducing corrosion on a surface comprising coating a substrate or an article with any one of the compositions disclosed herein. In some embodiments, a method of preventing or reducing corrosion on a surface, comprising applying to the surface a coating, comprising:
(a) a salt comprising a divalent alkaline earth metal cation and an anionic thioether compound;
(b) a curing agent or a mixture of curing agents; and
(c) one or more curable organic resins;
thereby preventing or reducing corrosion of the surface.

In some embodiments, the salts disclosed herein can act synergistically as corrosion inhibitors and as curing agents. In some embodiments, magnesium thiodipropionates can act synergistically as corrosion inhibitors, which lower the temperature of the epoxy-amine gelation and benzoxazine curing.

In some embodiments, the salts disclosed herein significantly improve an epoxy-amine powder coating resistance to cathodic disbondment on galvanized steel in industry-standard cyclic tests.

In some embodiments, the surface is a surface of a substrate.

In some embodiments, the substrate is selected from the group consisting of silicon wafer, glass slide, quartz, poly (ethylene terephthalate) (PET) roll, MELINEX®, polyethylenenaphtalate (PEN) roll, TEONEX®, kapton roll, paper roll, polydimethylsiloxane roll, nylon, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, GORE-TEX®, MARLEX®, expanded polytetrafluoroethylene (e-PTFE), low density polyethylene (LDPE), high density polyethylene (HDPE), polyimide (PI), polypropylene (PP), steel, carbon steel, galvanized steel, and pig iron. In some embodiments, the substrate is selected from the group consisting of silicon wafer, glass slide, quartz, polyurethane, polyacrylonitrile, polyphenazine, teflon, polyamide resin, GORE-TEX®, MARLEX®, expanded polytetrafluoroethylene (e-PTFE), polyimide (PI), steel, carbon steel, galvanized steel, and pig iron. In some embodiments, the substrate is selected from the group consisting of steel, carbon steel, galvanized steel, and pig iron.

In some embodiments of the methods disclosed herein, a passivation layer is formed on the substrate.

In some embodiments of the methods disclosed herein, at least a portion of the substrate is in contact with water.

In some embodiments of the methods disclosed herein, the method forms a gel within a curing time. In some embodiments, the curing time is less than 60 minutes, less than 55 minutes, less than 50 minutes, less than 45 minutes, less than 40 minutes, less than 35 minutes, less than 30 minutes, less than 25 minutes, less than 20 minutes, less than 19 minutes, less than 18 minutes, less than 17 minutes, less than 16 minutes, less than 15 minutes, less than 14 minutes, less than 13 minutes, less than 12 minutes, less than 11 minutes, less than 10 minutes, less than 9 minutes, less than 8 minutes, less than 7 minutes, less than 6 minutes, less than 5 minutes, less than 4 minutes, less than 3 minutes, less than 2 minutes, less than 1 minute, and less than 30 seconds. In some embodiments, the curing time is less than about 10 minutes. In some embodiments, the curing time is less than about 8 minutes. In some embodiments, the curing time is less than about 5 minutes. In some embodiments, the curing time is selected from the group consisting of about 15 seconds, about 30 seconds, about 45 seconds, about 1 minute, about 1.25 minutes, about 1.5 minutes, about 1.75 minutes, about 2 minutes, about 2.25 minutes, about 2.5 minutes, about 2.75 minutes, about 3 minutes, about 3.25 minutes, about 3.5 minutes, about 3.75 minutes, about 4 minutes, about 4.25 minutes, about 4.5 minutes, about 4.75 minutes, about 5 minutes, about 5.25 minutes, about 5.5 minutes, about 5.75 minutes, about 6 minutes, about 6.25 minutes, about 6.5 minutes, about 6.75 minutes, about 7 minutes, about 7.25 minutes, about 7.5 minutes, about 7.75 minutes, about 8 minutes, about 8.25 minutes, about 8.5 minutes, about 8.75 minutes, about 9 minutes, about 9.25 minutes, about 9.5 minutes, about 9.75 minutes, and about 10 minutes.

In some embodiments of the methods disclosed herein, the curing agent or the mixture of curing agents is a thermoset monomer.

In some embodiments, the thermoset monomer shows an onset of curing at a temperature as measured using differential scanning calorimetry. In some embodiments, the onset temperature is less than 225° C. In some embodiments, the onset temperature is less than 200° C. In some embodiments, the onset temperature is selected from the group consisting of less than 200° C., less than 195° C., less than 190° C., less than 185° C., less than 180° C., less than 175° C., less than 170° C., less than 165° C., less than 160° C., less than 155° C., less than 150° C., less than 145° C., less than 140° C., less than 135° C., less than 130° C., less than 125° C., less than 120° C., less than 115° C., less than 110° C., less than 105° C., and less than 100° C. In some embodiments, the onset temperature is less than 175° C. In some embodiments, the onset temperature is less than 150° C. In some embodiments, the onset temperature is less than 125° C. In some embodiments, the onset temperature is less than 100° C.

In some embodiments, the onset temperature is selected from the group consisting of about 200° C., about 199° C., about 198° C., about 197° C., about 196° C., about 195° C., about 194° C., about 193° C., about 192° C., about 191° C., about 190° C., about 189° C., about 188° C., about 187° C., about 186° C., about 185° C., about 184° C., about 183° C., about 182° C., about 181° C., about 180° C., about 179° C., about 178° C., about 177° C., about 176° C., about 175° C., about 174° C., about 173° C., about 172° C., about 171° C., about 170° C., about 169° C., about 168° C., about 167° C., about 166° C., about 165° C., about 164° C., about 163° C., about 162° C., about 161° C., about 160° C., about 159° C., about 158° C., about 157° C., about 156° C., about 155° C., about 154° C., about 153° C., about 152° C., about 151° C., about 150° C., about 149° C., about 148° C., about 147° C., about 146° C., about 145° C., about 144° C., about 143° C., about 142° C., about 141° C., about 140° C., about 139° C., about 138° C., about 137° C., about 136° C., about 135° C., about 134° C., about 133° C., about 132° C., about 131° C., about 130° C., about 129° C., about 128° C., about 127° C., about 126° C., about 125° C., about 124° C., about 123° C., about 122° C., about 121° C., about 120° C., about 119° C., about 118° C., about 117° C., about 116° C., about 115° C., about 114° C., about 113° C., about 112° C., about 111° C., about 110° C., about 109° C., about 108° C., about 107° C., about 106° C., about 105° C., about 104° C., about 103° C., about 102° C., about 101° C., and about 100° C.

Devices

In another aspect, provided herein is an article, comprising a substrate, and a coating on the substrate, wherein the coating comprises a composition comprising:
  (a) a salt comprising a divalent alkaline earth metal cation and an anionic thioether compound;
  (b) a curing agent or a mixture of curing agents; and
  (c) one or more curable organic resins.

In some embodiments of the article, the article comprises steel, carbon steel, galvanized steel, or pig iron. In some embodiments, the article, included but is not limited to, an electrode, a vehicle (e.g., a car, a boat, a truck, a four-wheeler, and a piece of farming equipment), a building component (e.g., a fence, a metal bar, a grate, and a metal beam), a weapon (e.g., a gun, a knife, a sword, and a spear), a barricade, and a sign (e.g., a road sign). In some embodiments, the article is an electrode. In some embodiments, the article is a vehicle.

Definitions

For convenience, certain terms employed in the specification, examples, and are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

For purposes of this disclosure, the chemical elements are identified in accordance with the Periodic Table of the Elements, CAS version, Handbook of Chemistry and Physics, 67th Ed., 1986-87, inside cover.

As used herein, the term "surface" or "surfaces" or "substrates" can mean any surface of any material, including glass, plastics, metals, polymers, paper, fabric and the like. It can include surfaces constructed out of more than one material, including coated surfaces. Importantly, all surfaces/substrates of the disclosure can be coated with the compositions of the disclosure, resulting in improved corrosion protection.

An aliphatic chain comprises the classes of alkyl, alkenyl and alkynyl defined below. A straight aliphatic chain is limited to unbranched carbon chain moieties. As used herein, the term "aliphatic group" refers to a straight chain, branched-chain, or cyclic aliphatic hydrocarbon group and includes saturated and unsaturated aliphatic groups, such as an alkyl group, an alkenyl group, or an alkynyl group.

"Alkyl" refers to a fully saturated cyclic or acyclic, branched or unbranched carbon chain moiety having the number of carbon atoms specified, or up to 30 carbon atoms if no specification is made. For example, alkyl of 1 to 8 carbon atoms refers to moieties such as methyl, ethyl, propyl, butyl, pentyl, hexyl, heptyl, and octyl, and those moieties which are positional isomers of these moieties. Alkyl of 10 to 30 carbon atoms includes decyl, undecyl, dodecyl, tridecyl, tetradecyl, pentadecyl, hexadecyl, heptadecyl, octadecyl, nonadecyl, eicosyl, heneicosyl, docosyl, tricosyl and tetracosyl. In certain embodiments, a straight chain or branched chain alkyl has 30 or fewer carbon atoms in its backbone (e.g., $C_1$-$C_{30}$ for straight chains, $C_3$-$C_{30}$ for branched chains), and more preferably 20 or fewer.

"Cycloalkyl" means mono- or bicyclic or bridged saturated carbocyclic rings, each having from 3 to 12 carbon atoms. Likewise, preferred cycloalkyls have from 5-12 carbon atoms in their ring structure, and more preferably have 6-10 carbons in the ring structure.

"Alkenyl" refers to any cyclic or acyclic, branched or unbranched unsaturated carbon chain moiety having the number of carbon atoms specified, or up to 26 carbon atoms if no limitation on the number of carbon atoms is specified; and having one or more double bonds in the moiety. Alkenyl of 6 to 26 carbon atoms is exemplified by hexenyl, heptenyl, octenyl, nonenyl, decenyl, undecenyl, dodenyl, tridecenyl, tetradecenyl, pentadecenyl, hexadecenyl, heptadecenyl, octadecenyl, nonadecenyl, eicosenyl, heneicosoenyl, docosenyl, tricosenyl, and tetracosenyl, in their various isomeric forms, where the unsaturated bond(s) can be located anywherein the moiety and can have either the (Z) or the (E) configuration about the double bond(s).

The terms "alkoxyl" or "alkoxy" as used herein refers to an alkyl group, as defined below, having an oxygen moiety attached thereto. Representative alkoxyl groups include methoxy, ethoxy, propoxy, tert-butoxy, and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, —O-alkynyl, —O—$(CH_2)_m$—$R^1$, where m and $R_1$ are described below.

The terms "amine" and "amino" are art-recognized and refer to both unsubstituted and substituted amines, e.g., a moiety that can be represented by the formulae:

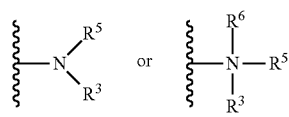

wherein $R^3$, $R^5$ and $R^6$ each independently represent a hydrogen, an alkyl, an alkenyl, —$(CH_2)_m$—$R^1$, or $R^3$ and $R^5$ taken together with the N atom to which they are attached complete a heterocycle having from 4 to 8 atoms in the ring structure; $R^1$ represents an alkenyl, aryl, cycloalkyl, a cycloalkenyl, a heterocyclyl, or a polycyclyl; and m is zero or an integer in the range of 1 to 8. In certain embodiments, only one of $R^3$ or $R^5$ can be a carbonyl, e.g., $R^3$, $R^5$, and the nitrogen together do not form an imide. In even more certain embodiments, $R^3$ and $R^5$ (and optionally $R^6$) each independently represent a hydrogen, an alkyl, an alkenyl, or —$(CH_2)_m$—$R^1$. Thus, the term "alkylamine" as used herein means an amine group, as defined above, having a substituted or unsubstituted alkyl attached thereto, i.e., at least one of $R_3$ and $R_5$ is an alkyl group. In certain embodiments, an amino group or an alkylamine is basic, meaning it has a conjugate acid with a $pK_a \geq 7.00$, i.e., the protonated forms of these functional groups have $pK_a$s relative to water above about 7.00.

The term "aryl" as used herein includes 3- to 12-membered substituted or unsubstituted single-ring aromatic groups in which each atom of the ring is carbon (i.e., carbocyclic aryl) or where one or more atoms are heteroatoms (i.e., heteroaryl). Preferably, aryl groups include 5- to 12-membered rings, more preferably 6- to 10-membered rings. In certain embodiments, aryl includes ($C_6$-$C_{10}$)aryl. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Carbocyclic aryl groups include benzene, naphthalene, phenanthrene, phenol, aniline, and the like. Heteroaryl groups include substituted or unsubstituted aromatic 3- to 12-membered ring structures, more preferably 5- to 12-membered rings, more preferably 6- to 10-membered rings, whose ring structures include one to four heteroatoms. In certain embodiments, heteroaryl includes ($C_2$-$C_9$)heteroaryl. Heteroaryl groups include, for example, pyrrole, furan, thiophene, imidazole, oxazole, thiazole, triazole, pyrazole, pyridine, pyrazine, pyridazine and pyrimidine, and the like.

The term "aralkyl" is art-recognized and refers to an alkyl group substituted with an aryl group.

The term "heteroaralkyl" is art-recognized and refers to an alkyl group substituted with a heteroaryl group.

The term "heteroatom" is art-recognized and refers to an atom of any element other than carbon or hydrogen. Illustrative heteroatoms include boron, nitrogen, oxygen, phosphorus, sulfur and selenium.

The terms "heterocyclyl", "heterocycloalkyl", "heterocyclic group" refer to 3- to 12-membered ring structures, more preferably 5- to 12-membered rings, more preferably 6- to 10-membered rings, whose ring structures include one to four heteroatoms. Heterocycles can also be polycycles. In certain embodiments, heterocyclyl includes ($C_2$-$C_9$)heterocyclyl. Heterocyclyl groups include, for example, thiophene, thianthrene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring can be substituted at one or more positions with such substituents as described above, as for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, sulfamoyl, sulfinyl, ether, alkylthio, sulfonyl, ketone, aldehyde, ester, a heterocyclyl, an aromatic or heteroaromatic moiety, —$CF_3$, —CN, and the like.

The term "carbonyl" is art-recognized and includes such moieties as can be represented by the formula:

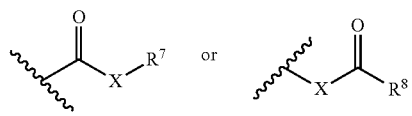

wherein X is a bond or represents an oxygen or a sulfur, and $R^7$ represents a hydrogen, an alkyl, an alkenyl, —$(CH_2)_m$—$R^1$ or a pharmaceutically acceptable salt, $R^8$ represents a hydrogen, an alkyl, an alkenyl or —$(CH_2)_m$—$R^1$, where m and $R^1$ are as defined above. Where X is an oxygen and $R^7$ or $R^8$ is not hydrogen, the formula represents an "ester." Where X is an oxygen, and $R^7$ is as defined above, the moiety is referred to herein as a carboxyl group, and particularly when $R^7$ is a hydrogen, the formula represents a "carboxylic acid". Where X is an oxygen, and $R^8$ is a hydrogen, the formula represents a "formate." In general, where the oxygen atom of the above formula is replaced by a sulfur, the formula represents a "thiocarbonyl" group. Where X is a sulfur and $R^7$ or $R^8$ is not hydrogen, the formula represents a "thioester" group. Where X is a sulfur and $R^7$ is a hydrogen, the formula represents a "thiocarboxylic acid" group. Where X is a sulfur and $R^8$ is a hydrogen, the formula represents a "thioformate" group. On the other hand, where X is a bond, and $R^7$ is not hydrogen, the above formula represents a "ketone" group. Where X is a bond, and $R^7$ is a hydrogen, the above formula represents an "aldehyde" group.

As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc.

As used herein, the term "halogen" designates —F, —Cl, —Br, or —I; the term "thioether" means —S—; and the term "hydroxyl" means —OH.

The abbreviations Ac, Me, Et, Ph, Tf, Nf, Ts, and Ms represent acetate, methyl, ethyl, phenyl, trifluoromethanesulfonyl, nonafluorobutanesulfonyl, p-toluenesulfonyl and methanesulfonyl, respectively. A more comprehensive list of the abbreviations utilized by organic chemists of ordinary skill in the art appears in the first issue of each volume of the *Journal of Organic Chemistry*; this list is typically presented in a table entitled Standard List of Abbreviations.

TDPA is an abbreviation for 3,3'-thiodipropionic acid.
DTDPA is an abbreviation for 3,3'-dithiodipropionic acid.
MgAc is an abbreviation for magnesium acetate tetrahydrate.
MgAcTDPA is an abbreviation for magnesium acetate thiodipropionate.
M/MgAcTDPA is an abbreviation for composites of montmorillonite with magnesium acetate thiodipropionate.

EXAMPLES

Example 1

Materials

Metallic magnesium powder (≥99%, mesh 325), magnesium acetate tetrahydrate (≥99%), magnesium nitrate hexahydrate (99%), 3,3'-thiodipropionic acid (TDPA, 97%), dicyandiamide (99%), and montmorillonite K10 were all obtained from Sigma Aldrich Chemical Co. and used as received. Benzoxazine resin (product designation, XU35610), ARALDITE® GT 6259 resin (bisphenol A based epoxy resin modified with an epoxy cresol novolac) and two-part curing system comprising ARALDITE® LY8601 resin and ARADUR® 8602 hardener were supplied by Huntsman Advanced Materials, Inc. (Woodlands, Tex.). ARALDITE® LY8601 is composed of bisphenol A epoxy resin (60-100%), glycidylether of C12-C14 alcohols (7-13%), and butylphenyl glycidyl ether (3-7%), whereas ARADUR® 8602 is composed principally of diethylenetriamine (13-30%), polyoxypropylene diamine (13-30%), 4-nonyl-phenol (7-13%), triethanolamine (3-7%), and 2-(2-aminoethylamino)ethanol (0.1-1%). Carbon black (Emperor 1600) was obtained from Cabot Corp. (Billerica, Mass.). All other chemicals, solvents and buffers were obtained from commercial sources and were of the highest purity available.

Syntheses

A sample of $Mg(OH)_2$ was prepared by precipitating it from an aqueous solution of magnesium nitrate by an ammonium hydroxide solution at pH 10-11. The precipitate was purified by centrifugation and resuspension cycles with deionized water, then dried at 100° C. and stored as a powder.

General Methods $^1H$ NMR spectra were taken at 400 MHz using a Bruker Avance 400 spectrometer. FTIR measurements were conducted using a Nicolet 8700 FTIR spectrometer and a Specac Smart Golden Gate Attenuated Total Reflection Accessory (ATR). Spectra of the powderous materials were measured in KBr tablets at 1 $cm^{-1}$ resolution with 64 scans, whereas electrode surfaces were subjected to ATR. A total of 128 spectra (2 $cm^{-1}$ resolution) were acquired and averaged for every sample. X-ray diffraction (XRD) spectra were acquired at room temperature for 6 h each, using an X'Pert Panalytical Pro diffractometer equipped with an X'celerator high-speed detector coupled with a Ni β-filter. Source of X-rays was Cu K-α (wavelength 1.540598 Å). Programmable divergence slits were used to illuminate a constant length of the samples (4 mm), with 0.02 soller slits. The XRD analysis for was performed using the Treor indexing method.[19] The maximum cell volume was set to less than 1500 $Å^3$, and both Pawley and mixed profile fits were used to narrow down the space group and predicted peak intensities. A manual range of peaks from 5 to 45° was used to perform the analysis, with the first 25 peaks used to carry out the fit. Thermogravimetric analysis (TGA) and simultaneous differential scanning calorimetry (DSC) were conducted using a Q600 TGA/DSC instrument (TA Instruments, Inc., New Castle, Del.). Samples were subjected to heating scans (10° C./min) under nitrogen atmosphere in a temperature ramp mode.

Analysis of the magnesium thiodipropionate surface was performed with a Physical Electronics Versaproble II X-ray photoelectron spectrometer (XPS). The analysis was performed at ultrahigh vacuum ($1 \times 10^{-8}$ bar) with an argon-gun neutralizer. The survey scans were performed with 10 cycles from 1400 to 50 eV at 200 kV with a pass energy of 80 eV and a step size of 0.5 eV. The high-resolution scans were performed at 100 kV, a pass energy of 11 eV, and 0.05 eV resolution with 30 cycles for iron and 8 cycles for the remaining elements. The surface morphology of the materials was characterized by a FEG-XL-30 field-emission SEM at 20 kV using a beam size of 3 and high-vacuum conditions, and a ZEISS Merlin High-Resolution SEM at 15 kV under high vacuum.

Synthesis and Properties of an Exemplary Thioether Salt

A. Synthesis

A mixed salt of magnesium acetate and thiodipropionic acid (magnesium acetate thiodipropionate, MgAcTDPA) was prepared as follows. Magnesium acetate tetrahydrate (Sigma Aldrich, 99%, 2.14 g, 1 mmol) and thiodipropionic acid (Sigma Aldrich, 98%, 1.78 g, 1 mmol) were dissolved in deionized water (50 mL) and the solution was evaporated on air at 60° C. for 16 h, resulting in a transparent glassy solid. The product was redissolved in 50 mL deionized water and the solution was snap-frozen in liquid nitrogen and lyophilized to dryness for 5 days at 10 mTorr vacuum resulting in glassy snow-like whitish to transparent crystals of MgAcTDPA. $^1$H NMR (400 MHz, D$_2$O): δ, ppm 2.68 (t, —S—CH$_2$), 2.42 (t, —C(═O)CH$_2$), 1.87 (s, —C(═O)CH$_3$). Elemental analysis (found: C, 34.33; H, 5.45; Mg, 6.01; S, 12.51; calculated, based on chemical formula $C_{58}H_{110}Mg_5O_{52}S_8$: C, 34.53; H, 5.50; Mg, 6.02; S, 12.71).

Figure 4:
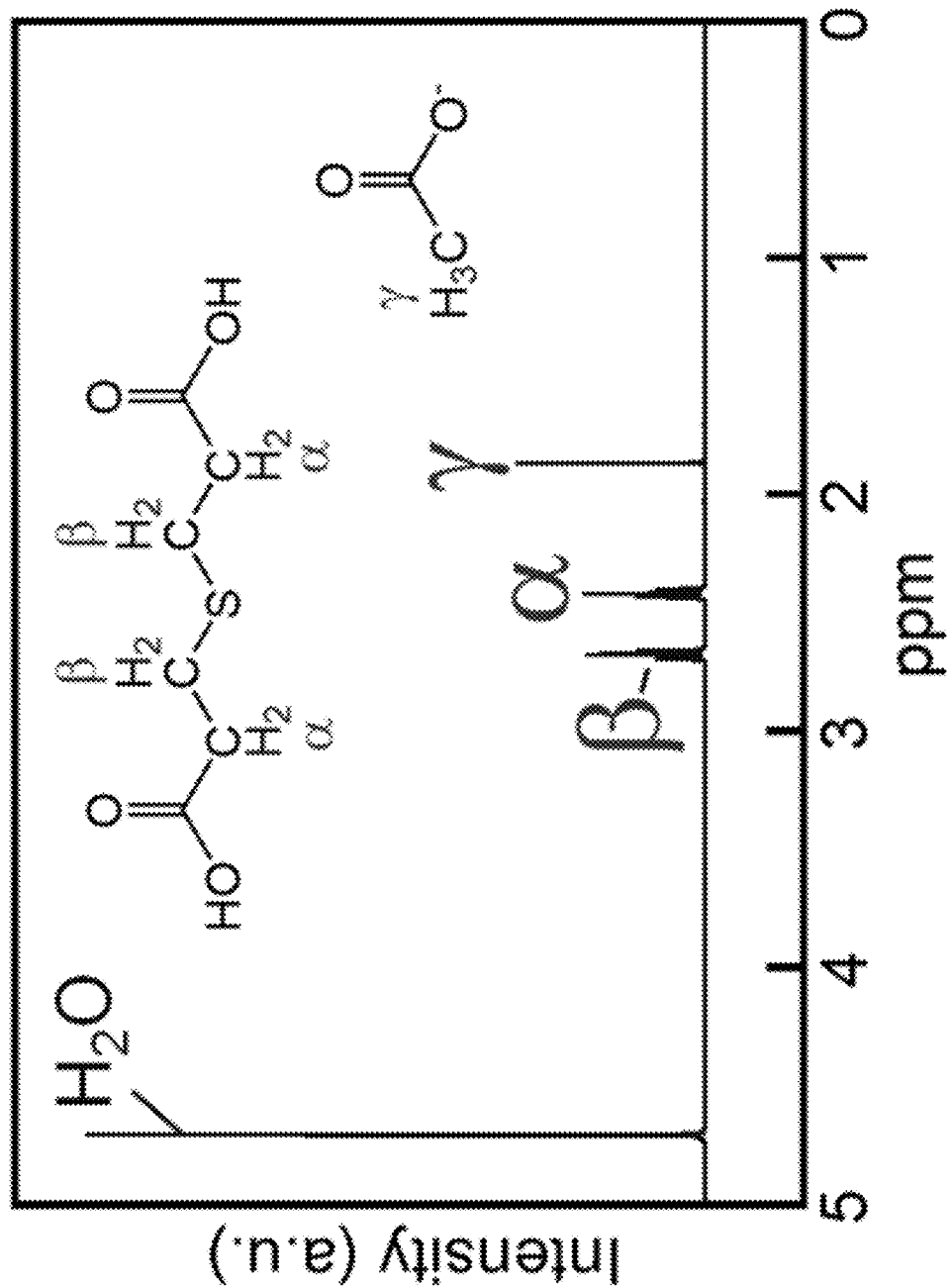
FIG. 4 shows a proton NMR (400 MHz, $D_2O$) spectrum of an exemplary magnesium salt, MgAcTDPA. Proton assignments to acetate and TDPA are shown on the spectrum.

The crystals were hygroscopic and converted to caramel-like, pasty solid on standing in an open jar at 80% relative humidity. The original dry crystals of the MgAcTDPA material were subjected to $^1$H NMR (FIG. 4), elemental (FIG. 5) and TGA/DSC (FIG. 6) analyses. Thermogravimetric analysis (TGA) and simultaneous differential scanning calorimetry (DSC) were conducted using a Q600 TGA/DSC instrument (TA Instruments, Inc.). Samples were subjected to heating scans (10 or 20° C./min) in a temperature ramp mode under nitrogen atmosphere.

B. NMR Spectroscopy

Figure 5:
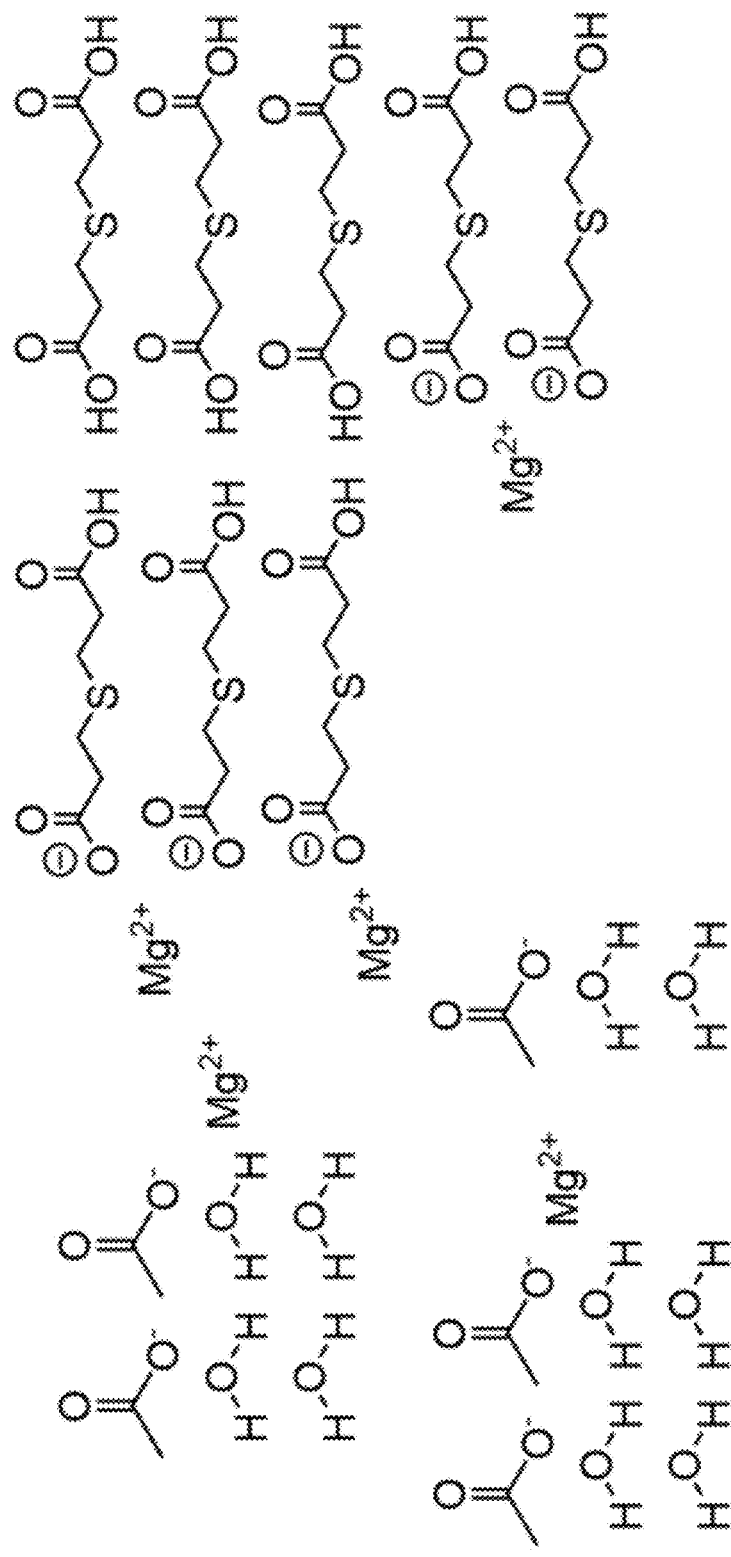
FIG. 5 shows a model composition of an exemplary mixed salt (MgAcTDPA) fraction that matches composition experimentally found from elemental analysis.
Figure 6:
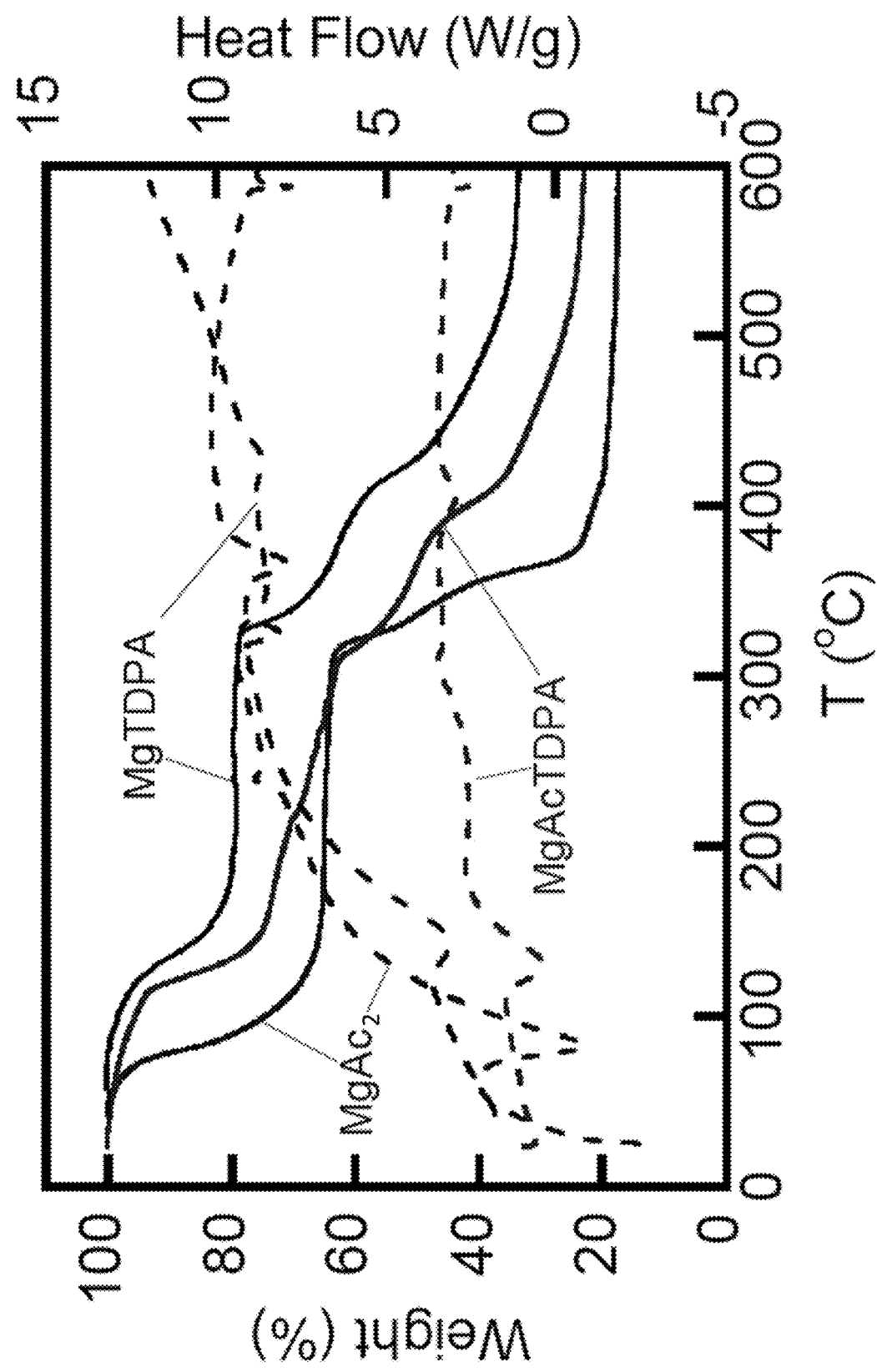
FIG. 6 shows thermogravimetric analysis (TGA) and differential scanning calorimetry (DSC) analysis of an exemplary salt (magnesium thiodipropionate, $MgTDPA_{1:1}$), an exemplary mixed salt (MgAcTDPA), and its parent salt, magnesium acetate tetrahydrate ($MgAc_2$), at a 10° C./min temperature ramp in nitrogen atmosphere. Solid and dashed lines show the weight % and heat flow, respectively.

Integration of the proton signals (FIG. 4) revealed that α:β signal ratio was 1:1, indicating the preservation of the TDPA structure in the process of the mixture drying. The α:γ triplet-to-singlet ratio was measured to be 2.29, revealing that the thiodipropionate:acetate molar ratio in the resulting MgAcTDPA salt was ca. 1.7:1.0 instead of the original 1:2. The significant relative reduction in the acetate content in the mixture occurred due to the acetic acid volatility being much higher than that of TDPA, thus leading to partial acetate evaporation. The signal integration further showed that the MgAcTDPA crystals retained approximately 3.9-fold molar excess of water relative to the acetate content. The modeled composition of the MgAcTDPA fraction is shown in FIG. 5.

C. Thermogravimetric Analysis (TGA)

Thermogravimetric analysis (FIG. 6) shows that the properties of the mixed MgAcTDPA salt resembled those of the parent MgAc$_2$, with the multistep, over 30 wt % endothermic weight loss due to the dehydration above 110° C. and decomposition over 200° C. The presence of the TDPA along with the acetate in MgAcTDPA made the decomposition process to occur via multiple steps. In contrast, the thermogram of MgAc was well-defined demonstrating endothermic loss of water at around 83° C. (heat of transition, 179 J/g) and multistep endothermic decomposition in the range of 315 to 400° C. (total heat of transition, ~380 J/g), which correlated well with the data reported previously.[20,21] As-received TDPA exhibited endotherms at 105° C. and 128° C. (departure from baseline), corresponding to the morphology change between crystalline phases and crystal melting, respectively. Decomposition of TDPA occurred endothermically at T>220° C. The TDPA presence in MgTDPA and MgAcTDPA was evident in endothermic melting peaks with onsets at 108° C. and 112° C., respectively. Degradation of MgAcTDPA occurred via multiple steps above 200° C., whereas degradation of MgTDPA was sharper and occurred at temperatures above 340° C. Importantly, MgTDPA and MgAcTDPA lost approximately 20% and 24% at 170° C., respectively, indicating the presence of significant amount of hydrate water in these compounds. Without being bound by any theory, such water may enhance the Lewis acid/base properties and catalytic effect of magnesium thiodipropionates in reactive organic coatings. Overall, the thermal properties such as softening and dehydration at >150° C. and decomposition at >300° C. make these materials suitable as additives to powder coatings, most of which possess a melting temperature around 150° C., and are cured at around 200° C.

The content of magnesium in the MgAcTDPA sample was 2.5 meq/g, which is approximately equal to or higher than the ion-exchange capacity of the acid polymeric ion-exchange resin AMBERLTE™ IR120 (Dow Chemical Company) ion-exchanged with magnesium.[1] The process of drying disclosed herein can be made at temperatures from ambient to 100° C., preferably under vacuum. The initial ratio between magnesium acetate and TDPA can be conveniently varied to achieve a desired magnesium concentration and additional components enabling desired corrosion inhibitive pigment characteristics can be used. Testing of MgAcTDPA dissolution revealed unlimited aqueous solubility of the salt at room temperature. The salt also dissolved in warm ethanol yielding at least 10 wt % concentration.

D. X-Ray Powder Diffraction (XRPD)

Figure 7:
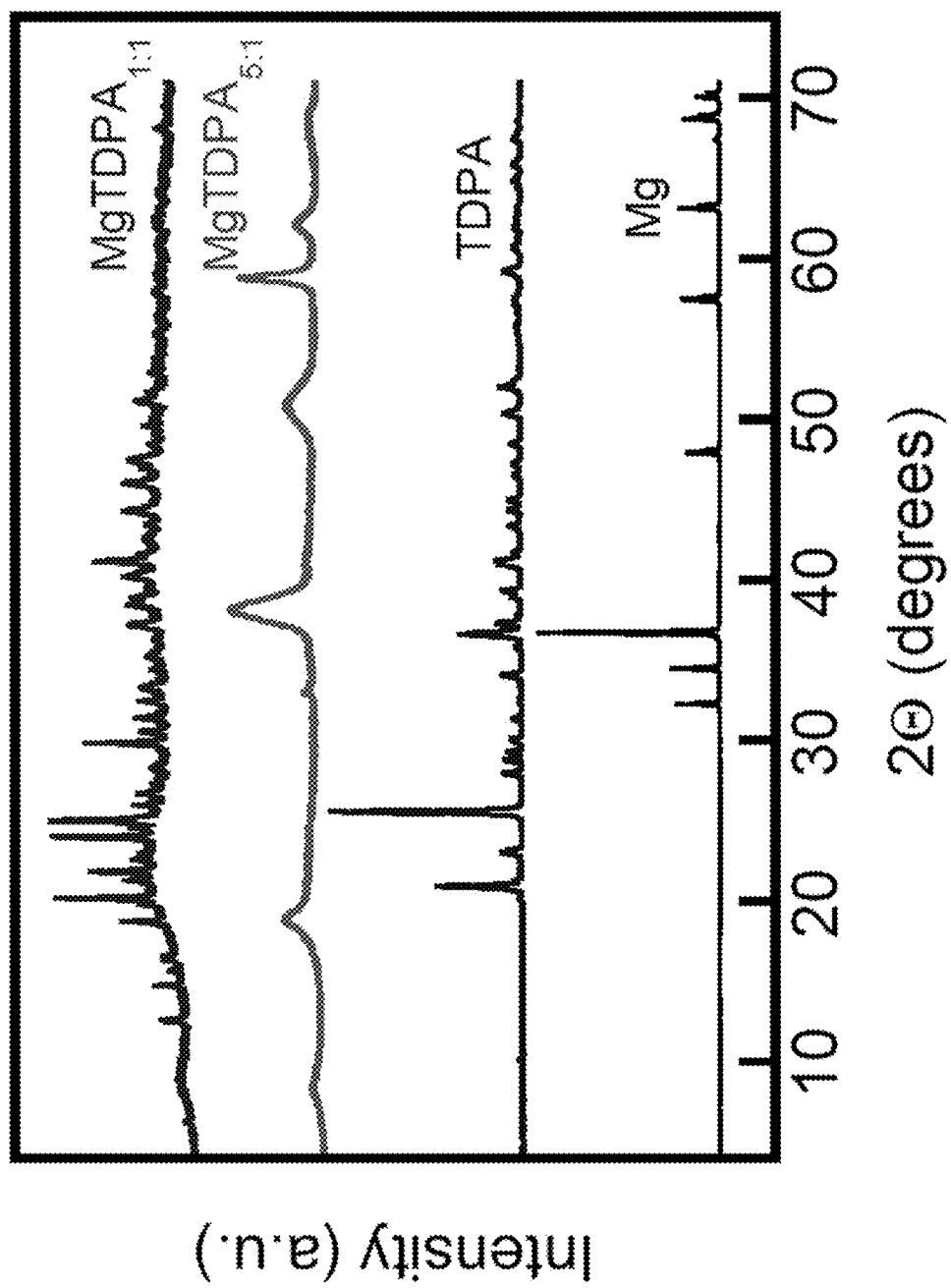
FIG. 7 shows X-ray powder diffraction (XRPD) pattern of parent magnesium (Mg), thiodipropionic acid (TDPA), and magnesium thiodipropionate prepared with magnesium: thiodipropionate stoichiometric ratio of 1:1 ($MgTDPA_{1:1}$) and 5:1 ($MgTDPA_{5:1}$).

The MgTDPA salts resulting from the substitution reaction were crystalline compounds as evidenced by X-ray powder diffraction (XRPD) patterns (FIG. 7). The MgTDPA$_{1:1}$ species prepared from 1:1 stoichiometric ratio of magnesium and TDPA exhibited a high degree of crystallinity, including the presence of low 2θ angle peaks, which point to large, ordered unit cells. Subtraction of the amorphous contribution from the background and refinement of the XRPD spectrum fitting indicated a unique mixed phase structure that did not match any of the compounds listed in the Cambridge Structural Database (CSD), including specific searches for existing organic magnesium salts. The mixed-fit analysis yielded a triclinic SG1 space group, with the unit cell parameters being a(Å)=6.727, b(Å)=12.864, and c(Å)=14.645 Å, α(°)=92.567, β(°)=73.054, γ(°)=111.428. For comparison, the orthorhombic crystal structure of TDPA grown from warm aqueous solutions that were left to evaporate at room temperature has been resolved using single-crystal diffractometry: Pcan (Pbcn), a(Å)=5.063(1), b(Å)=8.648(1), c(Å)=18.073(2), U=791.3 Å$^3$. The synthesis of MgTDPA via replacement reaction (FIG. 3) in aqueous solution followed by lyophilization precluded formation of sufficiently large MgTDPA crystals, and hence, no single-crystal diffraction peaks were visible. Nevertheless, the powder XRPD patterns confirm a unique MgTDPA$_{1:1}$ structure that is different from the parent TDPA (FIG. 7).

Attempts to grow MgTDPA crystals by evaporating warm (40-80° C.) aqueous solutions of the Mg/TDPA reaction mixtures lead to TDPA crystallizing separately from magnesium salts, so that the powder XRD patterns of the products prepared in that fashion were indistinguishable from the original TDPA patterns. The powder XRPD spectrum of MgTDPA$_{5:1}$ species obtained from a 5:1 stoichiometric ratio of magnesium and TDPA starting materials (see Example 4) appeared to contain both broad and sharp peaks, indicating the presence of a significant fraction of amorphous phase with a second, crystalline phase embedded into the former. Elemental analysis and solubility studies demonstrated that MgTDPA$_{5:1}$ contained at least 40 wt % of water-insoluble magnesium hydroxide. The crystal structure of Mg(OH)$_2$ (unit cell parameters, a(Å)=3.142(1), b(Å)=3.142(1), and c(Å)=4.766(2), α(°)=90, β(°)=90, γ(°)=120) has been resolved. The somewhat broadened 20 angle peaks at 18, 37, 50, 57, and 64° in the powder XRPD of MgTDPA$_{5:1}$ clearly point to the presence of [001], [101], [102], [110] and [111] reflections, respectively, in the magnesium hydroxide crystals, which are present in the MgTDPA$_{5:1}$ material. In contrast to the MgTDPA materials, mixed magnesium acetate thiodipropionate salt (MgAcTDPA) appeared as amorphous glassy solid devoid of any crystalline features in its powder XRPD pattern.

E. X-Ray Photoelectron Spectroscopy (XPS)

Figure 8:
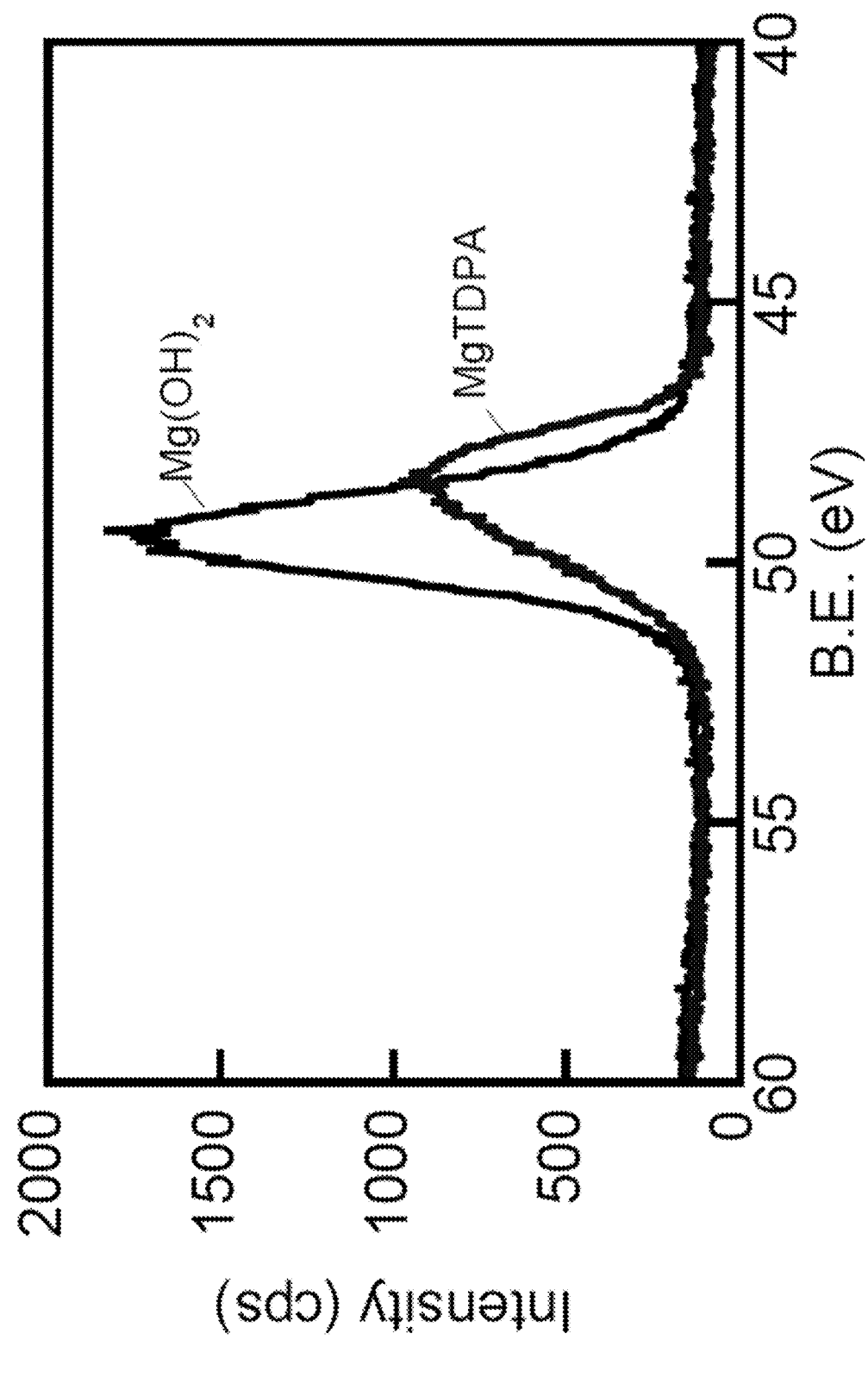
FIG. 8 shows X-ray photoelectron spectroscopy (XPS) spectra of the Mg 2p peak of magnesium hydroxide (Mg$(OH)_2$) and $MgTDPA_{1:1}$ (MgTDPA).

The electronic environment of magnesium in the newly obtained magnesium thiodipropionates can be highlighted by X-ray photoelectron spectroscopy (FIG. 8). The binding energy (BE) of Mg 2p peaks of magnesium hydroxide and that of magnesium thiodipropionate (MgTDPA$_{1:1}$) were observed at 49.2 and 48.5 eV, respectively (FIG. 8). The BE value for Mg(OH)$_2$ corresponded well with the value reported previously.[22] The shift of BE in magnesium thiodipropionate to less electronegative values indicates that the Mg$^{2+}$ cation in MgTDPA is less positive than in Mg(OH)$_2$. This is an interesting observation considering that Mg$^{2+}$ cation is less positive in magnesium hydroxide than in common magnesium salts such as magnesium chloride, nitrate or carbonate. Electron donating (Lewis base) groups such as OH– and, to a larger extent, thiodipropionate anions render Mg$^{2+}$ cation less positive and shift the BE to lower values. Without being bound by any theory, the electron donating, radical trapping properties of thiodipropionic acid and its derivatives may explain their reported utilization as food and polymer antioxidants, especially in synergistic mixtures with substituted phenols.

Example 2

Synthesis and Properties of Composite Pigment Particulates with an Exemplary Thioether Salt Pigment particulates were prepared from Montmorillonite K 10 clay (surface area, 220-270 m$^2$/g, Sigma Aldrich Chemical Co.) modified by a mixed magnesium acetate thiodipropionate (MgAcTDPA) salt. The initial montmorillonite K-10 possessed the following chemical composition (average value): SiO$_2$ (73.0%), Al$_2$O$_3$ (14.0%), Fe$_2$O$_3$ (2.7%), CaO (0.2%), MgO (1.1%), Na$_2$O (0.6%), K$_2$O (1.9%).[23] The clay was used as received. For the material synthesis, magnesium acetate tetrahydrate (MgAc, 4.28 g, 2 mmol), thiodipropionic acid (1.78 g, 1 mmol) and montmorillonite K 10 (1.1 g) were dispersed in 50 mL anhydrous ethanol and the mixture was briefly sonicated. A cloudy, but well-dispersed suspension was obtained. The suspension was purged by nitrogen flow and then dried at 60° C. for 3 days. The obtained solid was optionally ground into fine particulates using mortar and pestle. The fine pigment particulates were further ground to attain a suitable particle size (<20 μm diameter) for inclusion in primer formulations.

Figure 9:
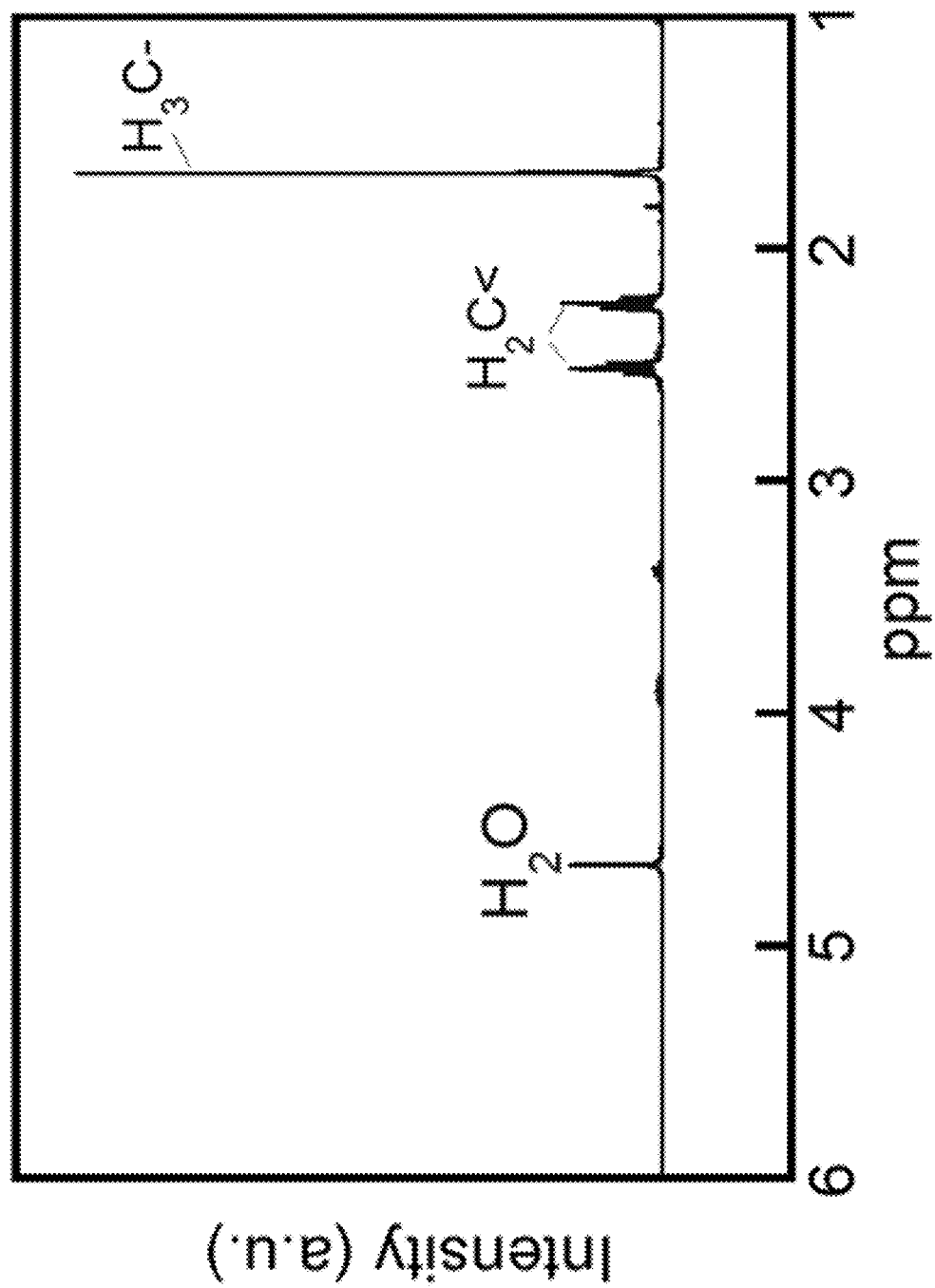
FIG. 9 shows a proton NMR (400 MHz, $D_2O$) spectrum of an exemplary mixed salt (MgAcTDPA) extracted from a composite montmorillonite intercalated with MgAcTDPA using ethanolic solution. Proton assignments to water, acetate ($H_2C<$) and TDPA ($H_3C-$) are shown on the spectrum.

For NMR analysis, the pigment particulates (50 mg) were suspended in 1 mL D$_2$O and the suspension was briefly sonicated; the undissolved particulates were removed by centrifugation (15,000 rpm, 45 s). The supernatant was subjected to $^1$H NMR (400 MHz) (FIG. 9). The NMR spectrum in FIG. 9 showed a water content significantly reduced compared to the spectrum of Example 1 (FIG. 4), where MgAcTDPA was obtained by drying the mixture of MgAc and thiodipropionic acid from water. Drying from ethanolic solution enabled removal of a substantial fraction of the hydrate water initially bound to MgAc. Elemental analysis confirmed the composition of the MgAcTDPA extracted from montmorillonite K 10. Elemental Analysis, found: C, 33.03; H, 5.51; Mg, 9.53; S, 6.12, calculated based on chemical formula: C$_{54}$H$_{110}$Mg$_8$O$_{59}$S$_4$: C, 32.01; H, 5.47; Mg, 9.60; S, 6.33.

Figure 10:
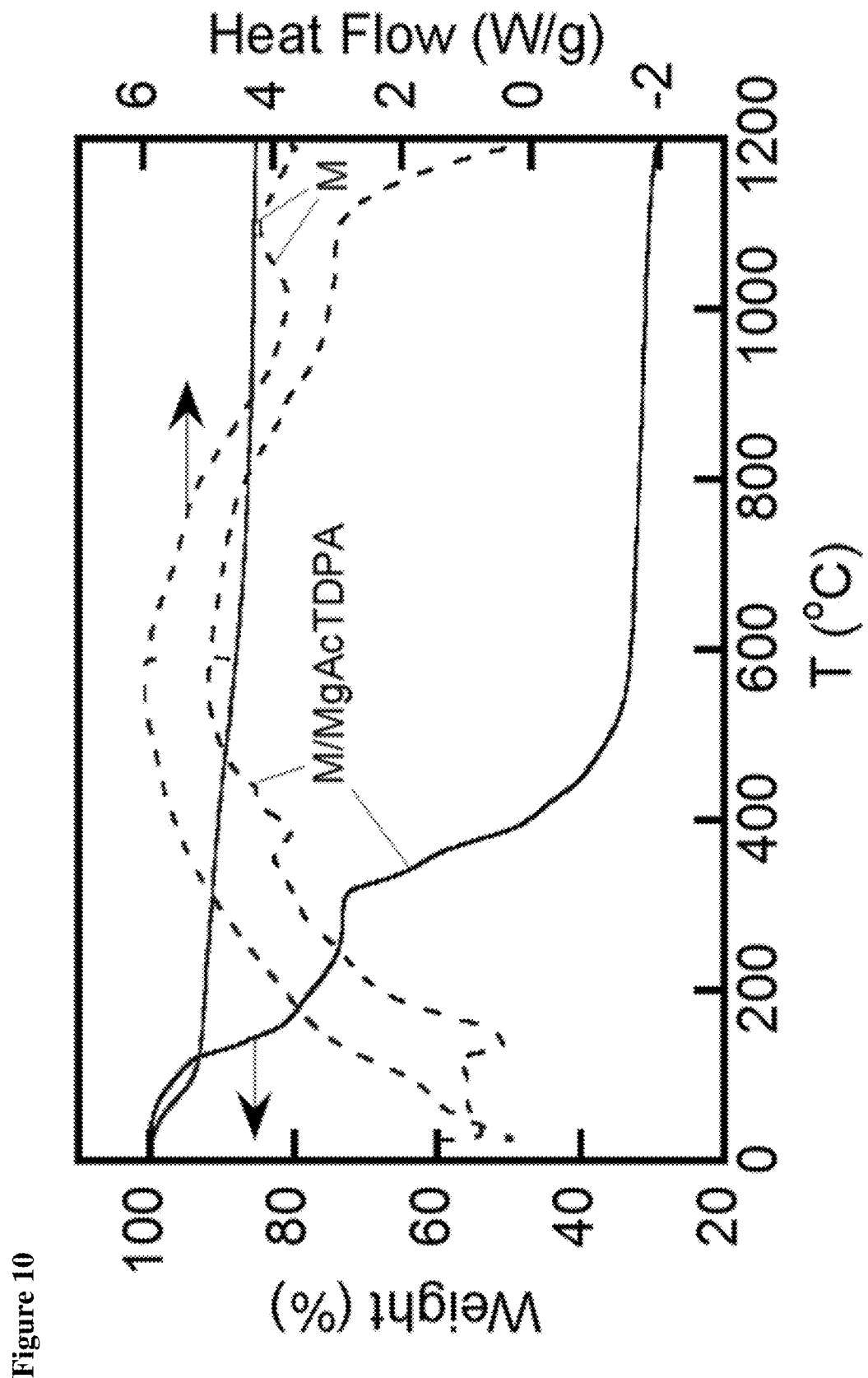
FIG. 10 shows TGA of as-received montmorillonite K 10 (M) and the same clay loaded with an exemplary mixed salt, magnesium acetate thiodipropionate, (M/MgAcTDPA) as described in Example 2. Temperature ramps at 20° C./Min in nitrogen atmosphere. Solid and dashed lines show the weight % and heat flow, respectively.

FIG. 10 shows TGA/DSC thermograms of montmorillonite as received and the resulting pigment composed of montmorillonite K 10 loaded with MgAcTDPA (M/MgAcTDPA) as described above. The weight loss comparison shows that the M/MgAcTDPA composite material consisted of approximately 69% of the organic and residual aqueous phase that decomposed and volatilized at temperatures above 400° C., with the remaining 31% comprising clay alumosilicates. The original clay lost approximately 8-10% due to moisture and any adsorbed VOC at temperatures at or above 180° C. and retained over 85% of the original weight at 1200° C. Endothermic peaks appearing on the heat flow thermogram of the M/MgAcTDPA material centered at 150° and 390° C. areas corresponded to the dehydration/acetate decomposition and thiodipropionate salt decomposition processes, respectively. These peaks were absent in the thermogram of the as-received montmorillonite.

Example 3

Synthesis and Properties of Exemplary Thioether Salts Containing Stoichiometric Proportions of an Alkaline Earth Metal and Acid Salts of magnesium and thiodipropionic acid (MgTDPA$_{1:1}$) and magnesium and 3,3'-dithiodipropionic acid (MgDTDPA) were prepared from stoichiometric amounts of magnesium and corresponding acid by simple replacement reactions (FIG. 3) as follows.

A. MgTDPA$_{1:1}$

Metallic magnesium powder (≥99%, mesh 325, Sigma Aldrich Chemical Co., 200 mg, 8.23 mmol) was placed in an aqueous solution of 3,3'-thiodipropionic acid (97%, Sigma Aldrich Chemical Co., 1.466 g, 8.23 mmol) in 30 mL DI water (initial solution pH 1.89), and the mixture was stirred at room temperature for 24 h, at which point all magnesium particles completely dissolved leaving a clear solution. Hydrogen evolution ceased and pH in the solution was measured to be 5.1. The entire solution was snap-frozen in liquid nitrogen and lyophilized for 2 days until it was a constant weight. The resulting compound appeared as white crystalline powder of irregularly shaped particles. After 7 days of lyophilization, the resulting compound appeared as transparent crystalline powder. Elemental Analysis, found: C, 34.04; H, 5.30; Mg, 12.04; S, 15.22, calculated based on chemical formula: $C_6H_8MgS$: C, 35.94; H, 4.02; Mg, 12.12; S, 15.99. $^1H$ NMR (400 MHz, $D_2O$): δ, ppm 2.67 (t, —S—CH2), 2.38 (t, —C(=O)$CH_2$).

B. MgDTDPA

Metallic magnesium powder (≥99%, mesh 325, Sigma Aldrich Chemical Co., 200 mg, 8.23 mmol) was placed in an aqueous solution of 3,3'-dithiodipropionic acid (99%, Sigma Aldrich Chemical Co., 1.730 g, 8.23 mmol) in 30 mL DI water (initial solution pH 2.2), and the mixture was stirred at room temperature for 24 h, at which point all magnesium particles completely dissolved leaving a clear solution. Hydrogen evolution ceased and pH in the solution was measured to be 5.4. The entire solution was snap-frozen in liquid nitrogen and lyophilized for 2 days until it was a constant weight. The resulting compound appeared as white crystalline powder of irregularly shaped particles. Elemental Analysis, found: C, 28.51; H, 5.42; Mg, 9.61; S, 27.10, calculated based on chemical formula: $C_6H_8MgS_2$: C, 30.99; H, 3.47; Mg, 10.45; S, 27.57.

Thermogravimetric analysis (FIG. 6) shows approximately 20 wt % endothermic weight loss due to the dehydration above 110° C. and a sharp two-step decomposition in the range above 320° C. for $MgTDPA_{1:1}$. The higher temperatures of the $MgTDPA_{1:1}$ decomposition than MgAcTDPA and resemblance of the $MgTDPA_{1:1}$ and $MgAc_2$ thermograms (FIG. 6) indicate a similar ionic salt nature of the magnesium thiodipropionate and magnesium acetate compounds.

Example 4

Synthesis and Properties of an Exemplary Thioether Salt at Molar Ratios of 5 to 1

Figure 11:
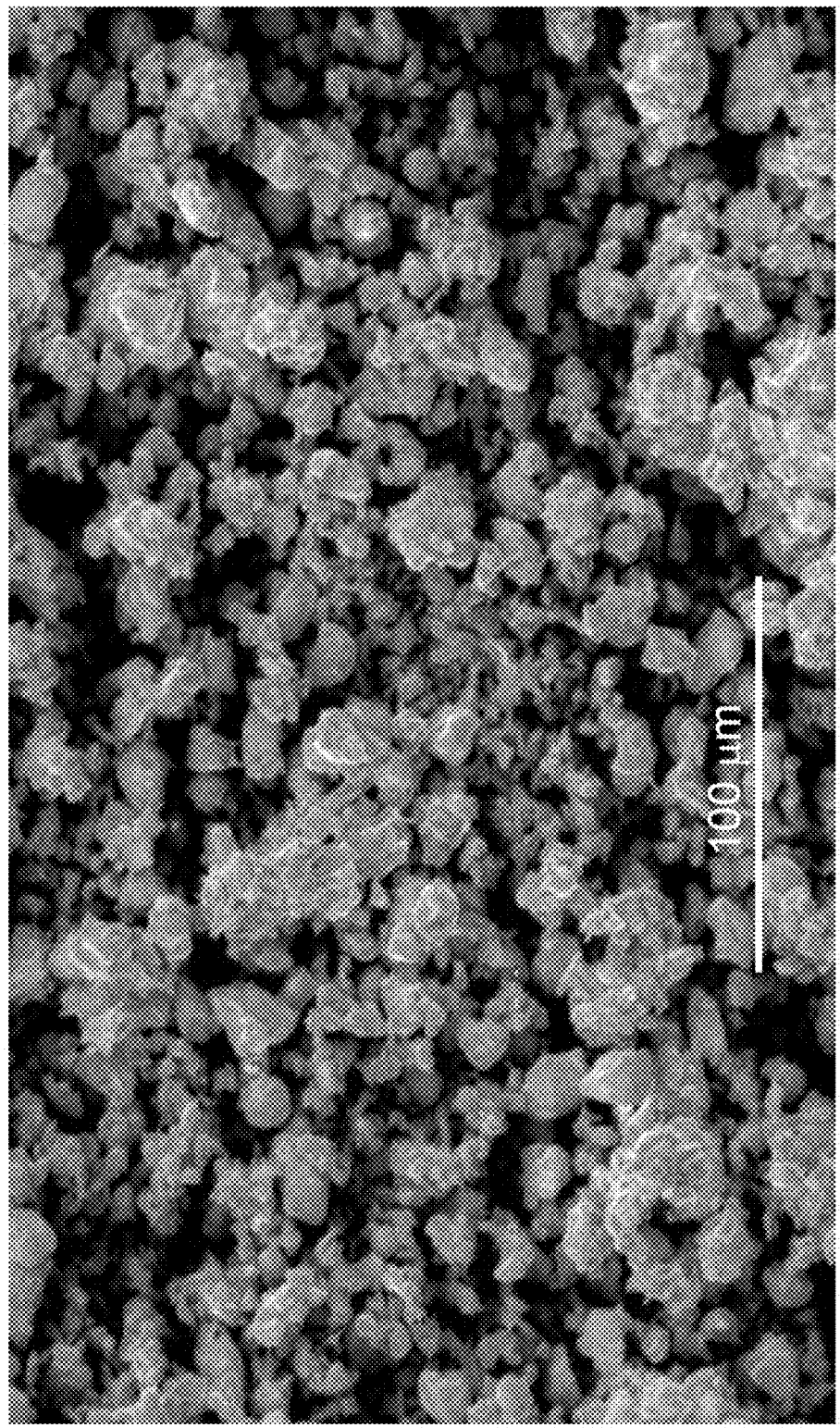
FIG. 11 shows SEM microphotograph of the particulates comprising the test powder coating composition with MgTDPA as the corrosion inhibitor.

A salt of magnesium acetate and thiodipropionic acid ($MgTDPA_{5:1}$) was prepared with 5-fold molar excess of magnesium relative to thiodipropionic acid as follows. Metallic magnesium powder (≥99%, mesh 325, Sigma Aldrich Chemical Co., 1.0 mg, 41.15 mol) was placed in an aqueous solution of 3,3'-thiodipropionic acid (97%, Sigma Aldrich Chemical Co., 1.466 g, 8.23 mmol) in 50 mL DI water (initial solution pH 1.89), and the mixture was stirred at room temperature for 48 h, at which point all hydrogen evolution ceased. pH in the solution was measured to be 7.2. Magnesium hydroxide/TDPA particles were observed forming a stable suspension, which was snap-frozen in liquid nitrogen and lyophilized for 2 days until it was a constant weight. The resulting compound appeared as white powder of irregularly shaped particles sized 5-50 micron (FIG. 11). Elemental Analysis, found: C, 22.14; H, 4.54; Mg, 40.01; S, 9.51, calculated based on chemical formula: $C_6H_8Mg_5S$: C, 24.21; H, 2.71; Mg, 40.82; S, 10.77.

Thermogravimetric analysis of $MgTDPA_{5:1}$ (FIG. 6) shows no appreciable weight loss due to water evaporation and a well-defined two-step endothermic decomposition with approximately 40% weight loss in the range above 300° C.

Example 5

Corrosion Inhibition in Aqueous Salt Media

Corrosion inhibitive properties of magnesium acetate thiodipropionate (MgAcTDPA) prepared as in Example 1 were evaluated in aqueous 3.5 wt % (0.6 M) NaCl solutions.

The electrochemical open-to-air cell (PTC1™ Paint Test Cell, Gamry Instruments, Warminster, Pa.) was utilized for the potentiodynamic polarization (Tafel tests) and electrochemical impedance spectroscopy experiments. The electrochemical cell was composed of working electrode made of galvanized steel (zinc-galvanized sheets of type B carbon steel, ASTM A653, total thickness 0.305 mm, working area 2.2 $cm^2$ or 15.2 $cm^2$, McMaster Carr Supply Co., Robbinsvill, N.J.), reference Ag/AgCl electrode, and Pt wire auxiliary electrode (BASK) Corp., West Lafayette, Ind.). Prior to the immersion in the electrolyte (3.5% NaCl, pH adjusted to 5.25-5.3, 40 mL), the working electrodes were washed by acetone, ethanol, dried by nitrogen flow and polished with P1200 grit.[24] The working electrode was immersed into electrolyte containing the tested compound at a given concentration with desired pH at 25° C. for 60 min prior to each measurement. The electrolyte was equilibrated with open air at a slightly acidic pH 5.6, which is above the $pK_a$ of 4.11 of thiodipropionic acid (TDPA). TDPA is a dicarboxylic acid with $pK_a1$ and $pK_a2$ equal to 3.87 and 4.68, respectively. Hence, at pH 5.6 most of the carboxylic groups are dissociated. The carbon steel used herein was coated with the average minimum coating thickness per ASTM A653 being 2.0 mils (0.0508 mm) per surface. Tafel tests (ASTM GS) were conducted using a Parstat PMC-2000 multichannel potentiostat equipped with Versa Studio 2.50.3 software (Princeton Applied Research, Oak Ridge, Tenn.). Tafel tests were modeled with a ZSIMPWIN™ software for complex nonlinear least square analyses fitting the circuit models of the electrode interface to the Nyquist amplitude of 10 mV at the open circuit potential in the frequency range of 100 kHz to 0.2 Hz. Parameters for Tafel tests were as follows: initial potential, −1.25 V (vs reference); final potential, −0.45 V; scan properties: step height, 0.5 mV, step time, 2 s. In a series of measurements with the corrosion inhibiting additives, a range of the additive concentrations was studied and the scan range was set from 150 mV below the open circuit voltage (OCV) to 200 mV more positive than the OCV, with three measurements for each condition. The range in these measurements was limited in order to minimize the cathodic polarization causing local pH changes.

Figure 12:
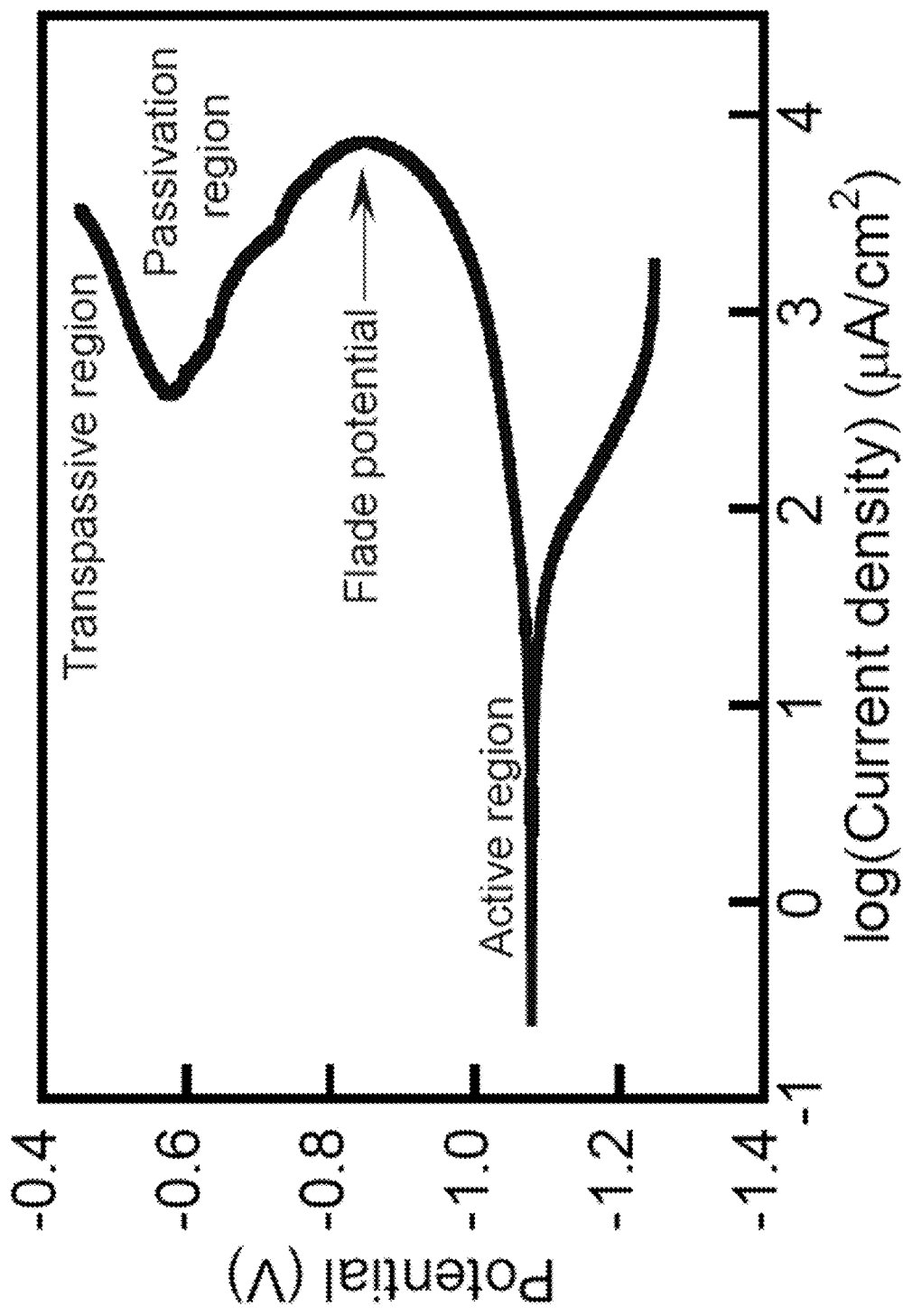
FIG. 12 shows exemplary potentiodynamic polarization curve for a specimen of galvanized steel as the working electrode in 3.5% NaCl with MgAcTDPA (effective concentration, 2.5 mg/mL) added. pH=5.3, T=25° C.

The results of a typical potentiodynamic polarization experiment with a specimen of galvanized steel in 3.5% NaCl with MgAcTDPA added are shown in FIG. 12. As is seen in FIG. 12, the behavior of galvanized steel in the presence of TDPA anions can be described as active-passive. As the potential increases above a certain $E_{corr}$, the current increases exponentially, as is expected for an actively dissolving metal: $Zn \rightarrow Zn^{2+}+2e^-$. However, at a certain Flade potential, the trend reverses and the current decreases because of the formation of a passive oxide film. In the passivation region, the current density is decreasing with the potential and increases again at a higher potential due to the breakdown of the passive film by localized corrosion or by transpassive reactions such as oxygen evolution. The breakdown potential corresponding to the instability of the oxide film and pitting corrosion is increased by the presence of thiodipropionate salts. It was observed that at 1-2 mM $MgTDPA_{1:1}$ concentrations and above in the electrolyte, the breakdown potentials increased. Without being bound by any theory, the potential increase may be due to the thiodipropionate adsorption reinforcing the passive film by blocking the $Cl^-$ ions at the active site, thus inhibiting nucleation of pits.

Formation of large quantities of fluffy precipitates of white rust (approximate composition by elemental analysis, $3Zn(OH)_2 \cdot ZnCO_3 \cdot H_2O$) on the surface of a steel working electrode in the active region was observed in 3.5% NaCl solution without any additives, but the presence of millimolar or higher concentrations of MgAcTDPA, MgTDPA, or TDPA to the electrolyte solution visibly reduced the formation of white rust, instead facilitating formation of gray layers of passivated material on the steel surface. It must be noted that the white rust, albeit superficial, can seriously degrade the quality and adhesion of the coating if the surfaces of the steel are to be overpainted. In contrast, formation of the passivation layer of zinc-thiodipropionate complex can enhance the adhesion of the paint components.

Figure 13:
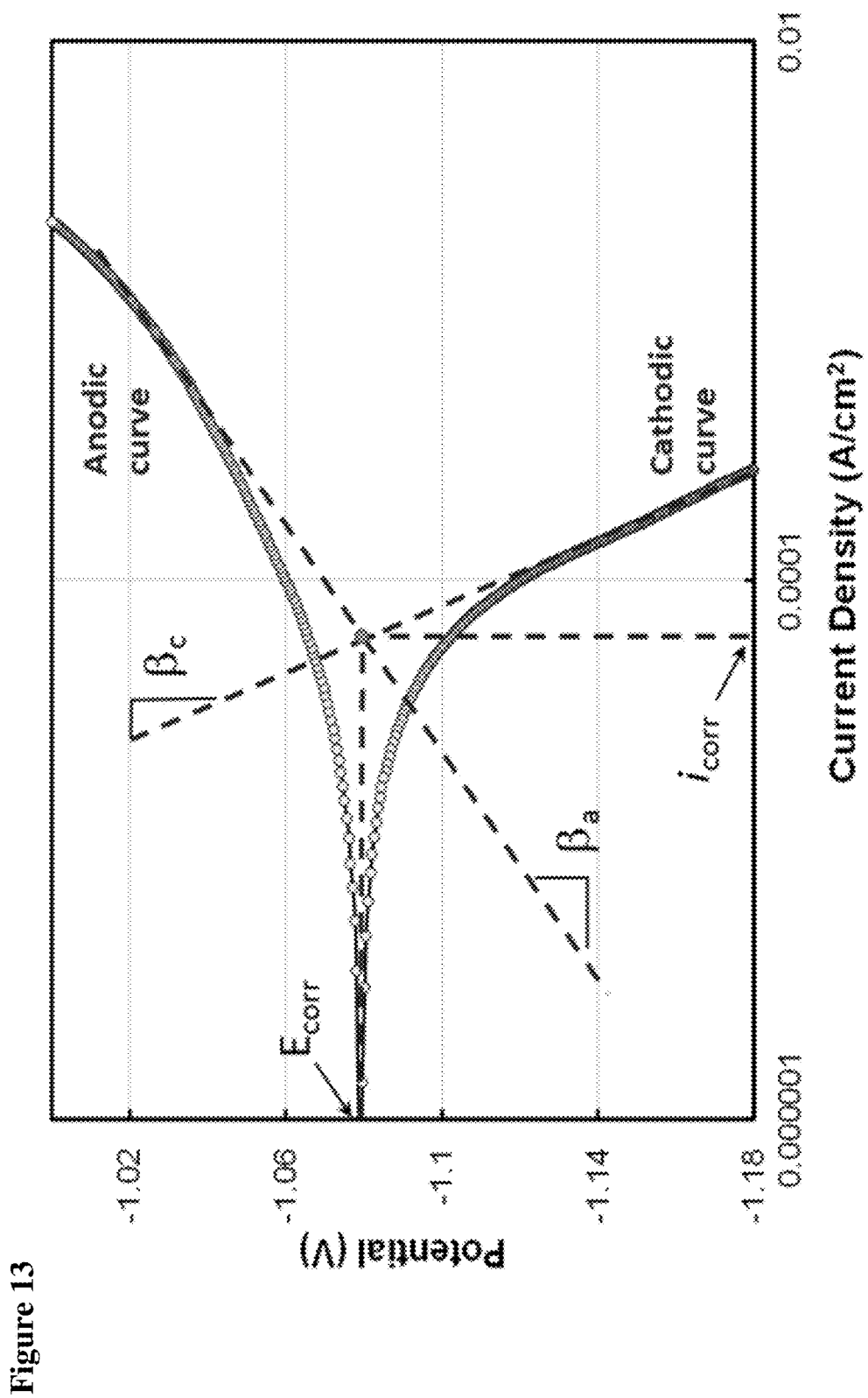
FIG. 13 shows an exemplary Tafel plot resulting from a potentiodynamic polarization experiment with a specimen of galvanized steel in 3.5% NaCl with MgAcTDPA (effective concentration, 8.4 mM) added. pH=5.25, T=25° C. The Tafel extrapolation depicts the corrosion potential ($E_{corr}$), the corrosion current ($i_{corr}$), and cathodic and anodic betas.

In the vicinity of $E_{corr}$ both currents are present in the specimen, but experimentally it is possible to measure only the net current. The net current has a single measurable polarity, either positive or negative. At $E_{corr}$ the net measured current is exactly zero. The corrosion current ($i_{corr}$) is expressed as (for definitions, see FIG. 13):

$$i_{corr} = \frac{\beta_a \beta_c}{2.3(\beta_a + \beta_c)} \times \frac{\Delta i}{\Delta E}$$

Hence, the corrosion current can be related directly to the corrosion rate (units are mils per year, or mpy) via the expression:

$$CR\,(mpy) = \frac{0.13 I_{corr}(E.W.)}{d}$$

where E.W. is the equivalent weight of the corroding species, g. In this case, the corroding species is Zn, so E.W.=32.7 g. $I_{corr}$, is the corrosion current density in $\mu A/cm^2$, and d is the density of the corroding species. Density of zinc is 7.140 $g/cm^3$.

From the $i_{corr}$ values, inhibitor efficiencies (IE, %) were calculated as (equation (1)):

$$IE(\%) = \frac{i_{corr}(\text{control}) - i_{corr}(\text{inhibitor})}{i_{corr}(\text{control})} \times 100$$

Figure 14:
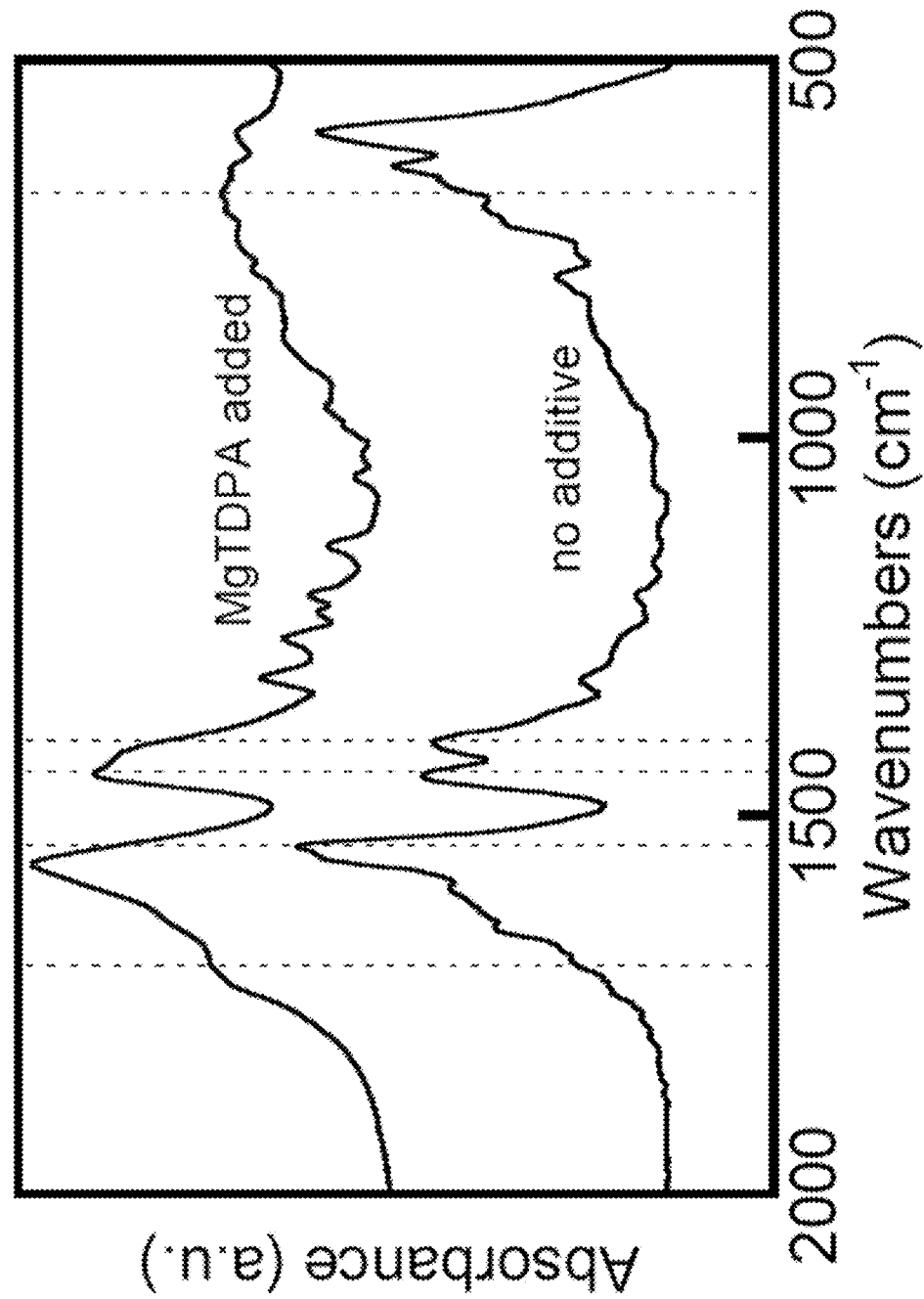
FIG. 14 shows FTIR-ATR spectra of the galvanized steel electrode surface after potentiodynamic electrochemical experiments with 3.5% NaCl electrolyte without additives and with the same electrolyte containing 10 mg/mL $MgTDPA_{1:1}$ (MgTDPA) as an additive. Vertical dotted lines indicate the following spectral assignments: 1720 cm$^{-1}$, C=O stretching vibrations of TDPA$^-$; 1537 cm$^{-1}$ and 1398 cm$^{-1}$, stretching vibrations of the carbonate ion in hydrozincite [$Zn_5(CO_3)_2(OH)_6$] and simonkolleite [$Zn_5(OH)_8Cl_2.H_2O$]; 1440 cm$^{-1}$, symmetric COO$^-$ stretching of the carboxylate anion; and 671 cm$^{-1}$, $v_s$ (C—S) stretching vibrations of TDPA$^-$.
Figure 15:
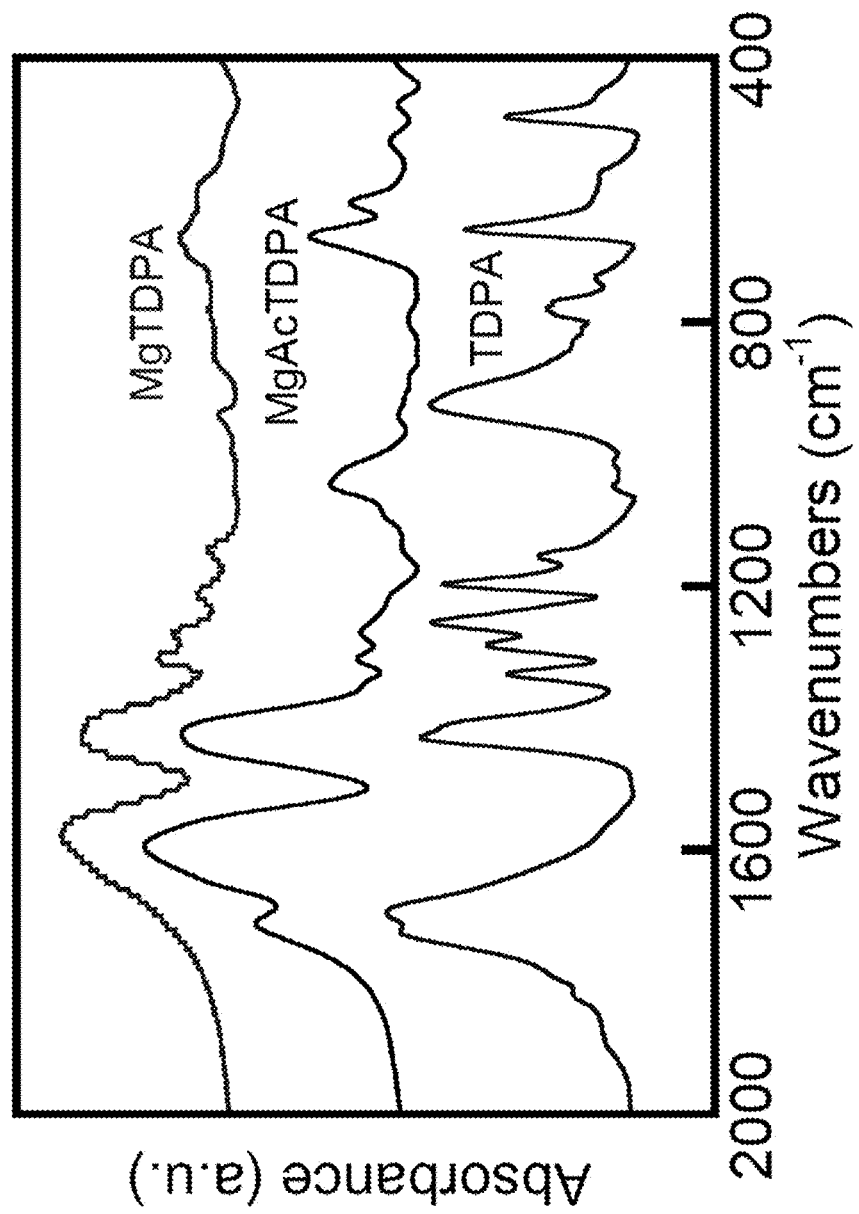
FIG. 15 shows FTIR spectra of as-made $MgTDPA_{1:1}$ (MgTDPA); MgAcTDPA, and as-received TDPA.

At the end of the potentiodynamic measurements, the electrochemical cell was disassembled and the galvanized steel electrode was gently air-dried. The electrode was then subjected to FTIR measurements in ATR mode. FTIR measured in the attenuated total reflection mode demonstrated the presence of the physisorbed thiodipropionate layers on the galvanized steel surface when $MgTDPA_{1:1}$ was added to the 3.5% NaCl electrolyte (FIG. 14). In particular, peaks at 1720 (C=O bonded asymmetric stretch) and 1440 cm-1 (symmetric COO— stretching) indicate the presence of the carboxylate anion on the zinc surface. FTIR of the as-synthesized magnesium thiodopropionates and TDPA are collected in FIG. 15.

Figure 16:
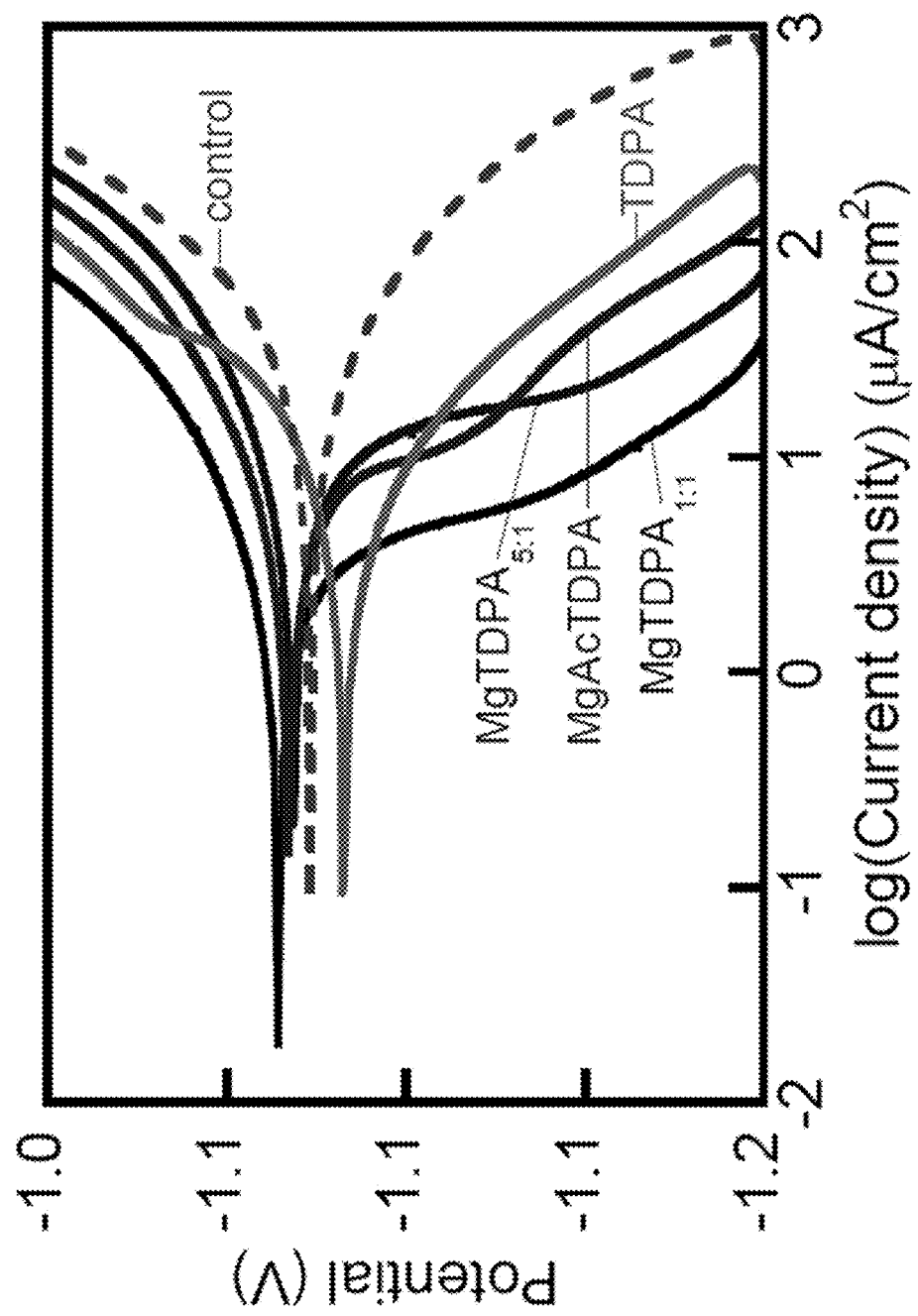
FIG. 16 shows typical Tafel plots illustrating effect of additives on potentiodynamic polarization of galvanized steel in 3.5% NaCl (initial pH 5.6, 25° C.). Designations, control: no additives; MgAcTDPA: magnesium acetate thiodipropionate; $MgTDPA_{1:1}$; $MgTDPA_{5:1}$; and TDPA: thiodipropionic acid. Additive concentrations: 10 mg/mL.

Typical results of the addition of MgTDPA, MgAcTDPA and control magnesium acetate (MgAc) and thiodipropionic acid (TDPA) on Tafel plots are shown in FIG. 16. To compare the effect of the additives, each additive's concentration in the 3.5% NaCl electrolyte (pH 5.6) was arbitrarily set at 10 mg/mL. It was observed that all the studied additives reduced the icon, i.e., reduced the corrosion rate.

All the anodic branches of the Tafel plots were somewhat similar prior to the onset of passivation. The anodic branches showed active zinc dissolution and a monotonically increasing current up to very steep slopes, which indicated a diffusion-controlled reaction rate. In the cathodic curves, representing the hydrogen evolution reaction, there exists a clear reduction in the values of the current density compared to the control (no additives), from the steel in 3.5% NaCl without additives, to sample immersed in the additive solutions. Varying concentration of the additive in the bulk electrolyte changed both the cathodic and anodic currents (not shown), which suggested that our magnesium thiodipropionate salts could be classified as mixed-type corrosion inhibitors. Tafel plots in FIG. 16 clearly show that $MgTDPA_{1:1}$ reduced the Icorr values the most compared to the other additive species.

EIS (FIGS. 17A and 17B) was applied to further reveal the effects of the corrosion inhibitors on the electrolyte-galvanized steel electrode interface and to complement the potentiodynamic polarization measurements. The qualitative information was obtained using fit analysis embedded into the software used to model the spectra, employing electrical equivalent circuits (EECs).

Figure 17A:
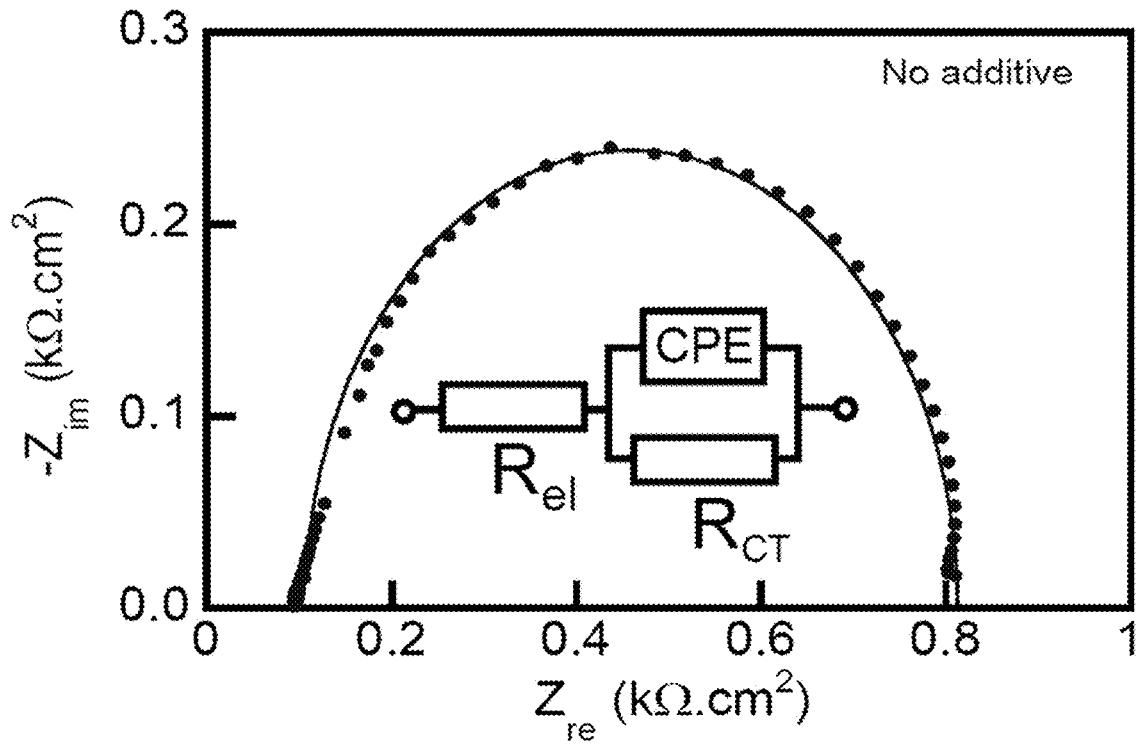
FIG. 17A shows a typical Nyquist plot for galvanized steel in aqueous 3.5% NaCl (pH 5.6, 25° C.) without additive. Circles are experimental datapoints, and the solid line represents simulated (modeled) spectra. Electrical equivalent circuits (EEC) used to fit the electrical impedance spectra is shown on the spectrum. Designations on EEC are as follows: $R_{el}$ is the ohmic resistance between the working and the reference electrode; $R_{CT}$ is the charge transfer resistance related to the corrosion reaction at open-circuit potential (OCP); CPE is the capacitance of the electric double layer at the electrode/electrolyte interface.
Figure 17B:
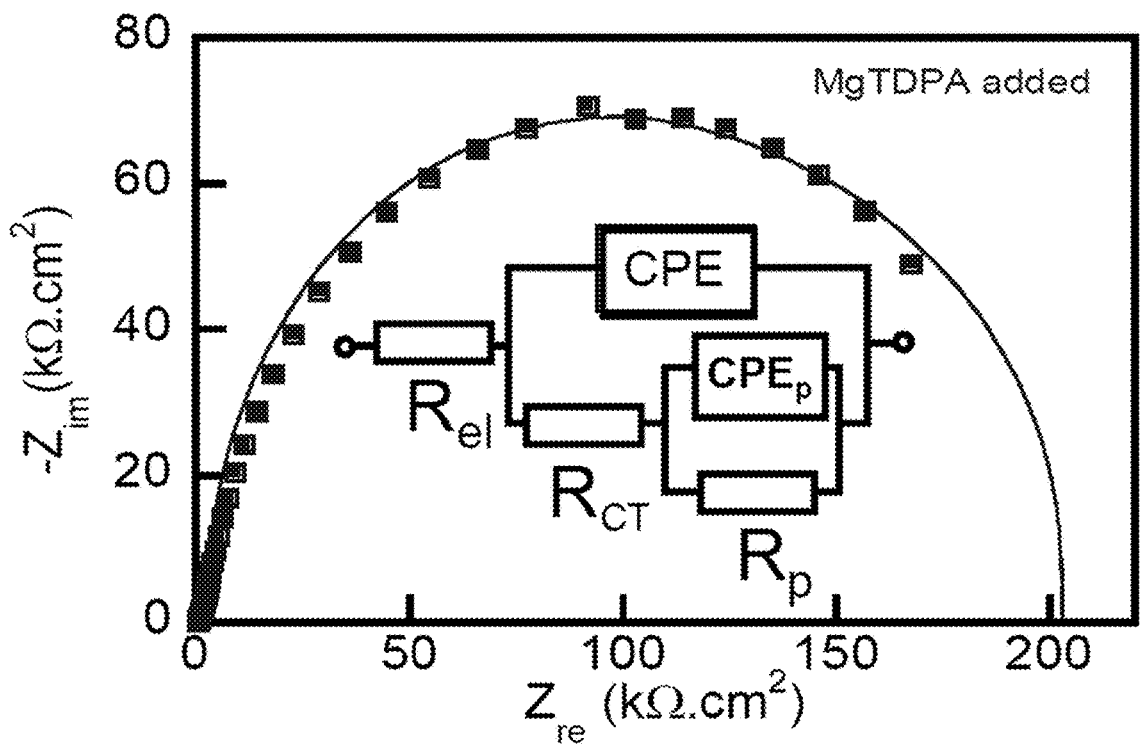
FIG. 17B shows a typical Nyquist plot for galvanized steel in aqueous 3.5% NaCl (pH 5.6, 25° C.) with additive, $MgTDPA_{1:1}$. Effective $MgTDPA_{1:1}$ concentration was 10 mg/mL. Squares are experimental datapoints, and the solid line represents simulated (modeled) spectra. EEC used to fit the electrical impedance spectra is shown on the spectrum. Designations on EEC are as follows: $R_{el}$ is the ohmic resistance between the working and the reference electrode; $R_{CT}$ is the charge transfer resistance related to the corrosion reaction at OCP; CPE is the capacitance of the electric double layer at the electrode/electrolyte interface; $CPE_p$ is the pseudocapacitance and $R_p$ is the pseudo-resistance of the surface-adsorbed additive (MgTDPA) layer.

Elements of the EECs are described in the legend to FIGS. 17A and 17B. The corrosion resistance of the galvanized steel surface in the presence of the corrosion inhibitor represents the RCT+Rp sum. In the control measurement without the additive, the spectrum with one time constant EEC was used, wherein the electrode resistance is represented by RCT. An excellent agreement between the experimental data (symbols) and calculated model (lines) was obtained, justifying the use of the proposed EECs. Analogous EEC models have been employed previously to estimate the effects of corrosion inhibitors such as zinc benzoate, monomeric and oligomeric amines, natural products, aminoalkanoic acids, complex heterocycles, etc.

The fitting (solid curves) in FIGS. 17A and 17B demonstrated a dramatic, 283-fold increase in the total resistance value $R_i = R_{CT} + R_p$ ($k\Omega \cdot cm^2$) in the presence of $MgTDPA_{1:1}$ versus $R_o = R_{CT}$ value recorded in the absence of the corrosion inhibitor. EIS measurements enabled estimation of the corrosion inhibition efficiency:

$$\eta(\%) = \left(1 - \frac{R_o}{R_i}\right) \times 100$$

The above expression (2) is equivalent to equation (1) where the corrosion inhibition efficiency is obtained via the ratio of the corrosion current values found via the potentiodynamic polarization measurements. Both EIS and Tafel measurements are widely utilized for the estimation of the corrosion inhibitor efficiency.

Values obtained in Tafel and EIS measurements are collected in Table 1, which affords a comparison of the corrosion inhibition effects of the magnesium thiodipropionate salts with TDPA and magnesium acetate as controls. $MgAc_2$ and especially calcium magnesium acetate (CMA, a blend of calcium and magnesium acetates resulting from the reaction of acetic acid and dolomitic limestone) are considered to be non-corrosive deicing agents and even marginally effective inhibitors of corrosion caused by chlorides.

In a separate series of experiments, rinsing the air-dried electrode with deionized water removed the adsorbed additive, which was then undetectable by FTIR.

Typical results of the addition of MgAcTDPA and control parent magnesium acetate tetrahydrate (MgAc) and thiodipropionic acid (TDPA) are shown in FIG. 16. It was observed that all the studied additives reduced the $I_{corr}$, i.e., reduced the corrosion rate. All the anodic curves were somewhat similar prior to the onset of passivation. The anodic branches show active zinc dissolution and a monotonically increasing current up to very steep slopes, which indicates a diffusion-controlled reaction rate. In the cathodic curves, however, there exist a clear reduction in the values of the current density, from the steel in 3.5% NaCl without additives, to sample immersed in MgAcTDPA solution at higher concentration. The results collected in Table 1 confirm that MgAcTDPA was indeed the most efficient corrosion inhibitor at pH 5.3, as it reduced the rate of corrosion the most at equivalent concentrations compared to those of either MgAc or TDPA. Suspension of MgTDPA$_{5:1}$ was also quite effective in reducing the corrosion rate. Thus, it was discovered that magnesium thiodipropionates or dithiodipropionate were synergistically more efficient corrosion inhibitors than either magnesium acetate or thiodipropionic acid alone.

certainly lowered the concentration of the TDPA ions available for adsorption on the steel surface. Correlation between η (%) and IE (%) values was found satisfactory, with η having higher uncertainty of determination due to the data fitting procedure.

In addition to the newly discovered inhibitors, such as the MgTDPA$_{1:1}$ inhibitor, there are other, related corrosion inhibitors such as metal carboxylates, the effects of which on steel have been studied previously. Analogously to the magnesium thiodipropionate described in the present work, the anodic inhibitory effect of carboxylates has been combined with cathodic inhibitory cations, such as cerium, lanthanum and other rare earth metals and zinc. For example, decanoic acid, considered to be an efficient corrosion inhibitor, enabled inhibition efficiency η=83.5% on galvanized steel at concentration 44.7 mM, in electrolyte containing 0.0165 wt % NaCl (pH not stated). At that concentration of decanoic acid the η values plateaued, yet the total salt concentration was approximately 100-fold lower than in the experiments described herein. Decanoic acid was approximately as efficient a corrosion inhibitor as TDPA (compare with data in Table 1), but less efficient than

TABLE 1

Effect of magnesium acetate thiodipropionate (MgAcTDPA), magnesium acetate (MgAc$_2$), magnesium thiodipropionate (MgTDPA$_{5:1}$ and MgTDPA$_{1:1}$), magnesium dithiodipropionate (MgDTDPA), and thiodipropionic acid (TDPA) as additives on the corrosion potential (E$_{corr}$), corrosion current density (I$_{corr}$), and corrosion rate (CR) of galvanized steel and resulting inhibitor efficiency from EIS (η, %) and from Tafel (IE, %) measurements in aqueous 3.5% NaCl solutions at 25° C. Initial effective concentration of each additive in electrolyte was 10 mg/mL.

| Additive[a] | pH[b] | [Mg$^{2+}$] (meq/L) | [Ac$^-$][c] (meq/L) | [TDPA][d] (meq/L) | -E$_{corr}$ (V) | I$_{corr}$ (μA/cm$^2$) | Corrosion rate (mpy) | η (%) | IE (%) |
|---|---|---|---|---|---|---|---|---|---|
| None | 5.3 | 0 | 0 | 0 | 1.158 | 180 | 107 | N/A | N/A |
| None | 5.6 | 0 | 0 | 0 | 1.099 | 25.8 | 15.4 | 0 | 0 |
| MgAcTDPA[d] | 5.3 | 9.93 | 9.93 | 15.9 | 1.079 | 49.3 | 29.4 | N/A | N/A |
| MgAcTDPA | 5.3 | 41.9 | 41.9 | 67.1 | 1.025 | 13.3 | 7.9 | N/A | N/A |
| MgAcTDPA | 5.3 | 62.9 | 62.9 | 101 | 1.018 | 3.12 | 1.85 | N/A | N/A |
| MgAcTDPA | 5.6 | 24.8 | 24.8 | 39.7 | 1.067 | 4.06 | 2.41 | 80 | 84 |
| MgAc$_2$ | 5.3 | 71.8 | 144 | 0 | 0.903 | 62.1 | 37.0 | N/A | N/A |
| MgAc$_2$ | 5.6 | 46.6 | 93.3 | 0 | 1.059 | 13.5 | 8.03 | 41 | 48 |
| TDPA | 5.3 | 0 | 0 | 47.4 | 1.046 | 44.5 | 26.5 | N/A | N/A |
| TDPA | 5.3 | 0 | 0 | 94.8 | 1.049 | 28.4 | 16.9 | N/A | N/A |
| TDPA | 2.1 | 0 | 0 | 94.8 | 1.042 | 796 | 474 | N/A | N/A |
| TDPA | 5.6 | 0 | 0 | 56.1 | 1.076 | 4.15 | 2.47 | 81 | 84 |
| MgTDPA$_{5:1}$ | 5.3 | 167[e] | 0 | 33.5 | 0.983 | 85.1 | 50.7 | N/A | N/A |
| MgTDPA$_{5:1}$ | 5.6 | 125 | 0 | 25.0 | 1.068 | 7.82 | 4.65 | 72 | 69 |
| MgTDPA$_{1:1}$ | 5.3 | 49.8 | 0 | 49.8 | 1.054 | 35.5 | 21.1 | N/A | N/A |
| MgTDPA$_{1:1}$ | 5.6 | 49.9 | 0 | 49.9 | 1.064 | 1.79 | 1.07 | 99 | 93 |
| MgDTDPA | 5.3 | 40.6 | 0 | 40.6[f] | 1.049 | 63.5 | 37.8 | N/A | N/A |

[a]Initial pH in the electrochemical cell prior to the experiment commencement.
[b]Total magnesium concentration.
[c]Acetate concentration.
[d]Thiodipropionate concentration.
[e]Concentration of DTDPA.
[f]Measurements were performed in triplicate, and all calculated data reported as averages (n = 3). Maximum standard deviations for η and IE values were 12% and 6% of the mean values, respectively.

Data in Table 1 demonstrate that MgTDPA$_{1:1}$ is a more effective corrosion inhibitor for galvanized steel than either TDPA or MgAc$_2$. Without being bound by any theory, the increased effectiveness may be due to the synergistic effect afforded by the presence of both water-soluble TDPA anions and magnesium cations when MgTDPA$_{1:1}$ is added to the electrolyte. The presence of acetate in the MgAcTDPA mixed salt lowered the effective concentration of magnesium and TDPA ions compared to MgTDPA$_{1:1}$. Without being bound by any theory, these features may have lowered the corrosion inhibition efficiency of MgAcTDPA. Likewise, MgTDPA$_{5:1}$ was only fractionally soluble in the electrolyte and yielded a suspension rather than solution, which MgTDPA$_{1:1}$. Zinc decanoate demonstrated inhibition efficiency η=65% on carbon steel. Zinc decanoate has limited aqueous solubility of only 0.026 mM.

Figure 18:
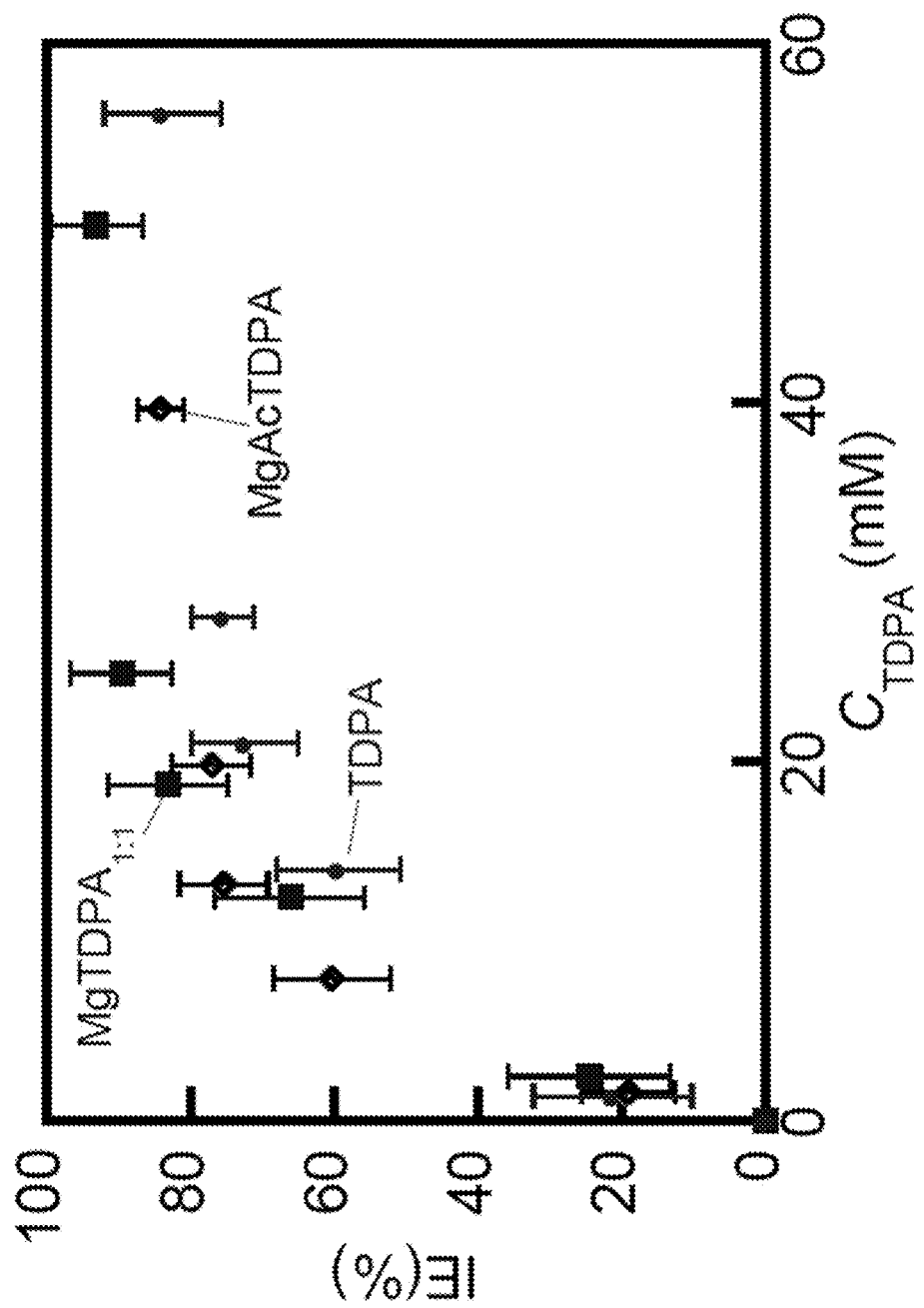
FIG. 18 shows concentration dependencies of inhibition efficiency (IE, %) of $MgTDPA_{1:1}$, MgAcTDPA, and TDPA in protecting galvanized steel from corrosion in 3.5% NaCl at pH 5.6, 25° C. The data were derived from the potentiodynamic polarization measurements performed at varying concentrations of additives. $C_{TDPA}$ (mM) is the effective concentration of thiodipropionate in electrolyte.

Concentration dependencies of the inhibitor efficiency IE (%) for TDPA, MgAcTDPA and MgTDPA$_{1:1}$ shown in FIG. 18 were of characteristic saturation type, with the IE values plateauing at C$_{TDPA}$>30 mM. The inhibitor efficiency was related to the adsorption of TDPA on the steel surface and was reversible (physisorption), with the layers of the adsorbed thiodipropionate readily soluble in fresh electrolyte. Therefore, assuming that IE is proportional to the steel surface coverage upon TDPA adsorption, the experimental data in FIG. 18 were plotted in the form of Langmuir adsorption isotherm (equation (3)):

$$\frac{C_{TDPA}}{q} = \frac{1}{K_a} + C_{TDPA}$$

where Ka is the equilibrium constant for the adsorption-desorption process and q=0.01.IE.

Figure 19:
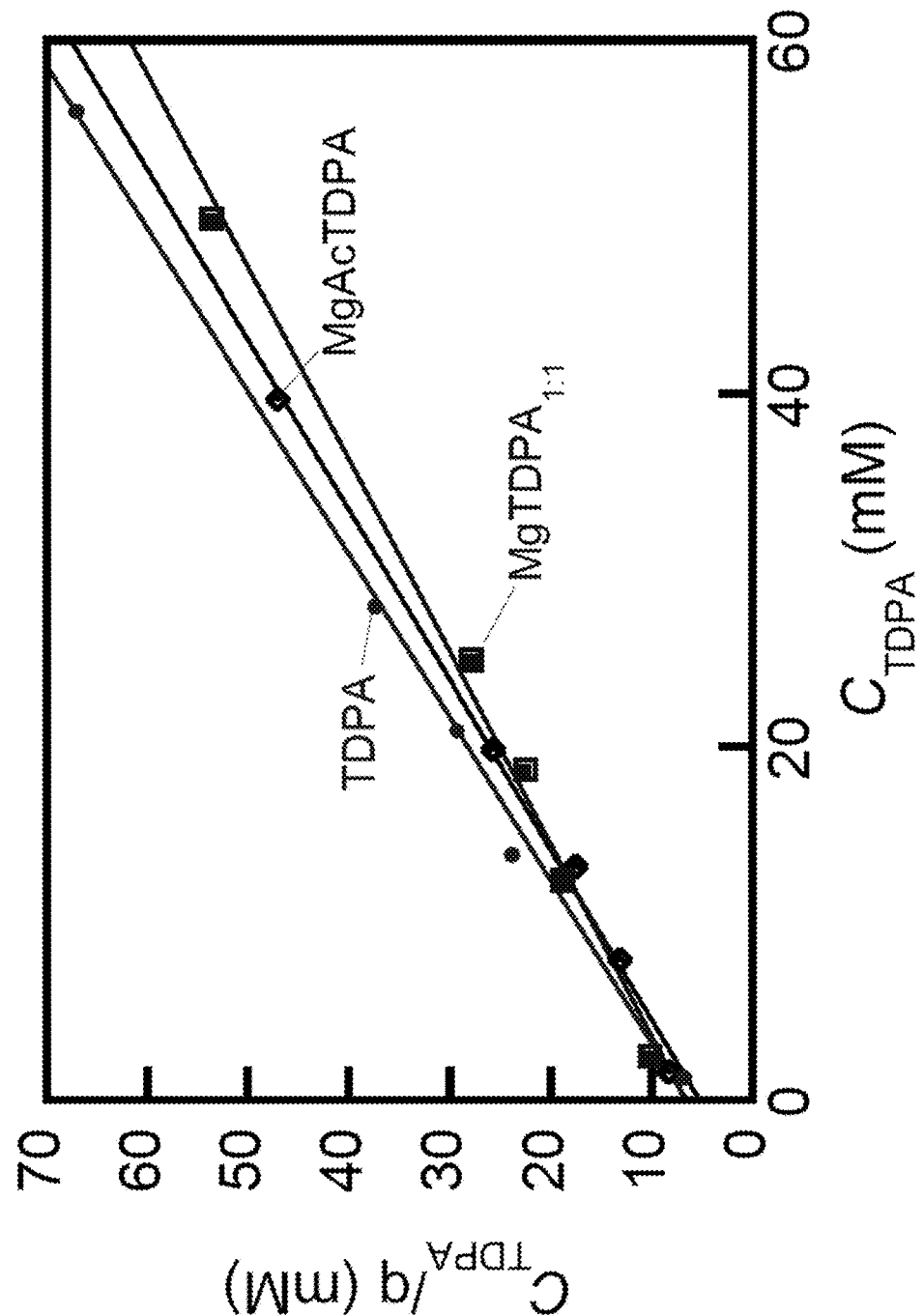
FIG. 19 shows the linearized form of Langmuir adsorption isotherms for adsorption of $MgTDPA_{1:1}$, MgAcTDPA, and TDPA on galvanized steel at 25° C. and pH 5.6. The data was obtained from FIG. 18, utilizing the mean values of q=0.01·IE (n=3). In all cases, linear fits were excellent ($R^2$>0.99).

The agreement between the Langmuir isotherm interpretation (equation (3) above) and experimental data was excellent, with all fitted lines being linear ($R^2$>0.995 in all cases) and the corresponding slopes were close to unity (1.03±0.06), as is theoretically predicted. The Y-axis intercept of the lines in FIG. 19 yielded $K_a$ in the range 150-190 $M^{-1}$, which affords an estimate of the corresponding standard Gibbs free energy ($\Delta G_a^0$) of the thiodipropionate adsorption from the expression (4):

$$-\Delta G_a^0 = RT \ln(c_{solvent} K_a)$$

where $c_{solvent}$=55.5 M is the water concentration, R=8.314 J/mol·K is the gas constant and T=298 K is the absolute temperature.

The data yielded $-\Delta G_a^0$ values of 22.4-23.0 kJ/mol, which is close to the range of −20 kJ/mol typically attributed to physisorption via electrostatic interaction between the charged carboxylates and the charged metal. Spontaneity of the adsorption process is supported by the negative $\Delta G_a^0$ values indicating that the corrosion inhibitor species form stable layers on the steel surface.

In summary, it was discovered that magnesium thiodipropionate salt is an efficient corrosion inhibitor for galvanized steel in 3.5% NaCl solutions of moderately acidic pH, acting via formation of thiodipropionate layers on the steel surface. The cathodic protection effect of magnesium ions can be seen in augmented inhibition efficiency of MgTDPA compared to that of thiodipropionic acid.

Example 6

Figure 20:
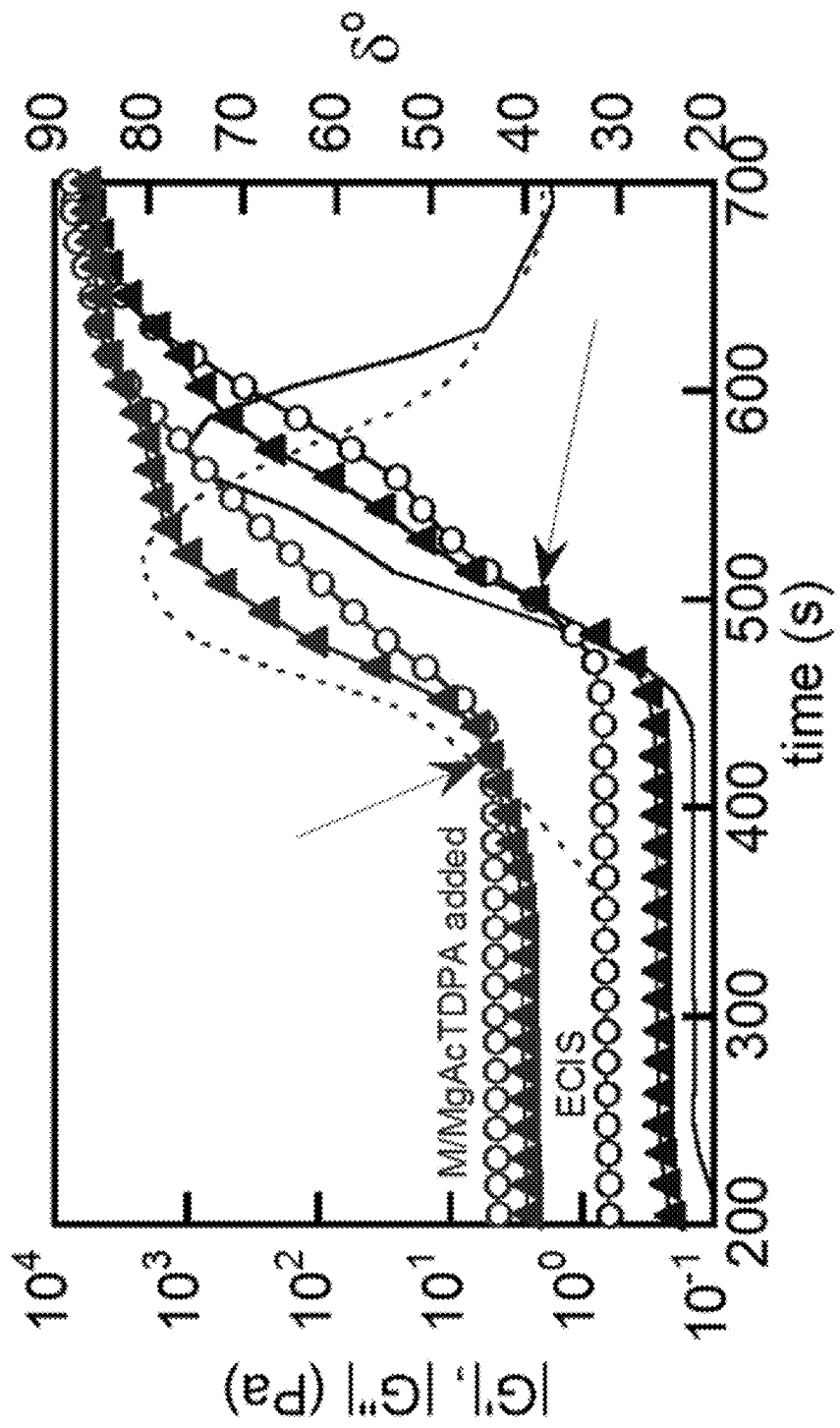
FIG. 20 shows oscillatory shear time sweep results of the gel time tests for ARALDITE® LY8601/ARADUR® 8602 (4:1 w/w) control epoxy curing infusion system (ECIS) and the same system modified by composite pigment particulates of montmorillonite with magnesium acetate thiodipropionate (M/MgAcTDPA). Open and filled datapoints show storage (G') and loss (G") moduli, whereas lines show corresponding loss angle (δ°, solid line for the ECIS resin and dotted line for the pigment-modified resin). Arrows indicate the gel time. Temperature was 82° C. throughout.

Effect of Exemplary Composites on the Rate of Curing of Epoxy Resins Determined by Gel Time Method Tested an epoxy two-part curing system comprising ARALDITE® LY8601 resin and ARADUR® 8602 hardener, both supplied by Hutsman Advanced Materials. ARALDITE® LY8601 is composed of bisphenol A epoxy resin (60-100%), glycidylether of $C_{12}$-$C_{14}$ alcohols (7-13%), and butylphenyl glycidyl ether (3-7%), whereas ARADUR® 8602 is composed principally of diethylenetriamine (13-30%), polyoxypropylene diamine (13-30%), 4-nonyl-phenol (7-13%), triethanolamine (3-7%), and 2-(2-aminoethyl-amino)ethanol (0.1-1%). The ARALDITE® LY8601/ARADUR® 8602 components taken at 4:1 w/w ratio result in epoxy curing infusion system (ECIS) with initial nominal viscosity of 175 cP.[25] The rheological measurements were conducted using a controlled stress ARES-G2 Rheometer (TA Instruments) with a parallel-plate geometry system (steel plate, 25 mm diameter, equipped with a solvent trap), gap set at 1 mm. Time sweep oscillatory shear experiments were conducted at 1 Hz. Preliminary frequency and time sweeps were conducted with the control ECIS mixture to find optimum experimental, stress-strain linearity and temperature conditions. The empty chamber was preheated to the gel time test temperature set at various temperatures ≥60° C. In the experiments, finely powdered composite pigment particulates of montmorillonite with magnesium acetate thiodipropionate (M/MgAcTDPA), which were prepared as in Example 2, at 5 wt % or 8 wt % solids or MgTDPA$_{1:1}$ as prepared in Example 3A at 5 wt % were blended with the ARALDITE® LY8601/ARADUR® 8602 (4:1 w/w) to result in homogeneous suspensions of solids upon mixing. After vigorous mixing, the suspension or the control ECIS resin was quickly deposited on preheated plate, the upper plate was quickly lowered to a set gap and the excess fluid was wiped up and removed from the plate edges. Typical gel time determination results are shown in FIG. 20.

Figure 21:
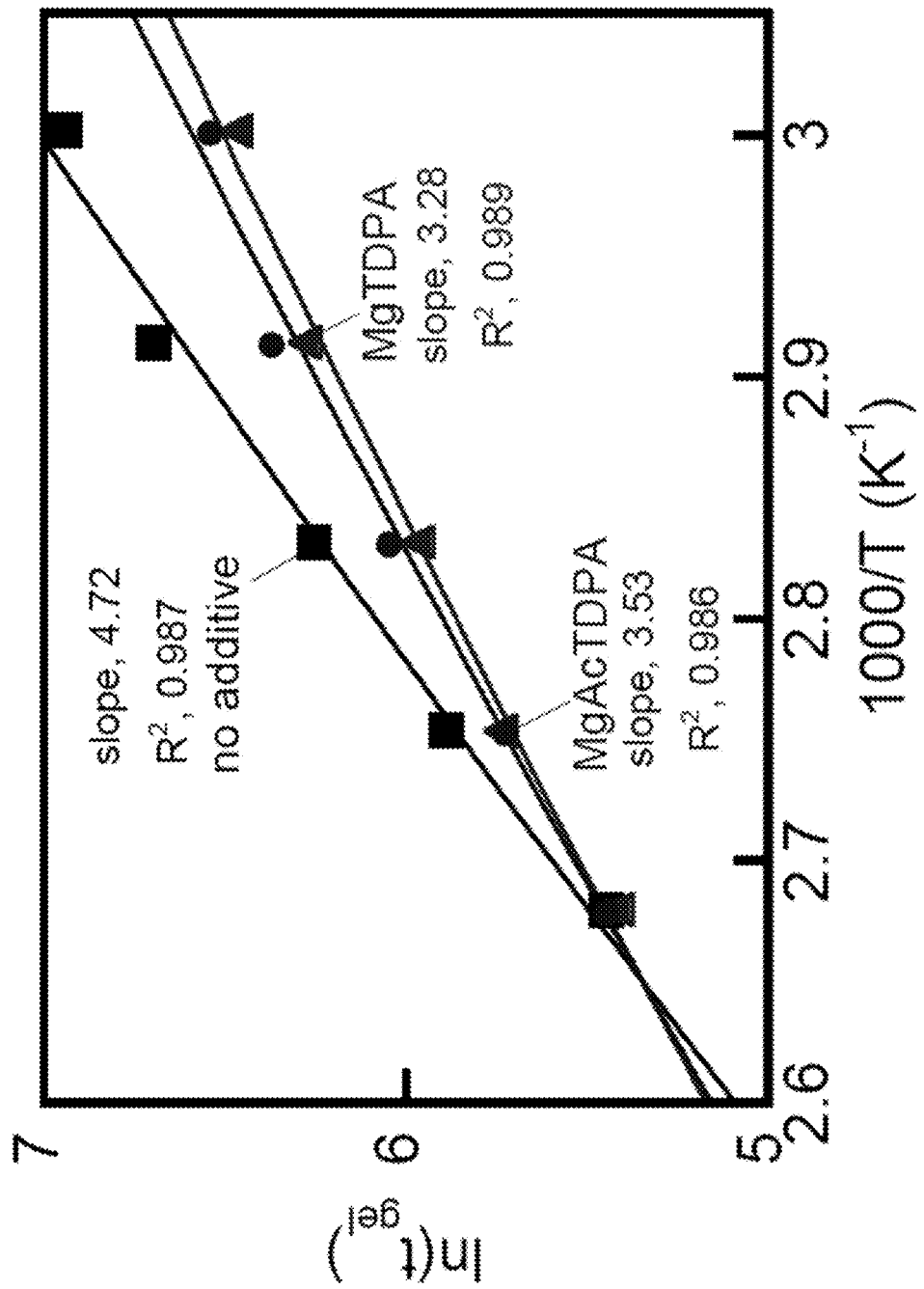
FIG. 21 shows plots of gel time ($t_{gel}$) as a function of reciprocal temperature for the ARADALITE® LY8601 epoxy/ARADUR® 8602 amine without additives and with 5 wt % of $MgTDPA_{1:1}$ or MgAcTDPA added. Arrhenius model coordinates were used according to expression $\ln(t_{gel})=\ln A+(\Delta E_a/RT)$, where $t_{gel}$ (s) is the gel time, A is the pre-exponential factor, $E_a$ (kJ/mol) is the activation energy, and T (K) and R (J/K·mol) are temperature and gas constant, respectively.

The two-component system is a relatively low-viscosity liquid that, upon rapid mixing, is capable of solubilizing magnesium thiodipropionates at ambient temperature without gelling, with or without the use of reactive diluents such as 1,4-butanediol diglycidyl ether and the like. The gel point (onset of gelation, $t_{gel}$) of that liquid is very sensitive to temperature and additives. The onset of gelation was measured using controlled stress rheometry at a given temperature according to the Winter-Chambon criterion,[26] at the crossover of the storage and loss moduli (G'=G"; loss angle δ=45°) (FIG. 21). The gel times were measured to be 424 s for the modified and 513 s for the original resin compositions, respectively. The results of the isothermal rheological $t_{gel}$ measurements in the 60-100° C. temperature range are shown in FIG. 21. The linearity of the plots in FIG. 21 indicated that the Arrhenius model held very well. The magnesium thiodipropionates indeed lowered the $t_{gel}$ values throughout the temperature range studied. Apparent activation energy values for the fast-curing epoxy-amine system without additives were 39.2 kJ/mol and at 5 wt % loading, MgTDPA and MgAcTDPA lowered apparent activation energy of curing to 27.8 and 29.3 kJ/mol, respectively. These results demonstrate that the MgAcTDPA composite with montmorillonite accelerated the crosslinking curing reaction between the epoxy resin and amine hardener in the two-component resin system utilized for coatings and advanced composites. Moreover, the additive pigment composite particles altered the initial viscosity of the resin compositions, acting as useful rheology modifiers. These results demonstrated that magnesium thiodipropionates retain the useful feature of their parent TDPA, i.e., they act as curing accelerators of heterocyclic compounds, oxiranes and benzoxazines, widely employed as components of organic coatings.

Example 7

Figure 22:
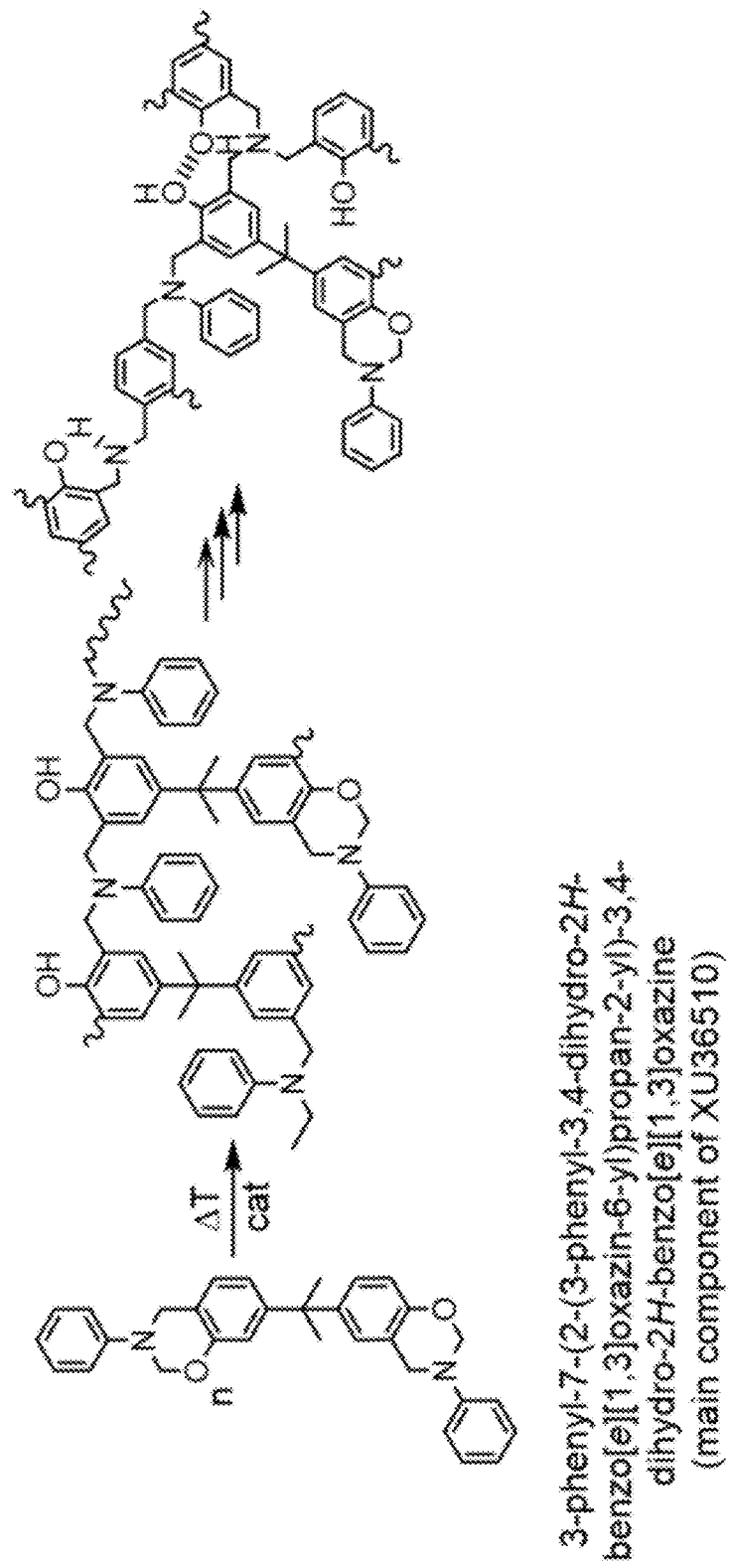
FIG. 22 shows a schematic of polymerization curing of an exemplary benzoxazine resin, XU35610 resin.

Effect of an Exemplary Thioether Salt on the Rate of Curing of Benzoxazine Resins The accelerating effect of magnesium acetate thiodipropionate (MgAcTDPA) on curing polymerization of bisphenol-A thermosetting benzoxazine resin was demonstrated. The resin sample was obtained from Huntsman Advanced Materials (product designation, XU35610). Poly(bis-benzoxazine)s are a family of thermosetting coating components that are polymerized through step growth ring-opening polyaddition from bis-benzoxazine monomers such as XU35610 (FIG. 22). That is, homopolymeriztion and cross-linking of the benzoxazine resin (a model system) are depicted in FIG. 22. The monomers are the products of the Mannich reaction between a bisphenol, formaldehyde, and a primary amine. For the coating applications, the temperature, rate and extent of curing are very important that affect the physical, chemical and mechanical properties of the coatings. Compounds that lower the temperature of curing are termed accelerators.

Figure 23:
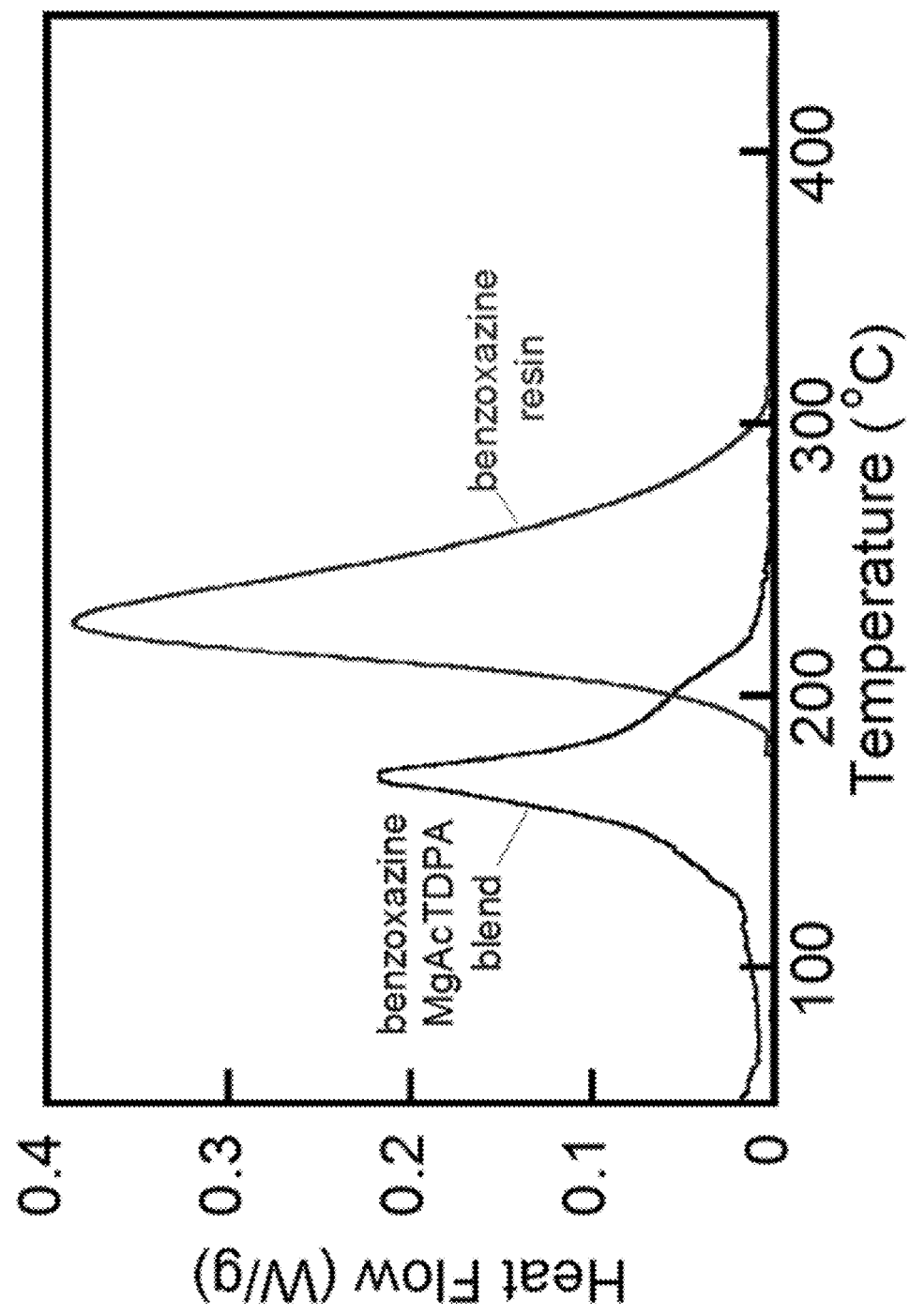
FIG. 23 shows differential scanning calorimetry (DSC) data (15° C./min, under nitrogen) for bisphenol-A based benzoxazine resin XU 35610 in the absence of accelerator/catalyst and in the presence of MgAcTDPA (12 wt %).

As received XU35610 was dissolved in ethanol/methyl ethyl ketone (MEK) (90:10 v/v) mixture and recrystallized after solvent evaporation under vacuum. A homogeneous blend of XU35610 resin and magnesium thiodipropionate (either MgTDPA$_{1:1}$ as prepared in Example 3A or MgAcTDPA as prepared in Example 1) was prepared as homogenous solution in ethanol/MEK (90:10 v/v) followed by mixing and solvent evaporation under vacuum at 60° C. Concentrations of magnesium thiodipropionates in the blends were set at 10 mol % relative to the benzoxazine monomer (MW 463 Da). The resulting material was finely ground and was placed in hermetically sealed aluminum pans. Differential scanning calorimetry (DSC) isotherms were measured under flowing nitrogen using a Discovery DSC (TA Instruments) with modulated temperature amplitude at heating ramp rates ($\beta$=dT/dt) varying in the 2-15° C./min range. Curing peak maxima were determined using instrument software. The DSC (FIG. 23) data demonstrated that the onset of curing reactions in the benzoxazine resin was significantly (ca. 46° C.) lowered by the addition of MgAcTDPA, thereby confirming the curing accelerator action of the salt.

Figure 24:
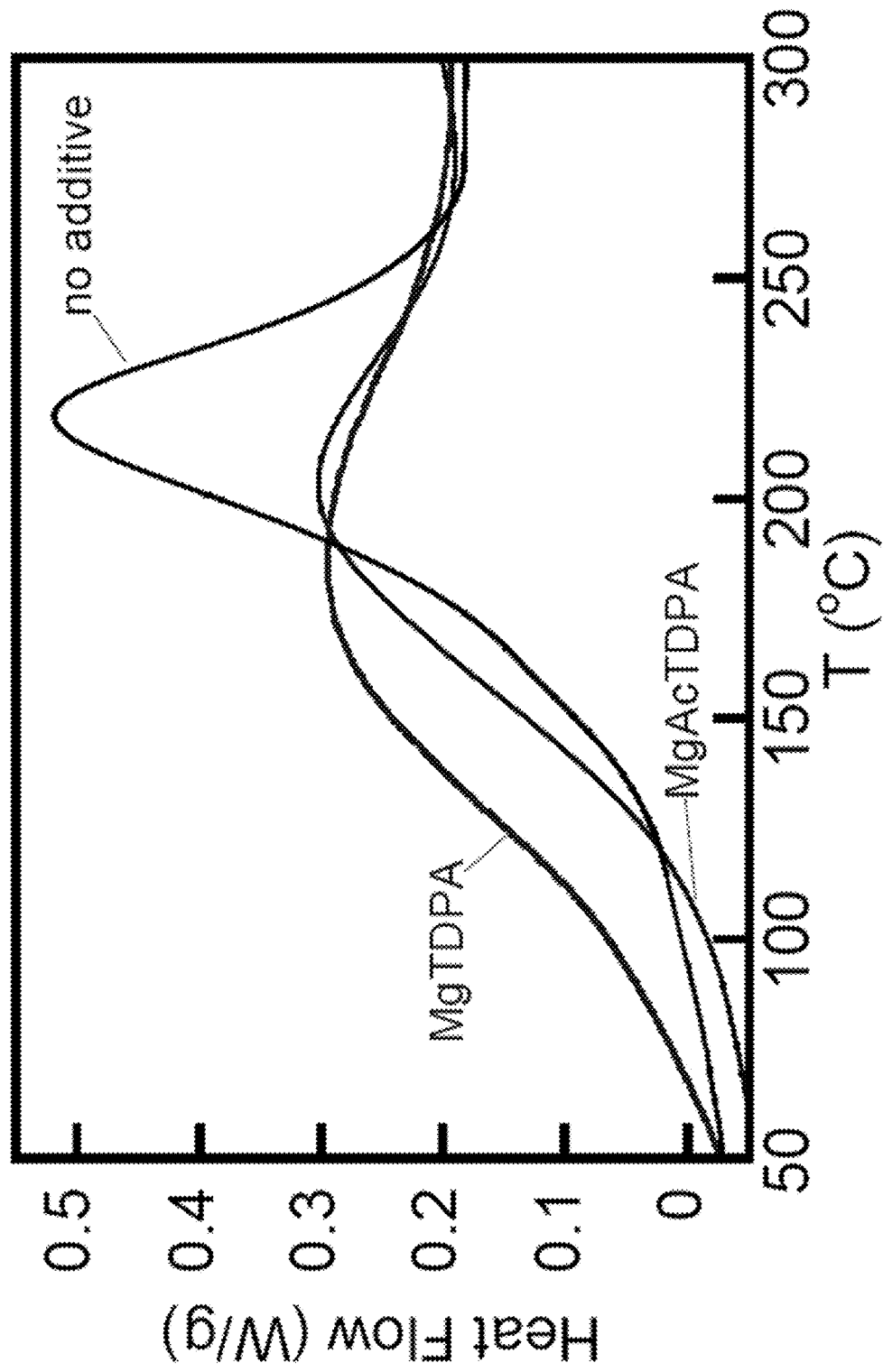
FIG. 24 shows DSC curing exotherms of benzoxazine XU 35610 on heating (10° C./min) in nitrogen atmosphere without additives and blends of benzoxazine with 10 mol % additives $MgTDPA_{1:1}$ and MgAcTDPA.
Figure 25:
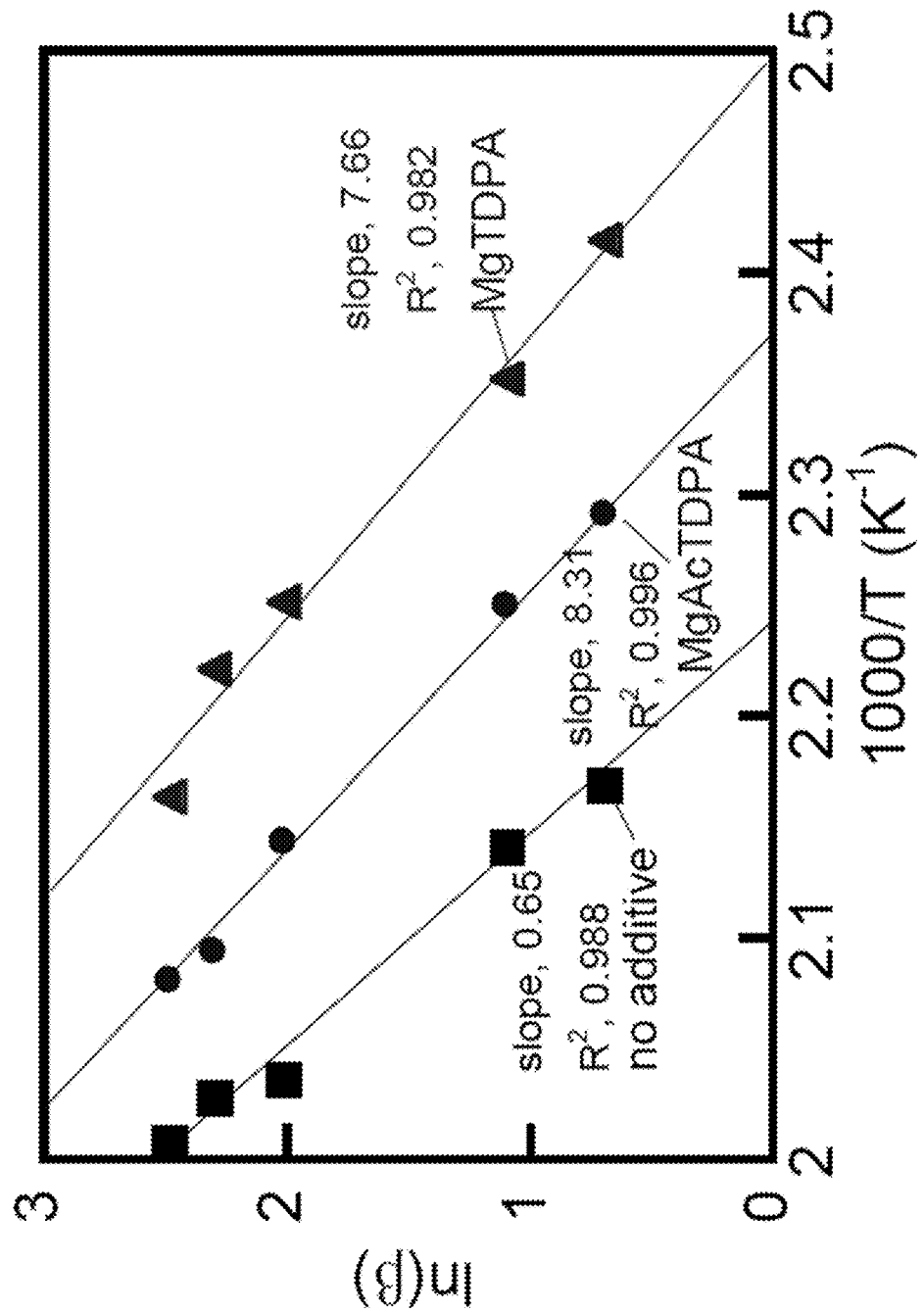
FIG. 25 shows plots of temperature of exothermic peak maxima versus heating rate, β (° C./min). Data from DSC of benzoxazine XU 35610 without additives (squares), and blends of the same benzoxazine with 10 mol % additives $MgTDPA_{1:1}$ (MgTDPA, triangles) and MgAcTDPA (circles).

Typical DSC thermograms of the original benzoxazine and magnesium thiodipropionate/benzoxazine blends (FIG. 24) show the effect of the additives on the onset of the polymerization exotherm, which is significantly lower in the presence of magnesium thiodipropionates; the exotherm's end point is barely affected. That is, the exotherms were significantly broadened in the presence of additives and the peaks moved to lower temperatures. Without attempting arbitrarily to deconvolve the peaks into various thermal events, it was observed that the peak maxima were at 220° C., 204° C., and 178° C. for exotherms without additives, with MgAcTDPA, and with MgTDPA as additives, respectively. Similar effects on benzoxazine polymerization were previously reported with TDPA, where the onset of the polymerization and the peak maxima moved to lower temperatures, whereas the end point of the exotherm did not move, leading to peak broadening. Without being bound by any theory, such observation has been interpreted as TDPA having the greatest impact on the initial stages of the polymerization such as ring opening, with the subsequent processes associated with cross-linking being affected to a lesser degree. Using variable heating rate method (e.g., "Ozawa corrected"), the Arrhenius activation energies of the benzoxazine monomer were estimated to be 88.6 kJ/mol (FIG. 25), which is within the range of previously reported values ranging from 81.4 to 93.7 kJ/mol depending on the monomer's degree of purification by crystallization.

At 10 mol % loading, MgTDPA and MgAcTDPA lowered apparent activation energy of benzoxazine polymerization to 63.7 and 69.1 kJ/mol, respectively, in line with the notion of the salts acting as catalysts. Similar effects of additive presence have been previously observed with TDPA and 4,4'-thiodiphenol, both of which are recognized as benzoxazine polymerization accelerators.

Example 8

Figure 26:
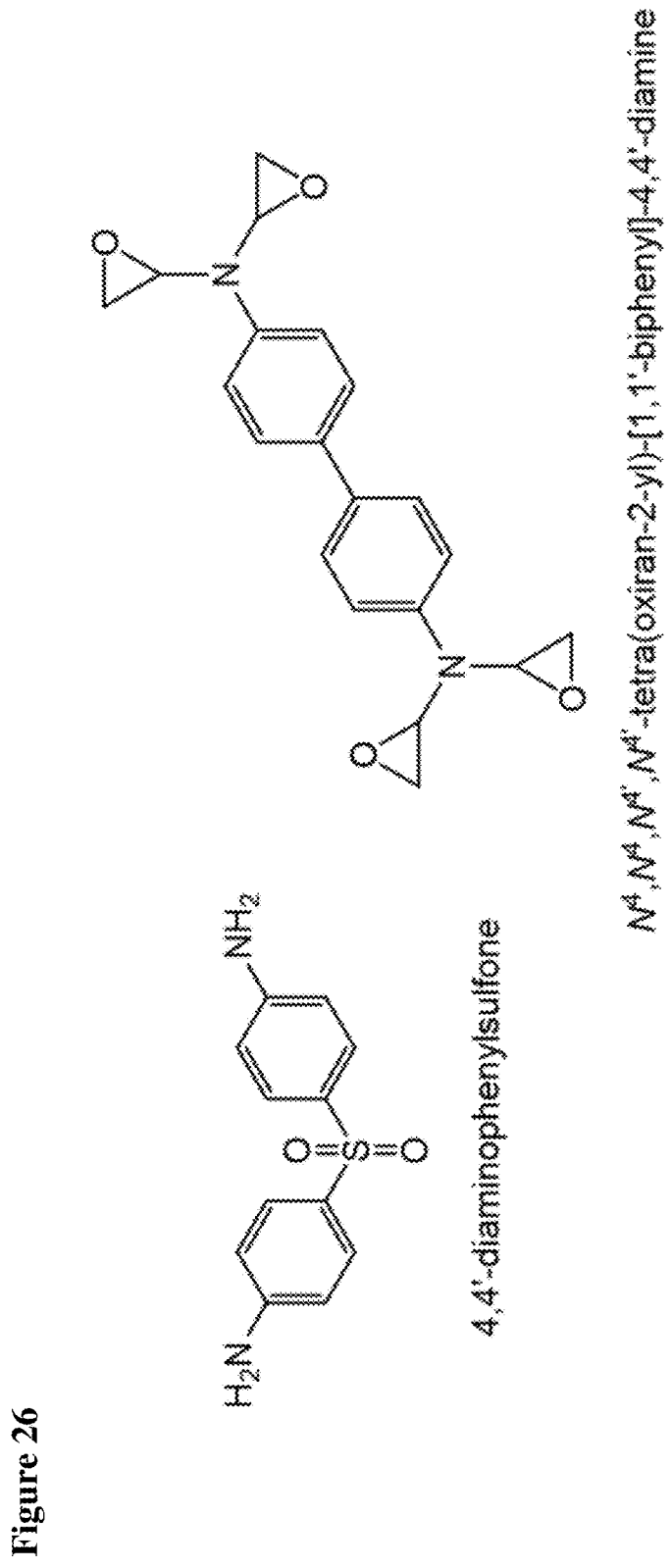
FIG. 26 shows exemplary epoxy-amine coating components: 4,4'-diaminophenylsulfone and a tetrafunctional epoxy.

Epoxy-Amine Coating Compositions with Cathodic Disbondment Inhibition Components An exemplary two-part epoxy-amine coating was prepared from main components shown in FIG. 26, 4,4'-diaminophenylsulfone (DAS, Sigma Aldrich) and tetrafunctional epoxy (ARALDITE® MY 721 from Huntsman Advanced Materials).

Preparation

Coupons of galvanized steel (ASTM A653, total thickness 0.305 mm, working area 2.2 cm$^2$) were pre-treated by washing by acetone, polishing and drying as described in Example 3. The steel coupons were kept at 50° C. prior to coating.

4,4'-Diaminophenylsulfone (0.5 g) was mixed with ARALDITE® MY721 epoxy (0.85 g), 310 mg of ARADUR® 125 BDB polyamidoamine hardener (Huntsman Advanced Materials), multiwalled carbon nanotubes (100 mg, Sigma Aldrich) and 310 mg of finely powdered composite pigment particulates of Montmorillonite K 10 clay with magnesium acetate thiodipropionate (M/MgAcTDPA) prepared as described in Example 2. The resulting black paste was thoroughly mixed by spatula and diluted as needed by 3-5 mL acetone.

The steel coupons pre-heated at 50° C. were painted by a brush on all sides by the above black paste, leaving an unpainted strip on top. The coupons were hung by crocodile clip/wire by the unpainted strip and kept at 80° C. in an oven for 36 h. The resulting black coating was approximately 0.3 mm thick, hard and scratch-resistant. For testing, the coupons were kept completely immersed into aqueous 3.5% NaCl for 60 days at ambient temperature.

Figure 27A:
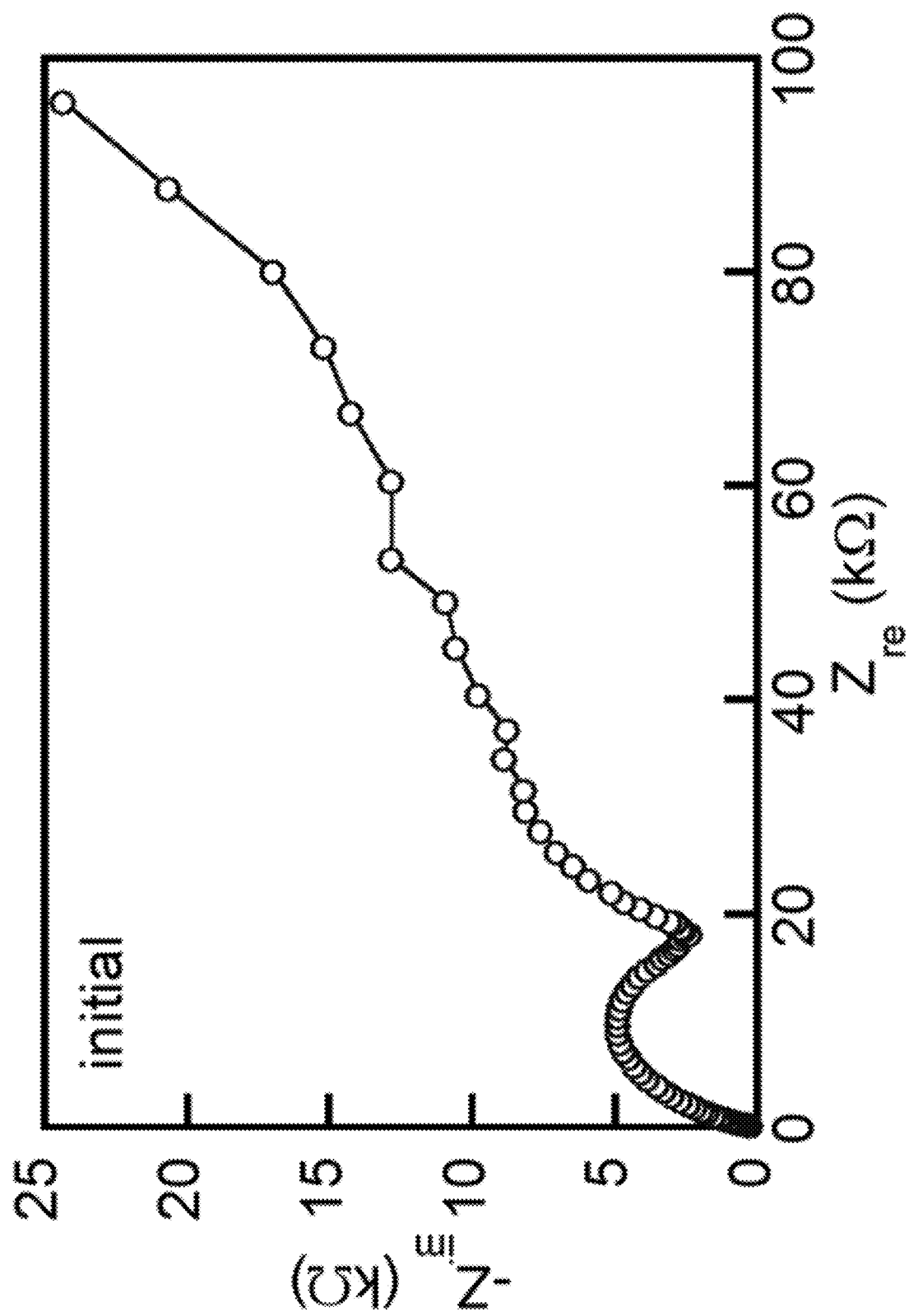
FIG. 27A shows an exemplary Nyquist plot of a galvanized steel coupon coated with an epoxy-amine coating containing M/MgAcTDPA after 0.5 h of immersion in 3.5% NaCl solution (pH 5.3) at room temperature.
Figure 27B:
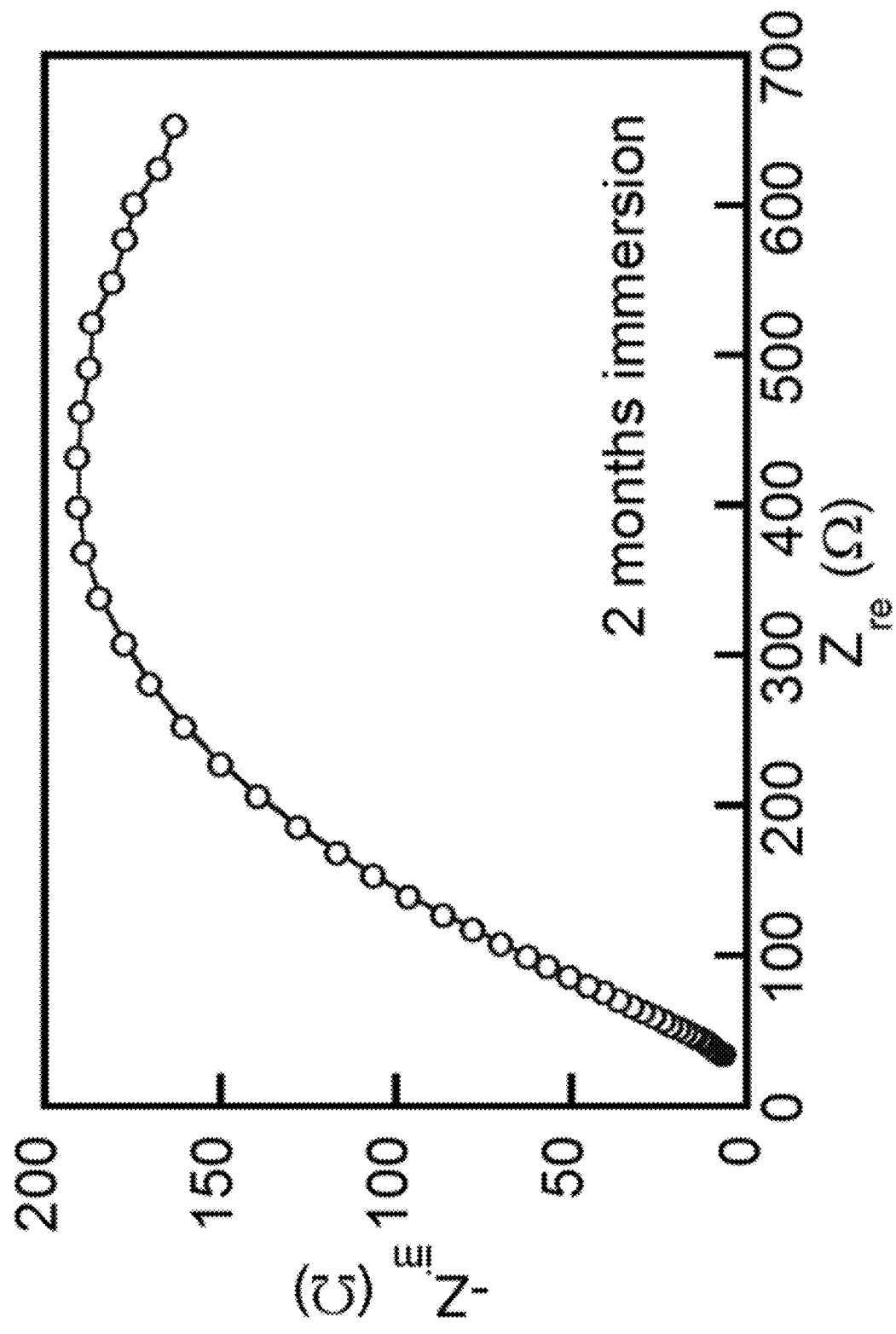
FIG. 27B shows an exemplary Nyquist plot of a galvanized steel coupon coated with an epoxy-amine coating containing M/MgAcTDPA after 60 days of immersion in 3.5% NaCl solution (pH 5.3) at room temperature.

The coated and control uncoated coupons were subjected to Electrochemical Impedance Spectroscopy (Nyquist) tests [ASTM (D01.27.32)] after 0.5-h (initial) and 60 days of immersion in 3.5% NaCl solution (FIGS. 27A and 27B). Due to the presence of the relatively hydrophilic polyamidoamine hardener, conductive carbon nanotubes and water-soluble MgAcTDPA, our coating rapidly developed considerable conductivity due to the electrolyte penetration. After a short amount of time (0.5 h), water penetrated into the coating and formed a new liquid/metal interface under the coating. This interface contained partially dissolved MgAcTDPA modeled as a double-layer capacitor in parallel with a kinetically controlled charge-transfer reaction when Mg(OH)$_2$ was formed, which prevented delamination and the coating delamination/failure.

After the prolonged exposure to the salt solution, the coupons were air-dried at ambient temperature for visualization.

Figure 28:
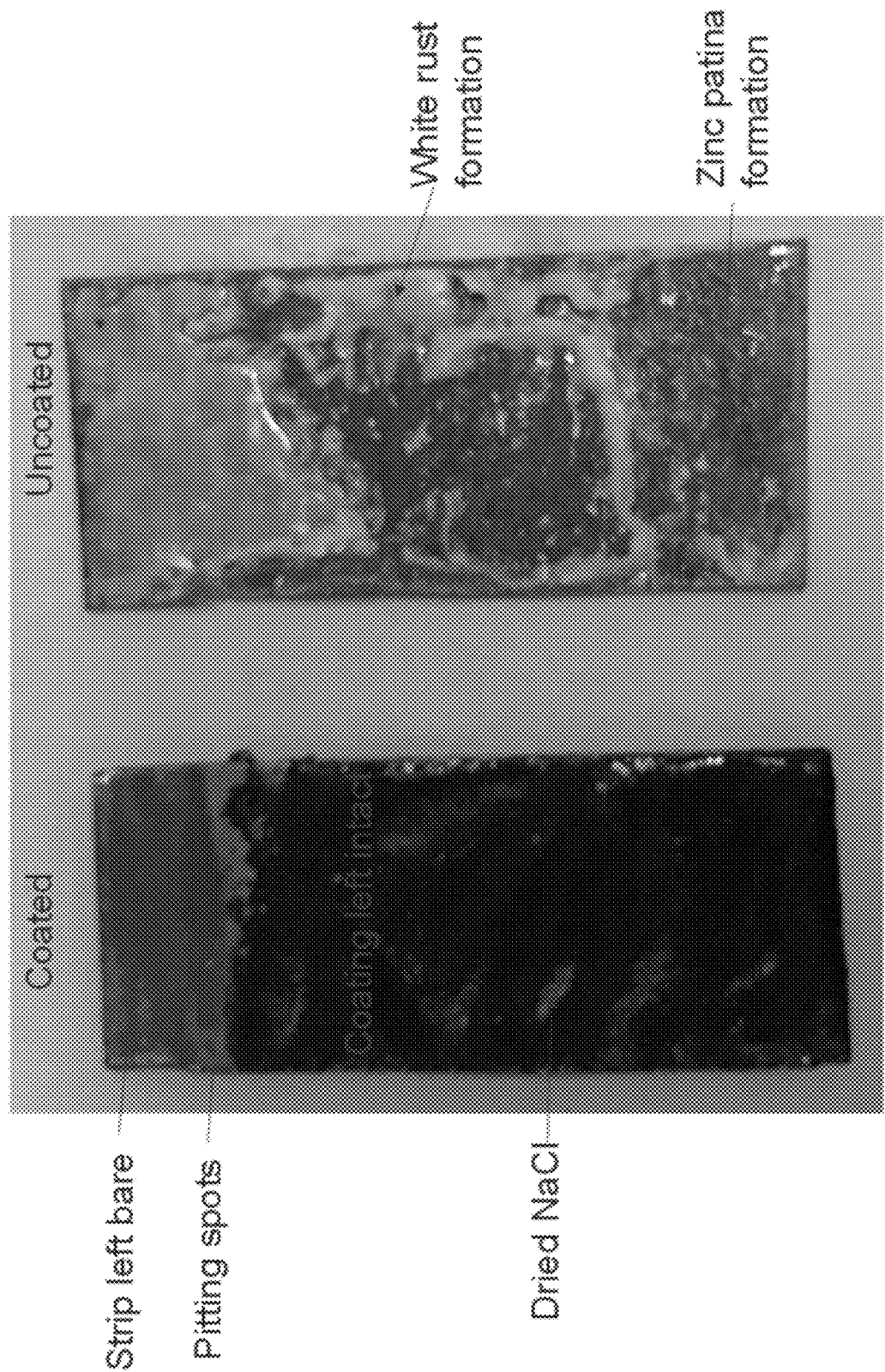
FIG. 28 shows exemplary photographs of coated and uncoated coupons of galvanized steel after 60 days of immersion to 3.5% NaCl at ambient temperature

Visual observation after 60 days (FIG. 28) showed that the coating provided adequate protection to the coupons, as the coating stayed intact; no delamination was observed. Occasional pitting spots were observed on the uncoated strip surfaces of the coupon that were left immersed for 60 days, but no corrosion propagation underneath the coating or delamination of the polymer layers was observed. In contrast, the uncoated coupon left in salt solution for 60 days developed large amounts of zinc patina and white rust.

Example 9

Hydrophobic Epoxy-Amine Coating Compositions with Cathodic Disbondment Inhibition Components Coupons of galvanized steel (ASTM A653, total thickness 0.305 mm, working area 2.2 cm$^2$) were pre-treated by washing by acetone, polishing and drying as described in Example 3. The steel coupons were kept at 50° C. prior to coating.

4,4'-Diaminophenylsulfone (2.0 g) and bisphenol A propoxylate diglycidyl ether (2.0 g, Sigma Aldrich) were mixed with ARALDITE® MY721 epoxy (2.0 g) and 5 mL of a solution of MgAcTDPA (prepared as in Example 1) in ethanol (30 wt %). The resulting yellowish transparent blend was thoroughly mixed by spatula and diluted as needed by ethanol for painting.

The steel coupons pre-heated at 50° C. were painted by a brush on all sides by the above viscous solution, leaving an unpainted strip on top.

Control coating was formulated without MgAcTDPA. Namely, 4,4'-diaminophenylsulfone (2.0 g) and bisphenol A propoxylate diglycidyl ether (2.0 g, Sigma Aldrich) were mixed with ARALDITE® MY721 epoxy (2.0 g) and 5 mL absolute ethanol. The resulting yellowish transparent solution was thoroughly mixed by spatula and painted onto pre-heated steel coupons.

The coupons were hung by crocodile clip/wire by the unpainted strip and kept at 80° C. in an oven for 48 h. The resulting transparent yellowish coating was approximately 1 mm thick, hard and scratch-resistant. For testing, the coupons were kept completely immersed into aqueous 3.5% NaCl for 30 days at ambient temperature.

Figure 29:
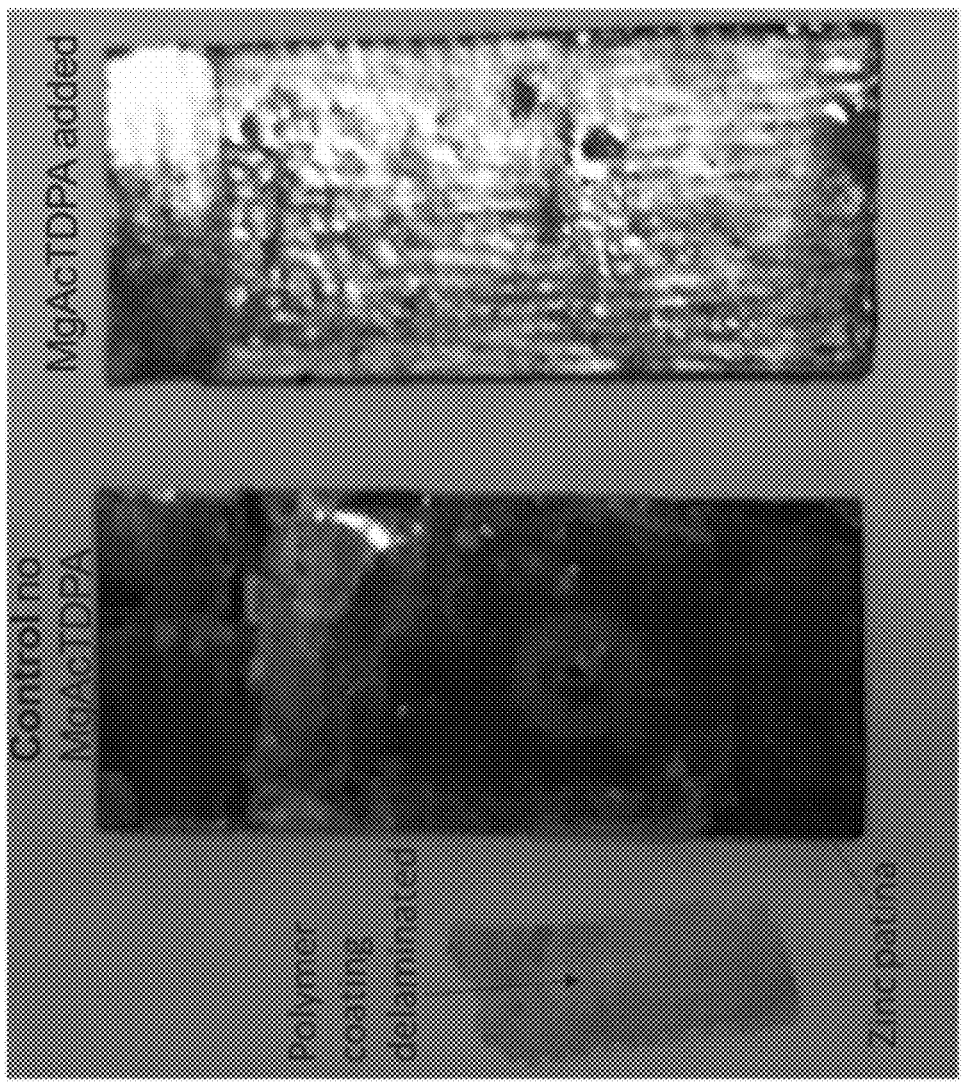
FIG. 29 shows exemplary photographs of coupons of galvanized steel coated with and without addition of MgAcTDPA after 30 days of immersion to 3.5% NaCl at ambient temperature.

Visual observation after 30 days (FIG. 29) showed that the coating that contained MgAcTDPA provided adequate protection to the coupons, as the coating stayed intact; no delamination was observed. The control coating prepared without MgAcTDPA was totally delaminated with the polymer layers flaking off and separating from the steel surface. The metal surface underneath the control coating was completely covered with dark zinc patina. The coating prepared with MgAcTDPA allowed maintenance of shiny metal layer underneath without visible corrosion.

Example 10

Powder Compositions of an Exemplary Thioether Salt

Powder compositions for electrodeposition on galvanized steel optimized for ease of compounding, temperature of epoxy-amine hardener curing, electrodeposition and adhesion to steel were prepared as follows. Powdered Araldite GT 6259 resin compounded with montmorillonite K10, carbon black, and magnesium thiodipropionate ($MgTDPA_{1:1}$) were milled at 50° C. for 1 h using a planetary ball mill, then dry ice and crosslinker dicyandiamide were added to the blend and the resulting mixture was pulverized using a high-speed powder blender. The final blend compositions are shown in Table 2. The powders were sieved at room temperature using a #200 mesh sieve, resulting in particles sized below 70 micron (FIG. 11). The release of magnesium from the powder compositions was tested as follows: a known amount of as-prepared powder (10 to 20 mg) containing 6.1 wt % MgTDPA was dispersed in 10 mM Tris buffer (3 mL) with pH adjusted in the 6-10 range. The dispersion was briefly sonicated and then gently shaken at room temperature overnight. The liquid was then separated from the solids by a syringe membrane filter (Millipore, $d_{pore}$ 0.45 μm) and was assayed for magnesium content in a commercial laboratory by ICP-AES spectrometry. The measurements were conducted in triplicate.

TABLE 2

Powder coatings compositions

| | Epoxy resin (wt %) | Crosslinker (wt %) | Carbon black (wt %) | Montmorillonite (wt %) | MgTDPA (wt %) |
|---|---|---|---|---|---|
| Control | 75.7 | 15.2 | 8.9 | 0.2 | 0 |
| Test coating | 72.7 | 12.1 | 8.9 | 0.2 | 6.1 |

Panels of galvanized steel (zinc-galvanized sheets of type B carbon steel, ASTM A653, 4"×3"×0.0150") were solvent-brushed according to ASTM D609-17[ref] and kept at 400° F. immediately prior to the powder electrodeposition. The powders were deposited on preheated steel panels using an Eastwood Dual-Voltage HotCoat Powder-Coating Gun at 25 kV and baked in an electrical oven at 400° F. for 20 min and 375° F. for 15 min. The resulting coatings were 3.8-4.0 mil (97-102 μm) thick.

Figure 30:
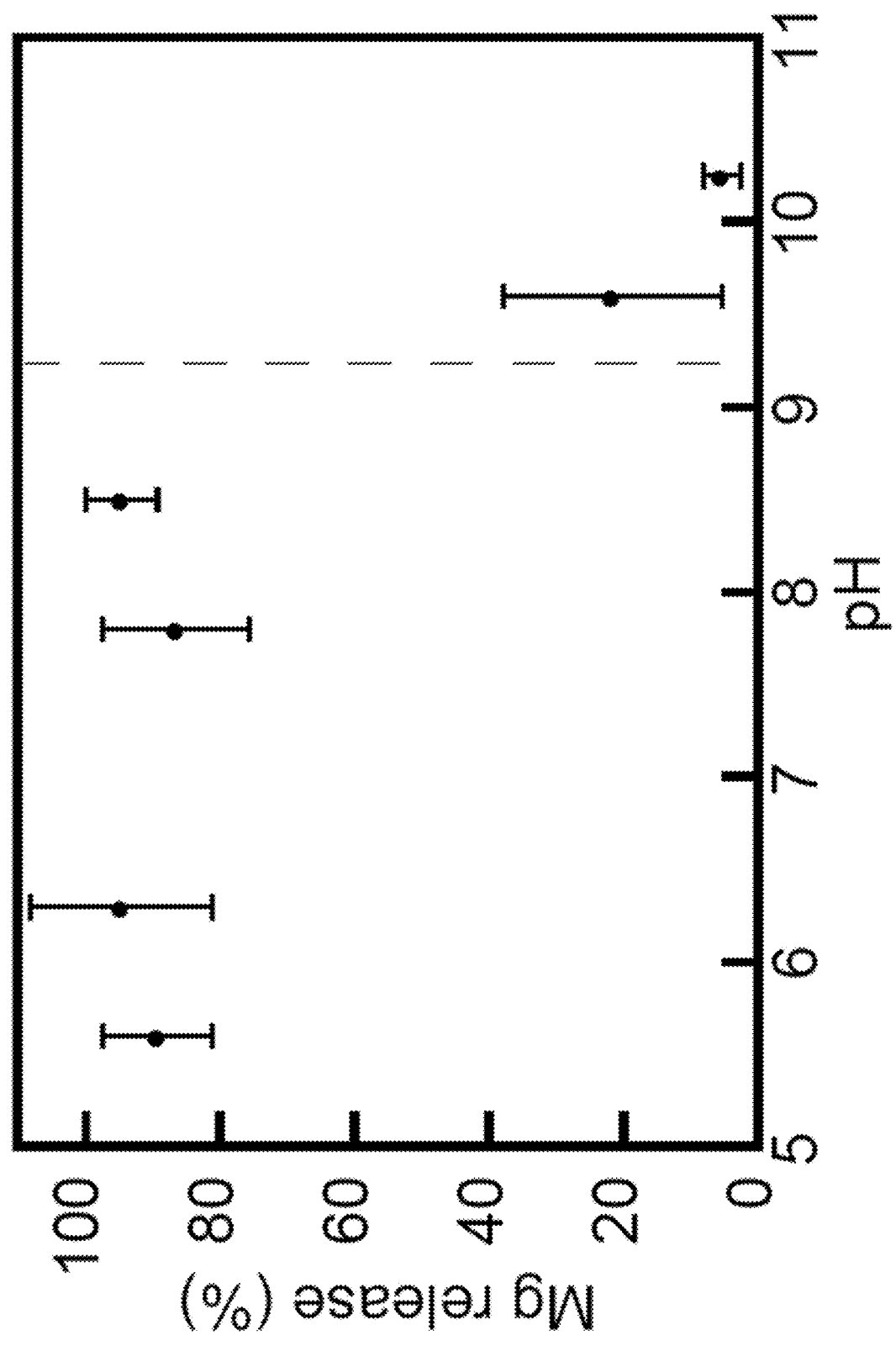
FIG. 30 shows a plot of the release of magnesium from MgTDPA-containing powder formulation into aqueous buffer as a function of pH. Dashed line shows the onset of $Mg(OH)_2$ precipitation. Release (%)=100×(Amount of Mg in the buffer/Amount of Mg in the initial powder composition).
Figure 31A:
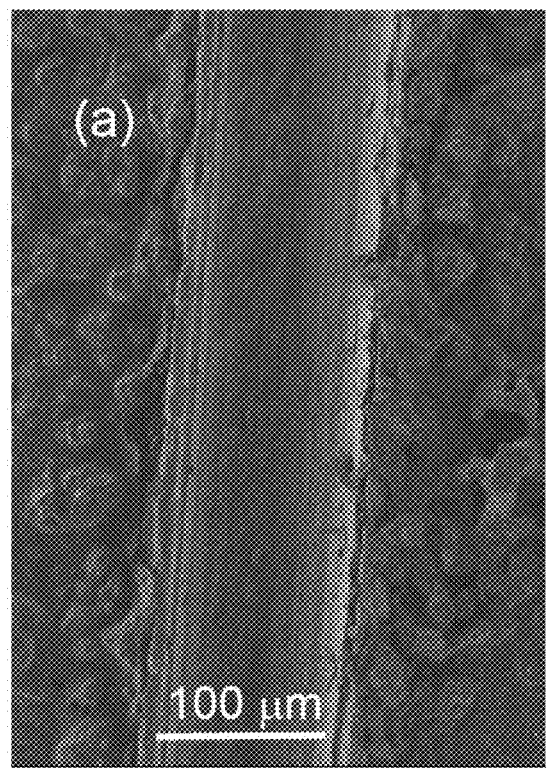
FIG. 31A shows SEM microphotograph of the scribe made on the galvanized steel panels powder-coated without (control) the corrosion inhibitor prior to the commencement of the immersion tests.
Figure 31B:
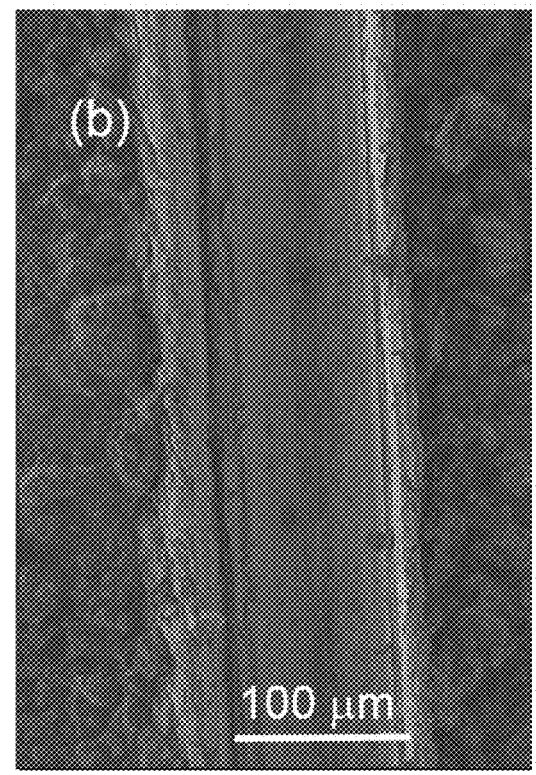
FIG. 31B shows SEM microphotograph of the scribe made on the galvanized steel panels powder-coated with the corrosion inhibitor (test coating) prior to the commencement of the immersion tests.
Figure 32A:
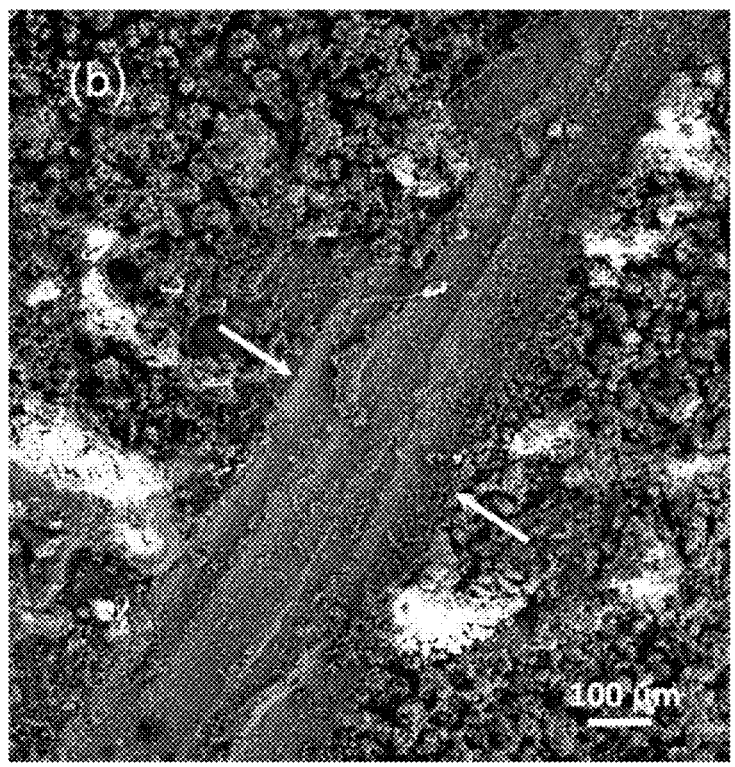
FIG. 32A shows SEM microphotograph of the scribe made on the galvanized steel panels powder-coated without (control) the corrosion inhibitor upon completion of the 60 days of the immersion tests. The panels removed from the 3.5% NaCl solutions upon completion of the test were rinsed with deionized water and gently air-dried. Arrows show edges of the scribes.
Figure 32B:
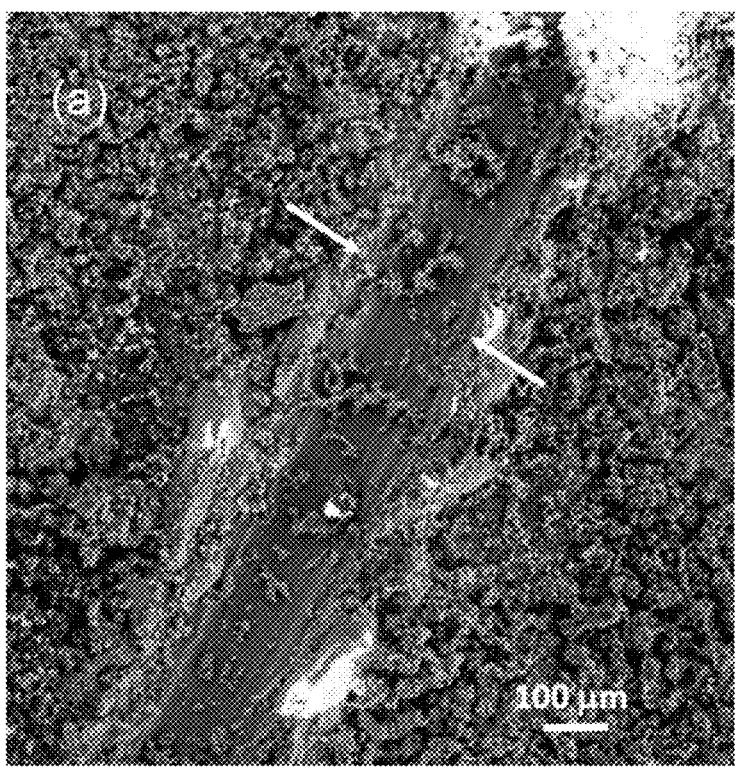
FIG. 32B shows SEM microphotograph of the scribe made on the galvanized steel panels powder-coated with the corrosion inhibitor (test coating) upon completion of the 60 days of the immersion tests. The panels removed from the 3.5% NaCl solutions upon completion of the test were rinsed with deionized water and gently air-dried. Arrows show edges of the scribes.

Magnesium thiodipropionates exhibit corrosion inhibitive properties in aqueous media, with $MgTDPA_{1:1}$ species being efficient. Given the suitable thermal properties of $MgTDPA_{1:1}$ and its aqueous solubility and dispersibility in epoxy resins, its performance was examined in powder coatings. Incorporation of corrosion inhibitors into a polymeric matrix for the purpose of limiting cathodic disbondment is a complex task, given the opposing requirements for the corrosion inhibitor accessibility for water in order to function versus the protective, barrier properties of the coating's polymer matrix. In order to implement powder electrodeposition while still enabling water access to magnesium thiodipropionate, the salt was physically blended, without melting, with the epoxy resin and dicyandiamide (latent crosslinker with high melting point) as the two major components. The composition also contained specialty carbon black and montmorillonite clay that enhanced the blended powder dispersibility. The accessibility of the powder composition to water was investigated as a function of pH by quantifying the fraction of magnesium initially present in MgTDPA that is released from the powder in contact with water using ICP (FIG. 30).

At pH<9, essentially all of Mg initially loaded into the powder composition with MgTDPA by powder blending was released into the aqueous buffer. At pH>9.3, $Mg^{2+}$ produced by dissociated MgTDPA formed insoluble $Mg(OH)_2$, which was removed by filtration along with the powder material. These experiments indicate that when a corrosive cathodic $O_2$ reduction occurs on the interface between metal and the coating (i.e., in the delamination front), the magnesium cations dissociating from the MgTDPA-containing coating will exhibit an anticorrosion action by stopping propagation of the corrosion front on the metal-coating interface because of the formation of the barrier $Mg(OH)_2$ precipitate:

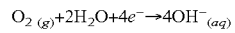

$$O_{2\,(g)} + 2H_2O + 4e^- \rightarrow 4OH^-_{(aq)}$$

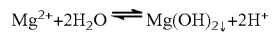

$$Mg^{2+} + 2H_2O \rightleftharpoons Mg(OH)_{2\downarrow} + 2H^+$$

Following the coating processes, the coated steel panels were scribed in a controlled fashion and subjected to the immersion and cyclical salt-spray tests (see Examples 11 and 12).

Example 11

Immersion Tests with an Exemplary Thioether Salt

Prior to the commencement of the immersion test, the coated panels were scribed with a scalpel blade making 100 μm-wide and 3 cm-long cuts exposing the bare steel surfaces. The tests were conducted by complete immersion of the coated panels in 3.5 wt % aqueous NaCl solutions (pH 5.25) at 25° C. Quantitative measurements of the scribe creep were conducted at the conclusion of the immersion tests after 60 days. Following the 60-day immersion, the panels were gently rinsed by deionized water, air-dried and any flaked or blistered coating along the edges of the scribe was removed using an adhesive tape according to ASTM D3359.[ref] Scribe creep measurement was performed by taking eight measurements along the length of the scraped scribe. The creep was measured edge-to-edge of the scribe using digital calipers and 3× magnifying glass, then averaged for each panel. Each type of panel (i.e. with and without the corrosion inhibitor) was measured in triplicate using three distinct panels, and the results were averaged among the panels of the same type.

Figure 33:
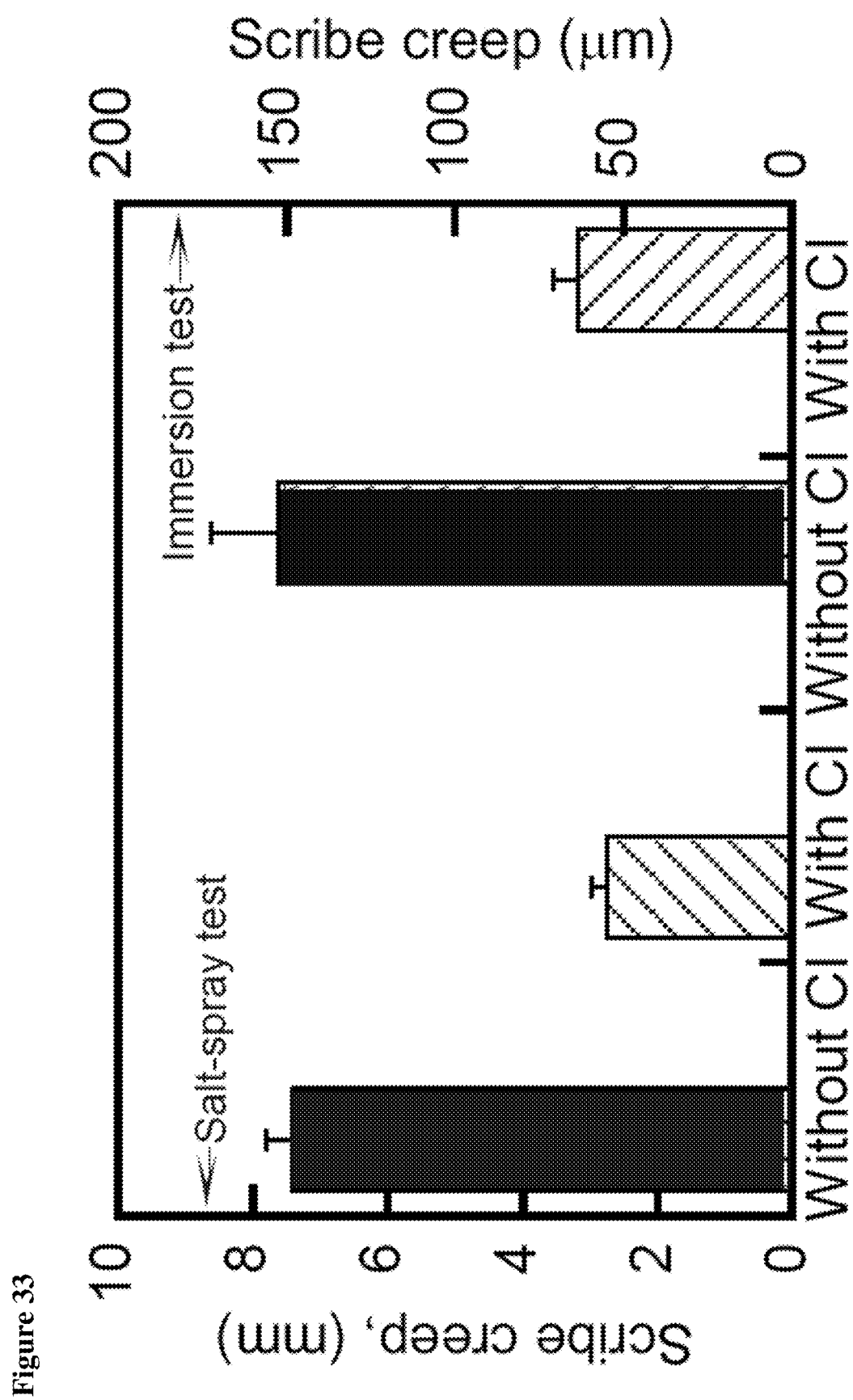
FIG. 33 shows exemplary results of the scribe creep measurements after the six-cycle test of resistance to cyclic corrosion conditions and after 60-day immersion tests of the panels powder-coated with and without the corrosion inhibitor (CI), magnesium thiodipropionate ($MgTDPA_{1:1}$). Datapoints represent mean average scribe readings, whereas the error bars show average standard errors of the mean. The initial scribe widths were subtracted from the scribe creep reading.

The scribed areas were visualized using SEM images (60-day immersion tests, FIGS. 31A, 31B, 32A, and 32B), which showed that the scribes were initially identical in width but became significantly (~30 to 60%) wider for the coatings devoid of the corrosion inhibitor. The scribe creep (widening) was used as a quantifiable parameter of the coating delamination in immersion corrosion tests (FIG. 33). The average scribe creep in the panels coated without the corrosion inhibitor was 2.4- to 2.6-fold larger than with an analogous coating containing the corrosion inhibitor magnesium thiodipropionate. These results provided an unequivocal proof of the protective action of magnesium thiodipropionate in the developed epoxy-amine powder coatings.

Example 12

Cyclical Salt-Spray Tests with an Exemplary Thioether Salt

The powder coatings prepared with and without the corrosion inhibitor, $MgTDPA_{1:1}$, were subjected to six cyclical tests in a commercial laboratory according to ISO 11997.$^{ref}$ Each cycle consisted of consecutive wet (salt fog), dry, and humidity exposures. That is, each standard cycle corrosion test was set as a combination of neutral salt spray exposure according to ASTM B 117 and ISO 9227 certified tests, 100% condensing humidity according to ISO 6270-2, drying and dwelling. One full corrosion cycle was a week in duration. The coated panels (4"×3"×0.0150") were scribed using a van Laar Model 426 scratching tool with spherical tungsten scratch needle (Erichsen GmbH & Co., Germany). Ferrous rust run-offs were not observed on the panels after 6 cycles. There was no blistering away from the scribe per ASTM D1654 in any of the tested panels. However, the appearance of white rust powdery deposits was observed on the surface of the scribes as well as in the wash-outs. Following the six cycles, the panels were gently rinsed by deionized water, air-dried and any flaked or blistered coating along the edges of the scribe was removed using an adhesive tape according to ASTM D3359. Scribe creep measurement was performed by taking eight measurements along the length of the scraped scribe. The creep was measured edge-to-edge of the scribe using digital calipers and 3× magnifying glass, then averaged for each panel. Each type of panel (with and without the corrosion inhibitor) was measured in triplicate using three distinct panels, and the results were averaged among the panels of the same type.

The scribe creep (widening) was used as a quantifiable parameter of the coating delamination in industry-standard cyclic corrosion tests (FIG. 33). The average scribe creep in the panels coated without the corrosion inhibitor was 2.4- to 2.6-fold larger than with an analogous coating containing the corrosion inhibitor magnesium thiodipropionate. These results provided an unequivocal proof of the protective action of magnesium thiodipropionate in the developed epoxy-amine powder coatings.

Developments in the field of "green" corrosion inhibitors are directed toward inexpensive, effective molecules of minimal negative environmental impact. In that regard, the magnesium thiodipropionates disclosed herein, which are prepared in water by either a simple replacement reaction of magnesium metal with thiodipropionic acid (TDPA) or metathesis reaction, represent promising entries in the green corrosion inhibitors arsenal. TDPA is a non-toxic, monolayer-forming, non-irritating dicarboxylic acids that is catabolized by microbes, whereas magnesium is more abundant and certainly less expensive than rare earths, carboxylates of which are considered to be green corrosion inhibitors. Yet, magnesium thiodipropionates are quite effective corrosion inhibitors in aqueous media and, for the first time, have been shown here to lower delamination of the powder coatings. This, combined with the observation that magnesium thiodipropionates accelerate benzoxazine polymerization and curing of the epoxy resin with amine hardeners, represents a rarely found synergism of functionalities useful wherever coatings are applied.

CITED REFERENCES

1. Dodds, P. C., Williams, G.; Radcliffe, J. Chromate-free smart release corrosion inhibitive pigments containing cations, *Prog. Org. Coat.*, 2017, 102, Pt. A, 107-114.
2. Kjernsmo, D, Kleven, K, Scheie, J, Corrosion Protection. Bording A/S, Copenhagen (2003).
3. P. A. Sørensen, S. Kiil, K. Dam-Johansen, C. E. Weinel. Anticorrosive coatings: a review. J. Coat. Technol. Res., 6 (2) 135-176, 2009.
4. Rammelt, U, Reinhard, G, "Characterization of Active Pigments in Damage of Organic Coatings on Steel by Means of Electrochemical Impedance Spectroscopy." Prog. Org. Coat., 24 309 (1994).
5. Hausbrand, R.; Stratmann, M.; Rohwerder, M. Corrosion of zinc-magnesium coatings: mechanism of plant delamination, *Corros. Sci.*, 2009, 51, 2107-2114.
6. LeRoy, R. L., Polythioglycolate Passivation of Zinc, NACE, Corrosion, 1978, 34, 113-119.
7. LeRoy, R. L. Chelate Inhibitors for Zinc and Galvanized Steel, NACE, Corrosion, 1978, 34, 98-109.
8. Treatment solution for forming of black trivalent chromium chemical coating on zinc or zinc alloy and method of forming black trivalent chromium chemical coating on zinc or zinc alloy, U.S. Pat. No. 8,070,886 B2, Dec. 6, 2011, to M. Inoue, S. Yuasa, Assignee Dipsol Chemicals Co., Ltd.
9. Williams, G.; McMurray, H. N. Inhibition of corrosion driven delamination on iron by smart-release bentonite cation-exchange pigments studied using a scanning Kelvin probe technique, Progr. Org. Coatings 2017, 102, 18-28.
10. WO 2002/008345 A1 (incorporated by reference), Published Jan. 31, 2002, inventors H. N. Mcmurray, D. A. Worsley, Applicant Uws Ventures Ltd.
11. Sheng, J. G.; Zeng, P. "Study on Organic Modified of Montmorillonite by Corrosion Inhibitor of Quaternary Ammonium Salts", Advanced Materials Research, Vol. 669, pp. 103-107, 2013.
12. Diamante, C.; Fiume, M. Z.; Bergfeld, W. F.; Belsito, D. V.; Hill, R. A.; Klaassen, C. D.; Liebler, D. C.; Marks, J. G.; Shank, R. C.; Slaga, T. J.; Snyder, P. W.; Andersen, F. A. Final Safety Assessment of Thiodipropionic Acid and Its Dialkyl Esters as Used in Cosmetics, Int. J. Toxicol., 2010, 29(Supplement 3) I37S-I50S.
13. Thiodipropionic acid bisamides as stabilizers for non-black elastomers, U.S. Pat. No. 6,365,653 B1 (incorporated by reference), Apr. 2, 2002, to H.-R. Meier, G. Knobloch, of Ciba Specialty Chemicals Corporation.
14. Antioxidant additives process of making the same and fuel composition thereof. O. Farng, A. G. Horodysky To Mobil Oil Corporation, U.S. Pat. No. 4,956,108 A (incorporated by reference), Publication date Sep. 11, 1990.
15. Polymers stabilized with polyesters of thiodipropionic acid, U.S. Pat. No. 3,564,076 A (incorporated by reference), Feb. 16, 1971, to Otto S Kauder, of Argus Chem.
16. Formulated benzoxazine based system for transportation applications, WO 2012/027119 A1 (incorporated by reference), Mar. 1, 2012, to J. Hoge of Huntsman Advanced Materials Americas LLC.
17. Thiol carbamates as latent accelerators for curing epoxy resins, U.S. Pat. No. 4,696,992 A (incorporated by reference), Nov. 17, 1986, A. B. Goel, Ashland Oil, Inc.
18. Magnesium Salt of Thioglycolic acid, U.S. Pat. No. 3,064,045 (incorporated by reference), Publ. Nov. 13, 1962; to Hsiung, D. Y. assignor Gillette Company.
19. Werner, P.-E.; Eriksson, L.; Westdahl, M. Treor, a Semi-Exhaustive Trial-and-Error Powder Indexing Program for All Symmetries, *J. Appl. Cryst.* 1985, 18, 367-370.
20. Szynkaruk P, Wesolowski M, Samson-Rosa M. Principal component analysis of thermal decomposition of magnesium salts used as drugs. J Therm Anal calorim. 2010; 101:505-12.
21. Wesolowski, M.; Leyk, E.; Szynkaruk, P. Detection of magnesium compounds in dietary supplements and medicinal products by DSC, Infrared and Raman techniques, Journal of Thermal Analysis and calorimetry May 2014, Volume 116, Issue 2, pp 671-680.
22. S. Ardizzone, C. L. Bianchi, M. Fadoni, B. Vercelli, Magnesium salts and oxide: an XPS overview, Applied Surface Science 119 (1997) 253-259.
23. Bromberg, L.; Straut, C. M.; Centrone, A.; Wilusz, E.; Hatton, T. A. Montmorillonite Functionalized with Pralidoxime As a Material for Chemical Protection against Organophosphorous Compounds, ACS Appl. Mater. Interfaces, 2011, 3 (5), 1479-1484.
24. G1-03 (2011) Standard Practice for Preparing, Cleaning, and Evaluating Corrosion Test Specimens.
25. Wang, Y.; Lakho, D. A.; Yao, D. Effect of Additives on the Rheological Properties of fast Curing Epoxy Resins. J. Silicate Based Composite Materials, JSBCM, 2015, 67, 132-134.
26. Winter, H. H. Can the gel point of a cross-linking polymer be detected by the G'-G" crossover? Polym. Eng. Sci. 1987, 27, 1698-1702.

INCORPORATION BY REFERENCE

All U.S. patents and U.S. and PCT published patent applications mentioned in the description above are incorporated by reference herein in their entirety.

EQUIVALENTS

Having now fully described the present invention in some detail by way of illustration and example for purposes of clarity of understanding, it will be obvious to one of ordinary skill clin the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

We claim:
1. A curable coating composition, comprising:
(a) a salt comprising a divalent alkaline earth metal cation and an anionic thioether compound;
(b) a curing agent or a mixture of curing agents; and
(c) one or more curable organic resin,
wherein the salt has the following structural formula:

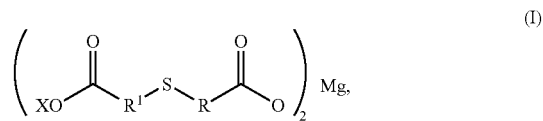

wherein R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;
$R^1$ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;
$R^2$ is hydrogen or $(C_1-C_{20})$alkyl; and
X is selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, $-OR^2$, $-SR^2$, $-N(R^2)_2$, $-C(O)N(R^2)_2$, $-C(O)N(R^2)((C_1-C_{20})$alkylene$)N(R^2)_2$, and $-C(O)R^2$, or
the following structural formula:

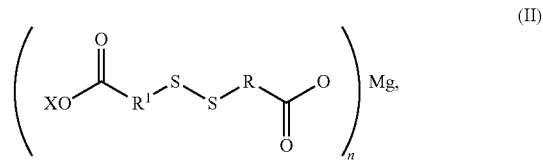

wherein
R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl,
$R^1$ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;
$R^2$ is hydrogen or $(C_1-C_{20})$alkyl;
X is absent or selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, $-OR^2$, $-SR^2$, $-N(R^2)_2$, $-C(O)N(R^2)_2$, $-C(O)N(R^2)((C_1-C_{20})$alkylene$)N(R^2)_2$, and $-C(O)R^2$; and
n is 1 or 2.
2. The composition of claim 1, wherein the ratio of the divalent alkaline earth metal cation to the anionic thioether compound is from about 50:1 to about 0.1:1.
3. The composition of claim 1, wherein the salt is from about 0.1% to about 80% by weight, based upon total solids weight of the composition.
4. The composition of claim 1, wherein the salt has the following structural formula:

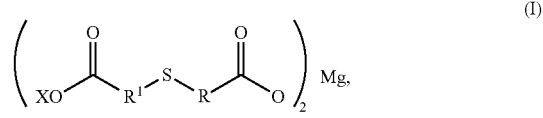

wherein
R is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^1$ is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^2$ is hydrogen or (C$_1$-C$_{20}$)alkyl; and
X is selected from the group consisting of H, halogen, (C$_1$-C$_{20}$)alkyl, cycloalkyl, heterocycloalkyl, aryl, heteroaryl, aralkyl, heteroaralkyl, (C$_2$-C$_{20}$)alkenyl, —OR$^2$, —SR$^2$, —N(R$^2$)$_2$, —C(O)N(R$^2$)$_2$, —C(O)N(R$^2$)((C$_1$-C$_{20}$)alkylene)N(R$^2$)$_2$, and —C(O)R$^2$.

5. The composition of claim 1, wherein the salt has the following structural formula:

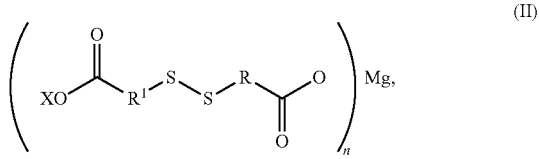

(II)

wherein
R is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^1$ is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^2$ is hydrogen or (C$_1$-C$_{20}$)alkyl;
X is absent or selected from the group consisting of H, halogen, (C$_1$-C$_{20}$)alkyl, cycloalkyl, heterocycloalkyl, aryl, heteroaryl, aralkyl, heteroaralkyl, (C$_2$-C$_{20}$)alkenyl, —OR$^2$, —SR$^2$, —N(R$^2$)$_2$, —C(O)N(R$^2$)$_2$, —C(O)N(R$^2$)((C$_1$-C$_{20}$)alkylene)N(R$^2$)$_2$, and —C(O)R$^2$; and
n is 1 or 2.

6. The composition of claim 1, wherein the curing agent or the mixture of curing agents comprises an amine, an amido-amine, a phenol, a carboxylic anhydride, or a mercaptan.

7. The composition of claim 1, wherein the one or more curable organic resins comprise a bisphenol A epoxy resin, bisphenol A propoxylate diglycidyl ether, or N$^4$,N$^4$,N$^{4'}$,N$^{4'}$-tetra(oxiran-2-yl)-[1,1'-biphenyl]-4,4'-diamine.

8. The composition of claim 1, further comprising an additive.

9. The composition of claim 8, wherein the additive is selected from the group consisting of a dye, a flow control agent, a dispersant, a thixotropic agent, an adhesion promoter, an antioxidant, a light stabilizer, a curing catalyst, an anticorrosion agent, and a mixture thereof.

10. The composition of claim 1, further comprising:
(i) a pigment; or
(ii) an additive.

11. The composition of claim 10, wherein the composition comprises a pigment selected from the group consisting of carbon nanotubes, titanium dioxide, montmorillonite, iron oxide, aluminum, bronze, phthalocyanine blue, and a mixture thereof.

12. A method of preventing or reducing corrosion on a surface, comprising applying to the surface a coating, wherein the coating is a curable coating composition comprising:

(a) a salt comprising a divalent alkaline earth metal cation and an anionic thioether compound;
(b) a curing agent or a mixture of curing agents; and
(c) one or more curable organic resins,
wherein the salt has the following structural formula:

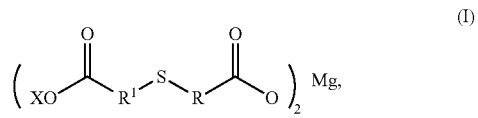

(I)

wherein R is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^1$ is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^2$ is hydrogen or (C$_1$-C$_{20}$)alkyl; and
X is selected from the group consisting of H, halogen, (C$_1$-C$_{20}$)alkyl, cycloalkyl, heterocycloalkyl, aryl, heteroaryl, aralkyl, heteroaralkyl, (C$_2$-C$_{20}$)alkenyl, —OR$^2$, —SR$^2$, —N(R$^2$)$_2$, —C(O)N(R$^2$)$_2$, —C(O)N(R$^2$)((C$_1$-C$_{20}$)alkylene)N(R$^2$)$_2$, and —C(O)R$^2$, or
the following structural formula:

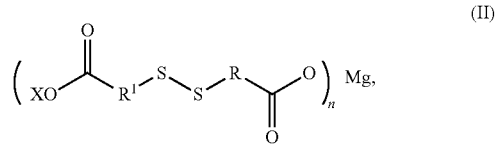

(II)

wherein
R is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^1$ is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^2$ is hydrogen or (C$_1$-C$_{20}$)alkyl;
X is absent or selected from the group consisting of H, halogen, (C$_1$-C$_{20}$)alkyl, cycloalkyl, heterocycloalkyl, aryl, heteroaryl, aralkyl, heteroaralkyl, (C$_2$-C$_{20}$)alkenyl, —OR$^2$, —SR$^2$, —N(R$^2$)$_2$, —C(O)N(R$^2$)$_2$, —C(O)N(R$^2$)((C$_1$-C$_{20}$)alkylene)N(R$^2$)$_2$, and —C(O)R$^2$; and
(d) n is 1 or 2;
thereby preventing or reducing corrosion of the surface.

13. The method of claim 12, wherein the salt has the following structural formula:

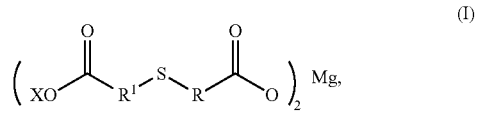

(I)

wherein
R is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;
R$^1$ is selected from the group consisting of divalent (C$_1$-C$_6$)alkyl, cycloalkyl, heterocycloalkyl, aryl, heteroaryl, aralkyl, heteroaralkyl, and (C$_2$-C$_6$)alkenyl;

$R^2$ is hydrogen or $(C_1-C_{20})$alkyl; and

X is selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, —$OR^2$, —$SR^2$, —$N(R^2)_2$, —$C(O)N(R^2)_2$, —$C(O)N(R^2)((C_1-C_{20})$alkylene$)N(R^2)_2$, and —$C(O)R^2$.

14. The method of claim 12, wherein the salt has the following structural formula:

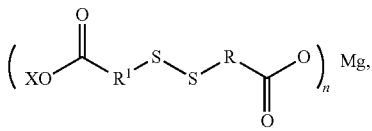

(II)

wherein

R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^1$ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^2$ is hydrogen or $(C_1-C_{20})$alkyl;

X is absent or selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, —$OR^2$, —$SR^2$, —$N(R^2)_2$, —$C(O)N(R^2)_2$, —$C(O)N(R^2)((C_1-C_{20})$alkylene$)N(R^2)_2$, and —$C(O)R^2$; and n is 1 or 2.

15. The method of claim 12, wherein the curing agent or the mixture of curing agents comprises an amine, an amidoamine, a phenol, a carboxylic anhydride, or a mercaptan.

16. A method of anticorrosive treatment, comprising:
providing a substrate, wherein said substrate is a ferrous substrate;
coating the substrate with a curable coating composition comprising:
(a) a salt comprising a divalent alkaline earth metal cation and an anionic thioether compound;
(b) a curing agent or a mixture of curing agents; and
(c) one or more curable organic resins,
wherein the salt has the following structural formula:

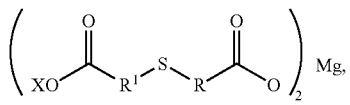

(I)

wherein R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^1$ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^2$ is hydrogen or $(C_1-C_{20})$alkyl; and

X is selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, —$OR^2$, —$SR^2$, —$N(R^2)_2$, —$C(O)N(R^2)_2$, —$C(O)N(R^2)((C_1-C_{20})$alkylene$)N(R^2)_2$, and —$C(O)R^2$, or the following structural formula:

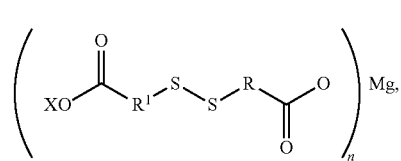

(II)

wherein

R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^1$ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^2$ is hydrogen or $(C_1-C_{20})$alkyl;

X is absent or selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, —$OR^2$, —$SR^2$, —$N(R^2)_2$, —$C(O)N(R^2)_2$, —$C(O)N(R^2)((C_1-C_{20})$alkylene$)N(R^2)_2$, and —$C(O)R^2$; and n is 1 or 2;

thereby preventing or reducing corrosion of the substrate.

17. The method of claim 16, wherein the substrate is selected from the group consisting of steel, carbon steel, galvanized steel, and pig iron.

18. The method of claim 16, wherein the salt has the following structural formula:

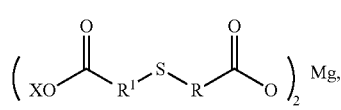

(I)

wherein

R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^1$ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

$R^2$ is hydrogen or $(C_1-C_{20})$alkyl; and

X is selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, —$OR^2$, —$SR^2$, —$N(R^2)_2$, —$C(O)N(R^2)_2$, —$C(O)N(R^2)((C_1-C_{20})$alkylene$)N(R^2)_2$, and —$C(O)R^2$.

19. The method of claim 16, wherein the salt has the following structural formula:

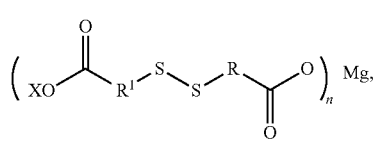

(II)

wherein

R is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

R¹ is selected from the group consisting of divalent $(C_1-C_6)$alkyl, cycloalkyl, heterocycloalkyl, aryl, heteroaryl, aralkyl, heteroaralkyl, and $(C_2-C_6)$alkenyl;

R² is hydrogen or $(C_1-C_{20})$alkyl;

X is absent or selected from the group consisting of H, halogen, $(C_1-C_{20})$alkyl, cycloalkyl, heterocycloalkyl, aryl, heteroaryl, aralkyl, heteroaralkyl, $(C_2-C_{20})$alkenyl, —OR², —SR², —N(R²)₂, —C(O)N(R²)₂, —C(O)N(R²)((C₁-C₂₀)alkylene)N(R²)₂, and —C(O)R²; and n is 1 or 2.

20. The method of claim 16, wherein the curing agent or the mixture of curing agents comprises an amine, an amidoamine, a phenol, a carboxylic anhydride, or a mercaptan.

\* \* \* \* \*